US012643232B2

(12) United States Patent
Roy et al.

(10) Patent No.: US 12,643,232 B2
(45) Date of Patent: Jun. 2, 2026

(54) SYSTEM, APPARATUS, AND METHOD FOR IMPROVED LOCATION IDENTIFICATION

(71) Applicant: Gecko Robotics, Inc., Pittsburgh, PA (US)

(72) Inventors: Mayank Roy, Pittsburgh, PA (US); Edward A. Bryner, Pittsburgh, PA (US); Edwin H. Cho, Pittsburgh, PA (US); Domenic P. Rodriguez, Pittsburgh, PA (US); Benjamin A. Guise, Pittsburgh, PA (US); Ryan Dickerhoff, Pittsburgh, PA (US); Alberto Pinero, Pittsburgh, PA (US); Weston Bushyeager, Pittsburgh, PA (US)

(73) Assignee: Gecko Robotics, Inc., Pittsburgh, PA (US)

( * ) Notice: Subject to any disclaimer, the term of this patent is extended or adjusted under 35 U.S.C. 154(b) by 100 days.

(21) Appl. No.: 18/545,640

(22) Filed: Dec. 19, 2023

(65) Prior Publication Data

US 2024/0198519 A1 Jun. 20, 2024

Related U.S. Application Data

(60) Provisional application No. 63/476,114, filed on Dec. 19, 2022.

(51) Int. Cl.
*B25J 9/16* (2006.01)

(52) U.S. Cl.
CPC ........... *B25J 9/1653* (2013.01); *B25J 9/1674* (2013.01)

(58) Field of Classification Search
CPC .............................. B25J 9/1653; B25J 9/1674
See application file for complete search history.

(56) References Cited

U.S. PATENT DOCUMENTS

| | | | |
|---|---|---|---|
| 2,135,307 | A | 11/1938 | Keator |
| 2,694,164 | A | 11/1954 | Geppelt |
| 2,861,700 | A | 11/1958 | James |
| 3,028,753 | A | 4/1962 | Joy |
| 3,055,210 | A | 9/1962 | Joy |
| 3,279,242 | A | 10/1966 | Megoloff |
| 3,280,621 | A | 10/1966 | Cardinal et al. |

(Continued)

FOREIGN PATENT DOCUMENTS

| | | |
|---|---|---|
| BR | PI0805432 A2 | 9/2010 |
| CA | 3173120 A1 | 10/2022 |

(Continued)

OTHER PUBLICATIONS

English translation for reference CN112539749 (Year: 2020).*

(Continued)

*Primary Examiner* — Rachid Bendidi
(74) *Attorney, Agent, or Firm* — GTC Law Group PC & Affiliates

(57) ABSTRACT

An inspection robot positioning system includes a first position sensor configured to provide a first position value, a second position sensor configured to provide a second position value, and a controller configured to determine a position description for an inspection robot in response to the first position value and the second position value, the position description including a robot position value of the inspection robot on an inspection surface.

32 Claims, 43 Drawing Sheets

(56) References Cited

U.S. PATENT DOCUMENTS

| | | |
|---|---|---|
| 3,326,037 A | 6/1967 | John |
| 3,420,097 A | 1/1969 | Batterman et al. |
| 3,427,866 A | 2/1969 | Weighart |
| 3,437,786 A | 4/1969 | Colinet et al. |
| 3,483,734 A | 12/1969 | Wood |
| 3,486,368 A | 12/1969 | Brech |
| 3,690,393 A | 9/1972 | Guy |
| 3,741,003 A | 6/1973 | Gunkel |
| 3,762,496 A | 10/1973 | Moore et al. |
| 3,789,700 A | 2/1974 | Cotreau et al. |
| 3,837,202 A | 9/1974 | Hetherington et al. |
| 3,895,685 A | 7/1975 | Gillette et al. |
| 3,952,581 A | 4/1976 | Gottelt |
| 4,027,528 A | 6/1977 | Tyree |
| 4,033,178 A | 7/1977 | Holt et al. |
| 4,043,185 A | 8/1977 | Siebert |
| 4,055,990 A | 11/1977 | Topping |
| 4,057,294 A | 11/1977 | Krekeler |
| 4,105,972 A | 8/1978 | Smith |
| 4,304,134 A | 12/1981 | Rouse et al. |
| 4,355,536 A | 10/1982 | Mcshane et al. |
| 4,368,644 A | 1/1983 | Wentzell et al. |
| 4,391,134 A | 7/1983 | Theurer et al. |
| 4,434,660 A | 3/1984 | Michaels et al. |
| 4,437,332 A | 3/1984 | Pittaro |
| 4,495,587 A | 1/1985 | Plante et al. |
| 4,526,037 A | 7/1985 | Wentzell et al. |
| 4,537,136 A | 8/1985 | Douglas |
| 4,558,598 A | 12/1985 | Young |
| 4,567,514 A | 1/1986 | Morgan et al. |
| 4,573,548 A | 3/1986 | Holland |
| 4,596,144 A | 6/1986 | Panton et al. |
| 4,654,702 A | 3/1987 | Tolino et al. |
| 4,706,120 A | 11/1987 | Slaughter et al. |
| 4,736,826 A | 4/1988 | White et al. |
| 4,757,258 A | 7/1988 | Kelly, Jr. et al. |
| 4,840,090 A | 6/1989 | Iwata |
| 4,862,748 A | 9/1989 | Woodmansee |
| 4,879,973 A | 11/1989 | Maeyama et al. |
| 4,881,405 A | 11/1989 | Paquet |
| 4,893,286 A | 1/1990 | Cobb |
| 4,954,949 A | 9/1990 | Rubin |
| 4,964,059 A | 10/1990 | Sugaya et al. |
| 4,993,912 A | 2/1991 | King et al. |
| 5,006,799 A | 4/1991 | Pfanstiehl |
| 5,007,291 A | 4/1991 | Walters et al. |
| 5,038,615 A | 8/1991 | Trulson et al. |
| 5,062,298 A | 11/1991 | Falcoff et al. |
| 5,097,710 A | 3/1992 | Palynchuk |
| 5,175,415 A | 12/1992 | Guest |
| 5,269,202 A | 12/1993 | Kiyosawa et al. |
| 5,271,274 A | 12/1993 | Khuri-yakub et al. |
| 5,285,689 A | 2/1994 | Hapstack et al. |
| 5,350,033 A | 9/1994 | Kraft |
| 5,374,879 A | 12/1994 | Pin et al. |
| 5,404,755 A | 4/1995 | Olson et al. |
| 5,426,980 A | 6/1995 | Smith |
| 5,429,009 A | 7/1995 | Wolfe et al. |
| 5,440,929 A | 8/1995 | Huang et al. |
| 5,549,004 A | 8/1996 | Nugent |
| 5,559,696 A | 9/1996 | Borenstein |
| 5,619,423 A | 4/1997 | Scrantz |
| 5,635,644 A | 6/1997 | Ishikawa et al. |
| 5,663,502 A | 9/1997 | Nagashima et al. |
| 5,764,014 A | 6/1998 | Jakeway et al. |
| 5,782,253 A | 7/1998 | Cates et al. |
| 5,809,099 A | 9/1998 | Kim et al. |
| 5,853,655 A | 12/1998 | Baker |
| 5,857,534 A | 1/1999 | Devault et al. |
| 5,929,338 A | 7/1999 | Frankel et al. |
| 5,948,985 A | 9/1999 | Brautigan et al. |
| 6,000,484 A | 12/1999 | Zoretich et al. |
| 6,064,428 A | 5/2000 | Trosino et al. |
| 6,076,407 A | 6/2000 | Levesque et al. |
| 6,104,970 A | 8/2000 | Schmidt, Jr. et al. |
| 6,125,955 A | 10/2000 | Zoretich et al. |
| 6,145,583 A | 11/2000 | Gay et al. |
| 6,150,809 A | 11/2000 | Tiernan et al. |
| 6,220,099 B1 | 4/2001 | Marti et al. |
| 6,234,025 B1 | 5/2001 | Gieske et al. |
| 6,243,657 B1 | 6/2001 | Tuck et al. |
| 6,273,521 B1 | 8/2001 | Halvorson et al. |
| 6,298,727 B1 | 10/2001 | Fleming et al. |
| 6,300,893 B1 | 10/2001 | Schaff et al. |
| 6,317,387 B1 | 11/2001 | D'Amaddio et al. |
| 6,392,222 B1 | 5/2002 | Greenwood |
| 6,454,036 B1 | 9/2002 | Airey et al. |
| 6,491,127 B1 | 12/2002 | Holmberg et al. |
| 6,493,612 B1 | 12/2002 | Bisset et al. |
| 6,931,931 B2 | 8/2005 | Graff et al. |
| 6,981,417 B1 | 1/2006 | Oravecz |
| 7,337,673 B2 | 3/2008 | Kennedy et al. |
| 7,428,842 B2 | 9/2008 | Fair et al. |
| 7,430,913 B2 | 10/2008 | Sarr |
| 7,628,075 B2 | 12/2009 | Kennedy et al. |
| 7,733,084 B1 | 6/2010 | Odell et al. |
| 7,743,660 B2 | 6/2010 | Marsh et al. |
| 7,859,655 B2 | 12/2010 | Troy et al. |
| 8,570,629 B2 | 10/2013 | Spears |
| 8,833,169 B2 | 9/2014 | Lute, Jr. et al. |
| 8,943,892 B2 | 2/2015 | Garvey et al. |
| 9,037,419 B2 | 5/2015 | Na et al. |
| 9,110,000 B2 | 8/2015 | Poirier et al. |
| 9,121,817 B1 | 9/2015 | Roach et al. |
| 9,221,506 B1 | 12/2015 | Georgeson et al. |
| 9,285,296 B2 | 3/2016 | Georgeson et al. |
| 9,310,482 B2 | 4/2016 | Rosenberg et al. |
| 9,335,305 B2 | 5/2016 | Smith et al. |
| 9,427,874 B1 | 8/2016 | Rublee |
| 9,463,574 B2 | 10/2016 | Purkayastha et al. |
| 9,586,636 B1 | 3/2017 | Burmeister et al. |
| 9,664,652 B2 | 5/2017 | Fetzer et al. |
| 9,733,219 B2 | 8/2017 | Spencer et al. |
| 9,784,599 B1 | 10/2017 | Close et al. |
| 9,796,089 B2 | 10/2017 | Lawrence, III et al. |
| 9,863,891 B1 | 1/2018 | Lara Magallanes et al. |
| 9,863,919 B2 | 1/2018 | Carrasco Zanini et al. |
| 9,963,836 B1 | 5/2018 | Brenner et al. |
| 10,014,587 B2 | 7/2018 | Boulais et al. |
| 10,281,912 B2 | 5/2019 | Hollister |
| 10,317,905 B2 | 6/2019 | Ouellette et al. |
| 10,481,608 B2 | 11/2019 | Loosararian et al. |
| 10,534,365 B2 | 1/2020 | Loosararian et al. |
| 10,594,054 B2 | 3/2020 | Murugiah et al. |
| 10,689,113 B2 | 6/2020 | Prager et al. |
| 10,698,412 B2 | 6/2020 | Loosararian et al. |
| 10,739,779 B2 | 8/2020 | Loosararian et al. |
| 10,795,373 B2 | 10/2020 | Loosararian et al. |
| 10,805,431 B2 | 10/2020 | Ito |
| 10,884,423 B2 | 1/2021 | Loosararian et al. |
| 10,895,878 B2 | 1/2021 | Loosararian et al. |
| 10,942,522 B2 | 3/2021 | Loosararian et al. |
| 11,135,721 B2 | 10/2021 | Bryner et al. |
| 11,144,063 B2 | 10/2021 | Loosararian et al. |
| 11,148,292 B2 | 10/2021 | Bryner et al. |
| 11,157,012 B2 | 10/2021 | Loosararian et al. |
| 11,157,013 B2 | 10/2021 | Loosararian et al. |
| 11,307,063 B2 | 4/2022 | Low et al. |
| 11,327,052 B2 | 5/2022 | Gagnon et al. |
| 11,364,943 B1 | 6/2022 | Brick et al. |
| 11,365,068 B2 | 6/2022 | Wertenberger et al. |
| 11,385,650 B2 | 7/2022 | Loosararian et al. |
| 11,429,109 B2 | 8/2022 | Loosararian et al. |
| 11,435,192 B1 | 9/2022 | Ebrahimi Afrouzi et al. |
| 11,468,588 B1 | 10/2022 | Ebrahimi Afrouzi et al. |
| 11,511,426 B2 | 11/2022 | Bryner et al. |
| 11,518,030 B2 | 12/2022 | Bryner et al. |
| 11,518,031 B2 | 12/2022 | Bryner et al. |
| 11,529,735 B2 | 12/2022 | Bryner et al. |
| 11,548,577 B2 | 1/2023 | Abdellatif et al. |
| 11,565,417 B2 | 1/2023 | Bryner et al. |
| 11,648,671 B2 | 5/2023 | Bryner et al. |
| 11,669,100 B2 | 6/2023 | Loosararian et al. |
| 11,673,272 B2 | 6/2023 | Loosararian et al. |

(56) References Cited

U.S. PATENT DOCUMENTS

| | | |
|---|---|---|
| 11,740,635 B2 | 8/2023 | Loosararian et al. |
| 11,850,726 B2 | 12/2023 | Bryner et al. |
| 11,865,698 B2 | 1/2024 | Bryner et al. |
| 11,872,688 B2 | 1/2024 | Bryner et al. |
| 11,872,707 B2 | 1/2024 | Bryner et al. |
| 11,892,322 B2 | 2/2024 | Low et al. |
| 11,904,456 B2 | 2/2024 | Jourde et al. |
| 11,926,037 B2 | 3/2024 | Bryner et al. |
| 11,964,382 B2 | 4/2024 | Jourde et al. |
| 11,969,881 B2 | 4/2024 | Jourde et al. |
| 11,971,389 B2 | 4/2024 | David et al. |
| 11,975,585 B2 | 5/2024 | Colaw et al. |
| 11,977,054 B2 | 5/2024 | David et al. |
| 11,992,935 B2 | 5/2024 | Bryner et al. |
| 12,007,364 B2 | 6/2024 | David et al. |
| 12,013,705 B2 | 6/2024 | Loosararian et al. |
| 12,022,617 B2 | 6/2024 | Jourde et al. |
| 12,038,412 B2 | 7/2024 | David et al. |
| 12,050,202 B2 | 7/2024 | David et al. |
| 12,061,173 B2 | 8/2024 | David et al. |
| 12,061,483 B2 | 8/2024 | Loosararian et al. |
| 12,061,484 B2 | 8/2024 | Loosararian et al. |
| 12,072,319 B2 | 8/2024 | David et al. |
| 12,156,334 B2 | 11/2024 | Bryner et al. |
| 12,160,956 B2 | 12/2024 | Jourde et al. |
| 12,162,160 B2 | 12/2024 | Pinero et al. |
| 12,200,868 B2 | 1/2025 | Jourde et al. |
| 12,228,550 B2 | 2/2025 | David et al. |
| 12,284,761 B2 | 4/2025 | Bryner et al. |
| 12,302,499 B2 | 5/2025 | Bryner et al. |
| 12,313,599 B2 | 5/2025 | David et al. |
| 12,358,141 B2 | 7/2025 | Loosararian et al. |
| 12,365,199 B2 | 7/2025 | Bryner et al. |
| 12,366,557 B2 | 7/2025 | David et al. |
| 12,420,585 B2 | 9/2025 | Bryner et al. |
| 12,420,586 B2 | 9/2025 | Jourde et al. |
| 2002/0104693 A1 | 8/2002 | Moore et al. |
| 2002/0111712 A1 | 8/2002 | Peshkin et al. |
| 2002/0116083 A1 | 8/2002 | Schulze |
| 2002/0134159 A1 | 9/2002 | He |
| 2002/0143421 A1 | 10/2002 | Wetzer |
| 2002/0168532 A1 | 11/2002 | Sinsel et al. |
| 2002/0190682 A1 | 12/2002 | Schempf et al. |
| 2003/0060930 A1 | 3/2003 | Fujita et al. |
| 2003/0089267 A1 | 5/2003 | Ghorbel et al. |
| 2003/0129872 A1 | 7/2003 | Tolmie |
| 2003/0137268 A1 | 7/2003 | Papanikolopoulos et al. |
| 2003/0172735 A1 | 9/2003 | Lam et al. |
| 2003/0188589 A1 | 10/2003 | Harthorn et al. |
| 2004/0050165 A1 | 3/2004 | He |
| 2004/0173116 A1 | 9/2004 | Ghorbel et al. |
| 2004/0177681 A1 | 9/2004 | Harthorn et al. |
| 2004/0207394 A1 | 10/2004 | Harthorn et al. |
| 2004/0262060 A1 | 12/2004 | Kim |
| 2005/0016008 A1 | 1/2005 | Raab et al. |
| 2005/0056105 A1 | 3/2005 | Delacroix et al. |
| 2005/0065651 A1 | 3/2005 | Ayers et al. |
| 2005/0150300 A1 | 7/2005 | Nenno et al. |
| 2005/0174086 A1 | 8/2005 | Iwashita et al. |
| 2005/0183506 A1 | 8/2005 | Kawabata |
| 2005/0252296 A1 | 11/2005 | Hock et al. |
| 2006/0027952 A1 | 2/2006 | Meissner et al. |
| 2006/0037430 A1 | 2/2006 | Kiyosawa et al. |
| 2006/0055399 A1 | 3/2006 | Georgeson et al. |
| 2006/0138732 A1 | 6/2006 | Buma et al. |
| 2006/0162610 A1 | 7/2006 | Reboredo et al. |
| 2006/0243051 A1 | 11/2006 | Bui et al. |
| 2007/0006657 A1 | 1/2007 | Kennedy et al. |
| 2007/0006658 A1 | 1/2007 | Kennedy et al. |
| 2007/0044562 A1 | 3/2007 | Sarr |
| 2007/0044564 A1 | 3/2007 | Bui et al. |
| 2007/0055152 A1 | 3/2007 | Ukubo et al. |
| 2007/0137905 A1 | 6/2007 | Lee et al. |
| 2007/0146480 A1 | 6/2007 | Judge et al. |
| 2007/0195712 A1 | 8/2007 | Thayer et al. |
| 2007/0217672 A1 | 9/2007 | Shannon et al. |
| 2007/0227250 A1 | 10/2007 | Kennedy et al. |
| 2007/0278851 A1 | 12/2007 | Nakamura et al. |
| 2007/0293997 A1 | 12/2007 | Couch |
| 2008/0039974 A1 | 2/2008 | Sandin et al. |
| 2008/0054540 A1 | 3/2008 | Buma |
| 2008/0059114 A1 | 3/2008 | Coperet |
| 2008/0079723 A1 | 4/2008 | Hanson et al. |
| 2008/0087112 A1 | 4/2008 | Bagley et al. |
| 2008/0087113 A1 | 4/2008 | Bagley et al. |
| 2008/0092061 A1 | 4/2008 | Bankston et al. |
| 2008/0148876 A1 | 6/2008 | Hock et al. |
| 2008/0202245 A1 | 8/2008 | Young |
| 2008/0220692 A1 | 9/2008 | Torres et al. |
| 2008/0230289 A1 | 9/2008 | Schoon et al. |
| 2008/0245151 A1 | 10/2008 | Roney et al. |
| 2008/0302200 A1 | 12/2008 | Tobey |
| 2009/0078484 A1 | 3/2009 | Kocijan |
| 2009/0114025 A1 | 5/2009 | Sato et al. |
| 2009/0161217 A1 | 6/2009 | Mimura |
| 2009/0224493 A1 | 9/2009 | Buma et al. |
| 2009/0287450 A1 | 11/2009 | Dubois et al. |
| 2009/0301203 A1 | 12/2009 | Brussieux |
| 2010/0011522 A1 | 1/2010 | Kim et al. |
| 2010/0013174 A1 | 1/2010 | Buma et al. |
| 2010/0060273 A1 | 3/2010 | Couchman |
| 2010/0126403 A1 | 5/2010 | Rooney, III et al. |
| 2010/0212983 A1 | 8/2010 | Lama |
| 2010/0224001 A1 | 9/2010 | Brignac |
| 2010/0263948 A1 | 10/2010 | Couture et al. |
| 2011/0030478 A1 | 2/2011 | Park et al. |
| 2011/0061197 A1 | 3/2011 | Shimomura |
| 2011/0130238 A1 | 6/2011 | Schoon |
| 2011/0148631 A1 | 6/2011 | Lanham et al. |
| 2011/0167914 A1 | 7/2011 | Sutherland |
| 2011/0169938 A1 | 7/2011 | Webster et al. |
| 2011/0178727 A1 | 7/2011 | Hafenrichter et al. |
| 2011/0222170 A1 | 9/2011 | Tanimura |
| 2011/0231013 A1 | 9/2011 | Smoot et al. |
| 2011/0253470 A1 | 10/2011 | Fischer |
| 2011/0270705 A1 | 11/2011 | Parker |
| 2012/0116583 A1 | 5/2012 | Beard et al. |
| 2012/0186874 A1 | 7/2012 | Malone et al. |
| 2012/0215348 A1 | 8/2012 | Skrinde |
| 2012/0215355 A1 | 8/2012 | Bewley et al. |
| 2012/0218868 A1 | 8/2012 | Kahn et al. |
| 2012/0238389 A1 | 9/2012 | Schoon |
| 2012/0255360 A1 | 10/2012 | Tippit et al. |
| 2012/0257042 A1 | 10/2012 | McKaigue et al. |
| 2012/0271673 A1 | 10/2012 | Riley |
| 2012/0273284 A1 | 11/2012 | Nesnas et al. |
| 2012/0297882 A1 | 11/2012 | Palma et al. |
| 2013/0024067 A1 | 1/2013 | Troy et al. |
| 2013/0070068 A1 | 3/2013 | Garvey, III et al. |
| 2013/0140801 A1 | 6/2013 | Schlee et al. |
| 2013/0142297 A1 | 6/2013 | Dean et al. |
| 2013/0166193 A1 | 6/2013 | Goldman et al. |
| 2013/0218490 A1 | 8/2013 | Poirier et al. |
| 2013/0289766 A1 | 10/2013 | Hafenrichter et al. |
| 2013/0317676 A1 | 11/2013 | Cooper et al. |
| 2013/0340529 A1 | 12/2013 | Lama |
| 2014/0069193 A1 | 3/2014 | Graham et al. |
| 2014/0076642 A1 | 3/2014 | Gettings et al. |
| 2014/0115860 A1 | 5/2014 | Sarh et al. |
| 2014/0188649 A1 | 7/2014 | Messinger et al. |
| 2014/0230711 A1 | 8/2014 | Lovelace et al. |
| 2014/0268176 A1 | 9/2014 | Hundstad et al. |
| 2014/0278221 A1 | 9/2014 | Troy et al. |
| 2014/0305216 A1 | 10/2014 | Hafenrichter et al. |
| 2014/0320640 A1 | 10/2014 | Barbier et al. |
| 2014/0350722 A1 | 11/2014 | Skrinde |
| 2015/0046018 A1 | 2/2015 | Hayashi et al. |
| 2015/0151572 A1 | 6/2015 | Parrott et al. |
| 2015/0151797 A1 | 6/2015 | Outa et al. |
| 2015/0153170 A1 | 6/2015 | Gonzalez et al. |
| 2015/0153312 A1 | 6/2015 | Gonzalez et al. |
| 2015/0177194 A1 | 6/2015 | Xu et al. |
| 2015/0226369 A1 | 8/2015 | Troy et al. |
| 2015/0240984 A1 | 8/2015 | Choi et al. |

(56) References Cited

U.S. PATENT DOCUMENTS

| | | |
|---|---|---|
| 2015/0316195 A1 | 11/2015 | Penza et al. |
| 2015/0329221 A1 | 11/2015 | Georgeson et al. |
| 2015/0369916 A1 | 12/2015 | Nikolov et al. |
| 2016/0023696 A1 | 1/2016 | Hakes et al. |
| 2016/0033453 A1 | 2/2016 | Cegla et al. |
| 2016/0059939 A1 | 3/2016 | Lamonby et al. |
| 2016/0121486 A1 | 5/2016 | Lipinski et al. |
| 2016/0123933 A1 | 5/2016 | Fetzer et al. |
| 2016/0176452 A1 | 6/2016 | Gettings et al. |
| 2016/0231279 A1 | 8/2016 | Hoyt |
| 2016/0238565 A1 | 8/2016 | Gonzalez et al. |
| 2016/0268823 A1 | 9/2016 | Gonzalez et al. |
| 2016/0273992 A1 | 9/2016 | Frueh |
| 2016/0281910 A1 | 9/2016 | Troy et al. |
| 2016/0282877 A1 | 9/2016 | Gonzalez et al. |
| 2016/0318182 A1 | 11/2016 | Nakaya et al. |
| 2016/0334301 A1 | 11/2016 | Hafenrichter et al. |
| 2016/0349213 A1 | 12/2016 | Kollgaard et al. |
| 2017/0007336 A1 | 1/2017 | Tsuboi et al. |
| 2017/0108156 A1 | 4/2017 | Penza et al. |
| 2017/0191966 A1 | 7/2017 | Niri et al. |
| 2017/0199024 A1 | 7/2017 | Georgeson et al. |
| 2017/0221454 A1 | 8/2017 | Kim et al. |
| 2017/0225804 A1 | 8/2017 | Hafenrichter et al. |
| 2017/0305261 A1 | 10/2017 | Meager |
| 2017/0321790 A1 | 11/2017 | Klassen et al. |
| 2017/0334241 A1 | 11/2017 | Gonzalez et al. |
| 2017/0347624 A1 | 12/2017 | Jorgensen et al. |
| 2018/0009113 A1 | 1/2018 | Lauder et al. |
| 2018/0011462 A1 | 1/2018 | Bolin et al. |
| 2018/0024561 A1 | 1/2018 | Soh et al. |
| 2018/0036890 A1 | 2/2018 | Hollister |
| 2018/0059660 A1 | 3/2018 | Heatzig et al. |
| 2018/0065762 A1 | 3/2018 | Georgeson et al. |
| 2018/0073975 A1 | 3/2018 | Abdellatif et al. |
| 2018/0080904 A1 | 3/2018 | Al Nahwi et al. |
| 2018/0080905 A1 | 3/2018 | Al Nahwi et al. |
| 2018/0117718 A1 | 5/2018 | Rajagopalan et al. |
| 2018/0154954 A1 | 6/2018 | Bagheri et al. |
| 2018/0172121 A1 | 6/2018 | Potter et al. |
| 2018/0181136 A1* | 6/2018 | Loosararian .......... B25J 9/1666 |
| 2018/0232874 A1 | 8/2018 | Østervold et al. |
| 2018/0239313 A1 | 8/2018 | Santarone et al. |
| 2018/0245923 A1 | 8/2018 | Han |
| 2018/0267554 A1 | 9/2018 | Loosararian et al. |
| 2018/0275670 A1 | 9/2018 | Loosararian et al. |
| 2018/0275671 A1 | 9/2018 | Loosararian et al. |
| 2018/0275672 A1 | 9/2018 | Loosararian et al. |
| 2018/0275673 A1 | 9/2018 | Loosararian et al. |
| 2018/0275674 A1 | 9/2018 | Loosararian et al. |
| 2018/0275675 A1 | 9/2018 | Loosararian et al. |
| 2018/0284794 A1 | 10/2018 | Loosararian et al. |
| 2018/0284795 A1 | 10/2018 | Loosararian et al. |
| 2018/0284796 A1 | 10/2018 | Loosararian et al. |
| 2018/0284797 A1 | 10/2018 | Loosararian et al. |
| 2018/0292838 A1 | 10/2018 | Loosararian et al. |
| 2018/0313715 A1 | 11/2018 | Cichosz et al. |
| 2018/0322699 A1 | 11/2018 | Gray et al. |
| 2019/0005465 A1 | 1/2019 | Taylor et al. |
| 2019/0015971 A1 | 1/2019 | Carrasco Zanini et al. |
| 2019/0017656 A1 | 1/2019 | Carrasco Zanini et al. |
| 2019/0018080 A1 | 1/2019 | Marauska et al. |
| 2019/0022848 A1 | 1/2019 | Akin et al. |
| 2019/0022849 A1 | 1/2019 | Akin et al. |
| 2019/0022877 A1 | 1/2019 | Akin et al. |
| 2019/0025851 A1 | 1/2019 | Ebrahimi Afrouzi |
| 2019/0046373 A1 | 2/2019 | Coulter et al. |
| 2019/0056541 A1 | 2/2019 | Roberts et al. |
| 2019/0086020 A1 | 3/2019 | Wehlin et al. |
| 2019/0118881 A1 | 4/2019 | Mcginn |
| 2019/0128851 A1 | 5/2019 | Wells |
| 2019/0128856 A1 | 5/2019 | Spay et al. |
| 2019/0152544 A1 | 5/2019 | Outa |
| 2019/0162703 A1 | 5/2019 | Melandsøet al. |
| 2019/0196020 A1 | 6/2019 | Aceti et al. |
| 2019/0242728 A1 | 8/2019 | Low et al. |
| 2019/0242743 A1 | 8/2019 | Patel et al. |
| 2019/0346034 A1 | 11/2019 | Noda |
| 2019/0360976 A1 | 11/2019 | Frueh et al. |
| 2019/0368594 A1 | 12/2019 | Sakata |
| 2019/0388998 A1 | 12/2019 | Huggett et al. |
| 2020/0011840 A1 | 1/2020 | Hafenrichter et al. |
| 2020/0133285 A1 | 4/2020 | Xiong et al. |
| 2020/0159237 A1 | 5/2020 | Loosararian et al. |
| 2020/0173879 A1 | 6/2020 | Morris et al. |
| 2020/0175667 A1 | 6/2020 | Morris et al. |
| 2020/0254615 A1 | 8/2020 | Bryner et al. |
| 2020/0262052 A1 | 8/2020 | Bryner et al. |
| 2020/0262066 A1 | 8/2020 | Bryner et al. |
| 2020/0262067 A1 | 8/2020 | Bryner et al. |
| 2020/0262072 A1 | 8/2020 | Bryner et al. |
| 2020/0262077 A1 | 8/2020 | Bryner et al. |
| 2020/0262261 A1 | 8/2020 | Loosararian et al. |
| 2020/0264614 A1 | 8/2020 | Bryner et al. |
| 2020/0264615 A1 | 8/2020 | Bryner et al. |
| 2020/0306969 A1 | 10/2020 | Bryner et al. |
| 2020/0310456 A1 | 10/2020 | Loosararian et al. |
| 2020/0393418 A1 | 12/2020 | Fetzer et al. |
| 2021/0001484 A1 | 1/2021 | Bogart et al. |
| 2021/0025852 A1 | 1/2021 | Howland |
| 2021/0060782 A1 | 3/2021 | Bryner et al. |
| 2021/0060783 A1 | 3/2021 | Bryner et al. |
| 2021/0162588 A1 | 6/2021 | Yi et al. |
| 2021/0310597 A1 | 10/2021 | Takashima et al. |
| 2021/0336924 A1 | 10/2021 | Katoh |
| 2022/0011777 A1 | 1/2022 | Loosararian et al. |
| 2022/0019190 A1 | 1/2022 | Mohamed Shibly et al. |
| 2022/0083129 A1 | 3/2022 | Factor et al. |
| 2022/0169072 A1 | 6/2022 | Abdellatif et al. |
| 2022/0196445 A1 | 6/2022 | Low et al. |
| 2022/0214315 A1 | 7/2022 | Serrill et al. |
| 2022/0222856 A1 | 7/2022 | Tang et al. |
| 2022/0268741 A1 | 8/2022 | Boerner et al. |
| 2022/0331945 A1 | 10/2022 | Bryner et al. |
| 2022/0331949 A1 | 10/2022 | Bryner et al. |
| 2022/0331978 A1 | 10/2022 | Bryner et al. |
| 2022/0331979 A1 | 10/2022 | Jourde et al. |
| 2022/0331980 A1 | 10/2022 | Jourde et al. |
| 2022/0331981 A1 | 10/2022 | Bryner et al. |
| 2022/0331982 A1 | 10/2022 | Jourde et al. |
| 2022/0331983 A1 | 10/2022 | Bryner et al. |
| 2022/0331984 A1 | 10/2022 | Bryner et al. |
| 2022/0331985 A1 | 10/2022 | Jourde et al. |
| 2022/0331986 A1 | 10/2022 | Bryner et al. |
| 2022/0331987 A1 | 10/2022 | Bryner et al. |
| 2022/0331988 A1 | 10/2022 | Bryner et al. |
| 2022/0334087 A1 | 10/2022 | Jourde et al. |
| 2022/0334582 A1 | 10/2022 | Bryner et al. |
| 2022/0341886 A1 | 10/2022 | David et al. |
| 2022/0341887 A1 | 10/2022 | David et al. |
| 2022/0341888 A1 | 10/2022 | David et al. |
| 2022/0341889 A1 | 10/2022 | David et al. |
| 2022/0341890 A1 | 10/2022 | David et al. |
| 2022/0341891 A1 | 10/2022 | David et al. |
| 2022/0341892 A1 | 10/2022 | David et al. |
| 2022/0373122 A1 | 11/2022 | Song et al. |
| 2023/0003687 A1 | 1/2023 | Vaganay et al. |
| 2023/0044908 A1 | 2/2023 | Jourde et al. |
| 2023/0075455 A1 | 3/2023 | Zahdeh et al. |
| 2023/0087654 A1 | 3/2023 | Bryner et al. |
| 2023/0128262 A1 | 4/2023 | Colaw et al. |
| 2023/0153989 A1 | 5/2023 | Ryan et al. |
| 2023/0228719 A1 | 7/2023 | David et al. |
| 2023/0333566 A1 | 10/2023 | Loosararian et al. |
| 2023/0341865 A1 | 10/2023 | Loosararian et al. |
| 2023/0390930 A1 | 12/2023 | Loosararian et al. |
| 2024/0100717 A1 | 3/2024 | Bryner et al. |
| 2024/0112100 A1 | 4/2024 | Bryner et al. |
| 2024/0208288 A1 | 6/2024 | Harada et al. |
| 2024/0215168 A1 | 6/2024 | Jourde et al. |
| 2024/0255471 A1 | 8/2024 | David et al. |
| 2024/0316775 A1 | 9/2024 | Pinero et al. |
| 2024/0345036 A1 | 10/2024 | David et al. |
| 2024/0345580 A1 | 10/2024 | Loosararian et al. |

(56) References Cited

U.S. PATENT DOCUMENTS

| | | |
|---|---|---|
| 2025/0033212 A1 | 1/2025 | Pinero et al. |
| 2025/0172527 A1 | 5/2025 | David et al. |
| 2025/0244296 A1 | 7/2025 | Low et al. |
| 2025/0249573 A1 | 8/2025 | Low et al. |
| 2025/0251369 A1 | 8/2025 | Low et al. |
| 2025/0256390 A1 | 8/2025 | Low et al. |

FOREIGN PATENT DOCUMENTS

| | | | |
|---|---|---|---|
| CN | 101368932 A | 2/2009 | |
| CN | 102356311 A | 2/2012 | |
| CN | 105150834 A | 12/2015 | |
| CN | 205503912 U | 8/2016 | |
| CN | 111844109 A | 10/2020 | |
| CN | 112539749 A * | 3/2021 | G01C 21/165 |
| CN | 112907656 A * | 6/2021 | G01B 11/002 |
| CN | 112917483 A | 6/2021 | |
| CN | 113319839 A | 8/2021 | |
| CN | 114738598 A | 7/2022 | |
| CN | 115314996 A * | 11/2022 | H04B 17/318 |
| DE | 009206011 U1 | 7/1992 | |
| DE | 10300383 A1 | 7/2004 | |
| DE | 102016117237 A1 | 3/2018 | |
| EP | 1107442 A3 | 12/2003 | |
| EP | 1742049 A2 | 1/2007 | |
| EP | 1870313 A2 | 12/2007 | |
| EP | 1744157 B1 | 9/2015 | |
| FR | 2861457 A1 | 4/2005 | |
| FR | 2970199 A1 | 7/2012 | |
| GB | 548910 A | 10/1942 | |
| JP | 6018640 A | 1/1985 | |
| JP | 61090052 | 5/1986 | |
| JP | 61144503 A | 7/1986 | |
| JP | 11211707 | 8/1999 | |
| JP | H11305017 A | 11/1999 | |
| JP | 3592084 B2 | 9/2004 | |
| JP | 2006219048 A | 8/2006 | |
| JP | 2007302075 A | 11/2007 | |
| JP | 2019138782 A | 8/2019 | |
| JP | 2020527472 A | 9/2020 | |
| JP | 2022049170 A | 3/2022 | |
| KR | 200410388 Y1 | 3/2006 | |
| KR | 200431177 Y1 | 11/2006 | |
| KR | 200438708 Y1 | 2/2008 | |
| KR | 20100078898 A | 7/2010 | |
| KR | 20110033609 A | 3/2011 | |
| KR | 20140040692 A | 4/2014 | |
| KR | 20150123371 A | 11/2015 | |
| KR | 101775114 B1 * | 9/2017 | B25J 9/1656 |
| KR | 102200583 B1 | 1/2021 | |
| KR | 102263144 B1 | 6/2021 | |
| KR | 102263706 B1 | 6/2021 | |
| KR | 102381365 B1 | 4/2022 | |
| WO | 03087733 A2 | 10/2003 | |
| WO | 2006066139 A2 | 6/2006 | |
| WO | 2006114485 A1 | 11/2006 | |
| WO | 2007082594 A2 | 7/2007 | |
| WO | 2009086495 A2 | 7/2009 | |
| WO | 2015059916 A1 | 4/2015 | |
| WO | 2015152198 A1 | 10/2015 | |
| WO | 2016051147 A1 | 4/2016 | |
| WO | 2018119450 A1 | 6/2018 | |
| WO | 2018146279 A1 | 8/2018 | |
| WO | 2019204504 A1 | 10/2019 | |
| WO | 2020185719 A2 | 9/2020 | |
| WO | 2020185719 A3 | 10/2020 | |
| WO | 2022202365 A1 | 9/2022 | |
| WO | 2022225725 A1 | 10/2022 | |
| WO | 2022226222 A1 | 10/2022 | |
| WO | 2023102637 A1 | 6/2023 | |
| WO | PCT/US2023/075691 | 10/2023 | |
| WO | PCT/US2023/075722 | 10/2023 | |
| WO | PCT/US2023/077835 | 10/2023 | |
| WO | PCT/US2023/078409 | 11/2023 | |
| WO | PCT/US2023/085922 | 12/2023 | |
| WO | 2024073767 A1 | 4/2024 | |
| WO | 2024073771 A2 | 4/2024 | |
| WO | 2024073771 A3 | 5/2024 | |
| WO | 2024092081 A1 | 5/2024 | |
| WO | 2024097795 A2 | 5/2024 | |
| WO | 2024097795 A3 | 6/2024 | |
| WO | 2024138219 A2 | 6/2024 | |
| WO | 2024138219 A3 | 7/2024 | |
| WO | 2024254593 A2 | 12/2024 | |
| WO | 2024254597 A1 | 12/2024 | |
| WO | 2024259133 A2 | 12/2024 | |
| WO | 2024254593 A3 | 1/2025 | |
| WO | 2024259133 A3 | 4/2025 | |
| WO | 2025136451 A1 | 6/2025 | |
| WO | 2025137562 A1 | 6/2025 | |

OTHER PUBLICATIONS

English translation for reference KR101775114 (Year: 2017).*
English translation for reference CN115314996 (Year: 2022).*
U.S. Appl. No. 18/479,624, filed Oct. 2, 2023, Pending, Edward A. Bryner, et al.
U.S. Appl. No. 18/508,795, filed Nov. 14, 2023, Pending, Edward A. Bryner, et al.
U.S. Appl. No. 18/532,773, filed Dec. 7, 2023, Pending, Edward A. Bryner, et al.
U.S. Appl. No. 18/601,667, filed Mar. 11, 2024, Pending, Dillon R. Jourde, et al.
U.S. Appl. No. 18/602,689, filed Mar. 12, 2024, Pending, Chase David, et al.
U.S. Appl. No. 18/602,829, filed Mar. 12, 2024, Pending, Chase David, et al.
"All Metals Fabrication", Painting Metal, Aug. 27, 2015, 7 pages.
"Coordinate Systems in Two and Three Dimensions", Oregon State University, Department of Mathematics, 2015, 3 pages.
"Horizontal definition", Merriam-Webster Dictionary, 2014, 1 page.
"International Federation of Robotics,", World Robotics, Chapter 1 section 2, 2016, 10 pages.
"Merriam-Webster", Definition of Pivot, 2015, 5 pages.
"Vertical Definition", Merriam Webster, 2014, 1 page.
"Yaskawa Motoman Robotics,", Robotics Glossary, 2019, 20 pages.
17884897.4, "European Application Serial No. 17884897.4, Extended European Search Report mailed Jun. 25, 2020", Gecko Robotics, Inc., 5 pages.
20769832.5, "European Application Serial No. 20769832.5, Extended European Search Report mailed Nov. 4, 2022", Gecko Robotics, Inc., 8 pages.
21201397.3, "European Application Serial No. 21201397.3, Extended European Search Report mailed May 11, 2022", Gecko Robotics, Inc., 12 pages.
AMS Controls, "Encoder Tracking and Mounting", 2015, 18 pages.
Bell, Stephanie , "Measurement Good Practice Guide A Beginner's Guide to Uncertainty of Measurement", National Physical Laboratory, Issue 2, 2001, 41 pages.
Berendsen, A.M , "Ship Painting: Current Practice and Systems in Europe", Technology Publishing Company, Sep. 1998, 10 pages.
Borenstein, Johann et al., "Where am I? Sensors and Methods for Mobile Robot Positioning", Retrieved from the Internet : URL :http://www-personal.umich.edu/~johannb/Papers/pos96rep.pdf, Apr. 22, 1996, pp. 1-282.
Cai, Mingxue et al., "A Novel Pipeline Inspection Robot with Two Angle-changeable Crawler Drive Modules", Proceedings of 2018 IEEE 8th Annual International Conference on CYBER Technology in Automation, Control, and Intelligent Systems, Jul. 2018, 6 pages.
Carlsten, Roy , "Understanding Corrosion and How to Protect Against It", manufacturing.net, Mar. 11, 2002, 8 pages.
Connor, David et al., "Improved dead reckoning using caster wheel sensing on a differentially steered 3-wheeled autonomous vehicle", Proceedings vol. 4195, Mobile Robots XV and Telemanipulator and Telepresence Technologies VII, 2001, 13 pages.
Curran, Patrick , "Make the right choice for metal coating for the right application", Design World, Jun. 2, 2016, 18 pages.

(56) References Cited

OTHER PUBLICATIONS

Felsch, Torsten et al., "Robotized Inspection of Vertical Structures of a Solar Power Plant Using NDT Techniques", doi:10.3390/robotics4020103, 2015, pp. 103-119.

Few, Stephen , "Practical Rules for Using Color in Charts", Perceptual Edge, Visual Business Intelligence Newsletter, Feb. 2008, 13 pages.

Fowler, Kenneth A. et al., "Theory and Application of Precious Ultrasonic Thickness Gaging", 2015, 12 pages.

General Electric, "BWCI Automated Boiler Wall Cleaning & Inspection", inspection-robotics.com, 2016, 4 pages.

Ginzel, et al., "Acoustic Properties of the Elastomeric Materials Aqualene and ACE", The e-Journal of Nondestructive Testing—ISSN 1435-4934, Dec. 2015, 13 pages.

Gonzalez, Carlos , "What's the Difference between Pneumatic, Hydraulic, and Electrical Actuators", Machine Design, 2015, 4 pages.

Guglielmelli, E. et al., "Avoiding obstacles by using a proximity US/IR sensitive skin", IEEE, 1993, pp. 2207-2214.

Haitao, et al., "Simulation, Test and Analysis of Three-phase Short-Circuit Braking in IGCT-based MV Adjustable Speed Drive Systems", 2005 International Conference on Electrical Machines and Systems, Nanjing, China, IEEE, 2005, pp. 1437-1441.

Harrison, David M. , "Uncertainty in Physical Measurements", Module 4—Repeated Measurements, Dept. of Physics, Univ. of Toronto, 2015, 18 pages.

Hutter, Marco et al., "Force Control for Active Chassis Balancing", IEEE/ASME Transactions on Mechatronics, vol. 22, No. 2, Apr. 2017, 10 pages.

Lebowitz, Carol A. et al., "Ultrasonic Measurement of Pipe Thickness", Review of Progress in Quantitative Nondestructive Evaluation, vol. 12, 1987, 8 pages.

Lee, Giuk et al., "Combot: Compliant Climbing Robotic Platform with Transitioning Capability and Payload Capacity", IEEE International Conference on Robotics and Automation RiverCentre, Saint Paul, Minnesota,, 2012, 6 pages.

Lins, Romulo G et al., "Autonomous Robot System for Inspection of Defects in Civil Infrastructures", IEEE, 2016, pp. 1414-1422.

Lion Precision, "Understanding Sensor Resolution Specifications and Performance", TechNote, LT05-0010, 2014, pp. 1-6.

Martinez, Angelo et al., "Fuzzy logic based collision avoidance for a mobile robot", IEEE, 1993, pp. 66-69.

Mims, Christopher , "America's Bridges, Factories and Highways Are in Dire Need of Repairs. Bring in the Robots.", The Wall Street Journal, available at https://www.wsj.com/tech/inspection-robots-infrastructure-ebb4172c, Aug. 2023, 5 pages.

Miskon, Muhammad F. et al., "Close Range Inspection Using Novelty Detection Results", Intelligent Robotic Research Center (IRRC), Monash University, Australia, ICIRA2009, LNAI 5928,, 2009, pp. 947-956.

Myers, Brad A. , "The importance of percent-done progress indicators for computer-human interfaces", Proceedings of the SIGCHI conference on Human factors in computing systems., CHI '85. ACM, New York, NY., 1985, pp. 11-17.

National Geographic, "Encyclopedic Entry Location", 2016, 3 pages.

NDT Resource Center, "NDT Glossary D", Webpage, 2016, 4 pages.

NDT Resource Center, "NDT Glossary R", Webpage, 2016, 5 pages.

NDT Resource Center, "Transducer Types", Webpage, 2005, 1 page.

NIDEC, "Flexwave Catalog", 2018, 52 pages.

Olympus, "BondMaster Probes and Accessories Catalog", Catalog, 2008, 24 pages.

Olympus, "Flaw Detectors Delay Line", Olympus, Flaw Detectors Delay Line, 2014, Jan. 9, 2014, 1 page.

Olympus, "Ultrasonic Transducers Technical Notes", Notes, 2006, 11 pages.

Openstax College, "College Physics Textbook Equity Edition", vol. 1 of 3: Chapters 1 -12, Chapter 9 pages 294, 2013, 464 pages.

Papadimitriou, Vasileious et al., "An adaptable and self-calibrating service robotic nozzle-vessel welds", 2012 2nd International Conference on Applied Robotics for the Power Industry (CARPI), 2012, 6 pages.

Parallax Tutorial, "Going the Distance—Using the Drive Distance Block Encoders and Motor Gearing", 2017, 5 pages.

PCT/US17/68326, "International Application Serial No. PCT/US17/68326, International Preliminary Report on Patentability mailed Jul. 4, 2019", Gecko Robotics, Inc., 11 pages.

PCT/US20/21779, "International Application Serial No. PCT/US20/21779, International Preliminary Report on Patentability mailed Sep. 23, 2021", Gecko Robotics, Inc., 13 pages.

PCT/US20/21779, "International Application Serial No. PCT/US20/21779, International Search Report and Written Opinion mailed Sep. 2, 2020", Gecko Robotics, Inc., 14 pages.

PCT/US20/21779, "International Application Serial No. PCT/US20/21779, Invitation to Pay Additional Fees and, Where Applicable, Protest Fee mailed Jul. 9, 2020", Gecko Robotics, Inc., 2 pages.

PCT/US2017/068326, "International Application Serial No. PCT/US2017/068326, International Search Report and Written Opinion mailed May 4, 2018", Gecko Robotics, Inc., 14 pages.

PCT/US2017068326, "International Application Serial No. PCT/US2017068326, Invitation to Pay Additional Fees and, Where Applicable, Protest Fee mailed Feb. 27, 2018", Gecko Robotics, Inc., 2 Pages.

PCT/US2019/027958, "International Application Serial No. PCT/US2019/027958, International Preliminary Report on Patentability mailed Oct. 29, 2020", Gecko Robotics, Inc., 8 pages.

PCT/US2019/027958, "International Application Serial No. PCT/US2019/027958, International Search Report and Written Opinion mailed Jul. 16, 2019", Gecko Robotics, Inc., 9 pages.

PCT/US2022/023993, "International Application Serial No. PCT/US2022/023993, International Preliminary Report on Patentability mailed Nov. 2, 2023", Gecko Robotics, Inc., 28 pages.

PCT/US2022/023993, "International Application Serial No. PCT/US2022/023993, International Search Report and Written Opinion mailed Aug. 24, 2022", Gecko Robotics, Inc., 31 pages.

PCT/US2022/023993, "International Application Serial No. PCT/US2022/023993, Invitation to Pay Additional Fees and, Where Applicable, Protest Fee mailed Jun. 16, 2022", Gecko Robotics, Inc., 3 pages.

PCT/US2022/025816, "International Application Serial No. PCT/US2022/025816, International Preliminary Report on Patentability mailed Oct. 24, 2023", Gecko Robotics, Inc., 30 pages.

PCT/US2022/025816, "International Application Serial No. PCT/US2022/025816, International Search Report and Written Opinion mailed Sep. 28, 2022", Gecko Robotics, Inc, 33 pages.

PCT/US2022/025816, "International Application Serial No. PCT/US2022/025816, Invitation to Pay Additional Fees and, Where Applicable, Protest Fee mailed Jul. 8, 2022", Gecko Robotics, Inc., 3 pages.

PCT/US2023/075691, "International Application Serial No. PCT/US2023/075691, International Search Report and Written Opinion mailed Feb. 7, 2024", Gecko Robotics, Inc., 9 pages.

PCT/US2023/075722, "International Application Serial No. PCT/US2023/075722, International Search Report and Written Opinion mailed Mar. 1, 2024", International Search Report and Written Opinion, 38 pages.

PCT/US2023/075722, "International Application Serial No. PCT/US2023/075722, Invitation to Pay Additional Fees and, Where Applicable, Protest Fee mailed Dec. 12, 2023", Gecko Robotics, Inc., 3 pages.

Reinhold, Reif , "Machine Translation DE 10300383", 2019, 4 pages.

Sabatini, Angelo M. et al., "Correlation Techniques for Digital Time-of-Flight Measurement by Airborne Ultrasonic Rangefinders", Published in: Proceedings of IEEE/RSJ International Conference on Intelligent Robots and Systems (IROS'94), Date of Conference: Sep. 12-16, 1994,, 1994, pp. 2168-2175.

Salik, John et al., "Pipe Inspections: Robotic Laser Profiling Demystified", National Precast Concrete Association, Apr. 1, 2013, 12 pages.

(56)                    References Cited

OTHER PUBLICATIONS

Schroeder, S C. et al., "Ultrasonic Culvert Thickness Determination", US Army Armament Research Development and Engineering, Technical Report ARCCB-TR-95027, 1995, 36 pages.
Sirken, Aaron et al., "Bridge Risk Investigation Diagnostic Grouped Exploratory (Bridge)", IEEE/RSJ International Conference on Intelligent Robots and Systems (IROS), Sep. 24-28, 2017, Vancouver, BC, Canada (Year: 2017), 2017, 7 pages.
Smith, Oliver et al., "Machine Translation KR20140040692A", Apr. 3, 2014, 18 pages.
Stepson, W.A.V et al., "Design and Development of a Mobile Crawling Robot with Novel Halbach Array Based Magnetic Wheels", IEEE/ RSJ International Conference on Intelligent Robots and Systems (IROS), Vancouver, BC, Canada, Sep. 2017, 6 pages.
Svilainis, Linas , "Review of high resolution time of flight estimation techniques for ultrasonic signals,", Sep. 2013Conference: NDT 2013At: Telford Project: In-SMART, 2013, 13 pages.
Takero, Hongo et al., "An Automatic Guidance System of a Self-Controlled Vehicle", In: "Autonomous Robot Vehicles", Jan. 1, 1990 (Jan. 1, 1990), Springer New York, New York, NY,, Retrieved from the Internet: URL:https://ieeexplore.ieee.org/stampPDF/getPDF. jsp?tp=&arnumber=4158818&ref=aHR0cHM6Ly9pZWVleHBsb3 JlLmllZWUub3JnL2RvY3VtZW50LzQxNTg4MTg=, Jan. 1, 1990, pp. 32-37.
Tufte, Edward R. , "The Visual Display of Quantitative Information", Published By Graphics Press LLC, Second edition, fifth printing, Aug. 2007, 191 pages.
Ueura, Keiji et al., "Development of the Harmonic Drive Gear for Space Applications", 1999, 6 pages.
Wisegeek, "What is an Articulated Robot?", Webpage, 2015, 4 pages.
Xing, et al., "Design and Realization of DC Motor Speed Measurement and Control Based on an Electromagnetic Sensor", Atlantis Press, DOI10.2991/cisia-15.2015.69, 2015, 4 pages.
Yasuda, Gen'ichi , "Behavior-based autonomous cooperative control of intelligent mobile robot systems with embedded Petri nets", IEEE, 2014, pp. 1085-1090.
Zhao, B. et al., "Estimation of ultrasound attenuation and dispersion using short time Fourier transform,", Ultrasonics 43 (2005) 375-381, 2005, pp. 375-381.
Zhang, Lei et al., "Analysis of Traveling-capability and Obstacle-climbing Capability for Radially Adjustable Tracked Pipeline Robot", Proceedings of the 2016 IEEE International Conference on Robotics and Biomimetics Gingdao, China, Dec. 2016, 6 pages.
Zhang, Lei et al., "Stable Motion Analysis and Verification of a Radial Adjustable Pipeline Robot", Proceedings of the 2016 IEEE International Conference on Robotics and Biomimetics Oingdao, China, Dec. 2016, 6 pages.
"Reflectors, Maximum accuracy and range, Hexagon Geosystems, Leica Geosystems, https://leica-geosystems.com/products/total-stations/accessories/reflectors", available at https://web.archive.org/web/20160303225554/http://leica-geosystems.com:80/products/total-stations/accessories/reflectors, Together With Enlarged Copy of Text, Mar. 3, 2016, 4 pages.
"Reflectors, Maximum accuracy and range, Hexagon Geosystems, Leica Geosystems, https://leica-geosystems.com/products/total-stations/accessories/reflectors", available at https://web.archive.org/web/20220524042219/https://leica-geosystems.com/products/total-stations/accessories/reflectors, Together With Enlarged Text, May 24, 2022, 4 pages.
"European Application Serial No. 22792205.1, Extended European Search Report mailed Feb. 6, 2025", Gecko Robotics, Inc., 10 pages.
"European Application Serial No. 22792521.1, Extended European Search Report mailed Mar. 19, 2025", Gecko Robotics, Inc., 8 pages.
"European Application Serial No. 25151033.5, Extended European Search Report mailed Jun. 20, 2025", Gecko Robotics, Inc., 9 pages.
Chen, et al., "Laser Micromachined Flexible Ultrasound Line Array and Subplanar Multimodal Imaging Applications", retrieved on

[Oct. 16, 2024]. Retrieved from the internet <URL: https://ieeexplore. ieee.org/absbact/document/9819962 > entire document, Jul. 8, 2022.
Edlinger, et al., "MARC—Modular Autonomous Adaptable Robot Concept", 2019 IEEE International Symposium on Safety, Security, and Rescue Robotics (SSRR), IEEE, Sep. 2, 2019, pp. 1-7.
"European Patent Specification (Year: 2017)".
Zwicker, et al., "A Modular Inspection Robot Platform for Power Plant Applications", IEEE, 2010 1st International Conference on Applied Robotics for the Power Industry Delta Centre-Ville Montreal, Canada, 2010, 6 pages.
"International Application Serial No. PCT/US2023/075691, International Preliminary Report on Patentability mailed Apr. 10, 2025", Gecko Robotics, Inc., 7 pages.
"International Application Serial No. PCT/US2023/075722, International Preliminary Report on Patentability mailed Apr. 10, 2025", Gecko Robotics, Inc., 23 pages.
"International Application Serial No. PCT/US2023/077835, International Preliminary Report on Patentability mailed May 8, 2025", Gecko Robotics, Inc., 17 pages.
"International Application Serial No. PCT/US2023/077835, International Search Report and Written Opinion mailed Mar. 19, 2024", Gecko Robotics, Inc., 21 pages.
"International Application Serial No. PCT/US2023/077835, Invitation To Pay Additional Fees And, Where Applicable, Protest Fee mailed Jan. 23, 2024", Gecko Robotics, Inc., 3 pages.
"International Application Serial No. PCT/US2023/078409, International Preliminary Report On Patentability mailed May 15, 2025", Gecko Robotics, Inc., 13 pages.
"International Application Serial No. PCT/US2023/078409, International Search Report and Written Opinion mailed Mar. 28, 2024", Gecko Robotics, Inc., 17 pages.
"International Application Serial No. PCT/US2023/085922, International Search Report and Written Opinion mailed May 21, 2024", Gecko Robotics, Inc., 25 pages.
"International Application Serial No. PCT/US2023/085922, Invitation to Pay Additional Fee and Where Applicable Protest Fees, mailed Mar. 8, 2024", Gecko Robotics, Inc., 3 pages.
"International Application Serial No. PCT/US2024/033260, International Search Report and Written Opinion mailed Sep. 5, 2024", Gecko Robotics, Inc., 15 pages.
"International Application Serial No. PCT/US2024/033270, International Search Report and Written Opinion mailed Oct. 25, 2024", Gecko Robotics, Inc., 23 pages.
"International Application Serial No. PCT/US2024/033270, Invitation To Pay Additional Fees And, Where Applicable, Protest Fee mailed Aug. 28, 2024", Gecko Robotics, Inc., 4 pages.
"International Application Serial No. PCT/US2024/033851, International Search Report and Written Opinion mailed Nov. 7, 2024", Gecko Robotics, Inc., 21 pages.
"International Application Serial No. PCT/US2024/033851, Invitation to Pay Additional Fees and, Where Applicable, Protest Fee mailed Aug. 29, 2024", Gecko Robotics, Inc., 3 pages.
"International Application Serial No. PCT/US2024/035076, International Search Report and Written Opinion mailed Dec. 17, 20204", Gecko Robotics, Inc., 22 pages.
"International Application Serial No. PCT/US2024/035076, Invitation to Pay Additional Fees and, Where Applicable, Protest Fee mailed Sep. 20, 2024", Gecko Robotics, Inc., 3 pages.
"International Application Serial No. PCT/US2024/061446, International Search Report and Written Opinion mailed Apr. 24, 2025", Gecko Robotics, Inc., 29 pages.
"International Application Serial No. PCT/US2024/061446, Invitation to Pay Additional Fees and, Where Applicable, Protest Fee mailed Feb. 24, 2025", Gecko Robotics, Inc., 4 pages.
Roudsari, "Destructive and Robotic Assisted Non-Destructive Evaluation of Concrete Structures", <URL: https://dialog.proquest.com/professional/docview/2451414731/fulltextPDF/1909E9B91236ED61271/1accountid=139900&accountid=139900&t:ac=1909E9B91236ED61271/1&t:cp=maintain/resultcitationblocksdialog&t: zoneid=transactionalZone_72788c278028b, Dec. 31, 2020.

(56) References Cited

OTHER PUBLICATIONS

Sanchez-Cuevas, et al., "Robotic System for Inspection by Contact of Bridge Beams Using UAVs", Sensors 2019, 19, 305, 2019, 17 pages.

Zimmer Group, "Die Schnittstelle—Zimmer Group", Retrieved from the Internet: URL:https://web.archive.org/web/20210623063817/ https://www.zimmer-group.com/de/technologien-komponenten/ robotik/match-end-of-arm-ecosystem/die-schnittstelle, Jun. 23, 2021, pp. 1-6.

* cited by examiner

*4800*

BEGIN

*4802* OPERATE A PROFILING SENSOR

*4804* INTERPRET PROFILER DATA

*4806* PROVIDE A SHAPE DESCRIPTION FOR THE INSPECTION SURFACE

*4808* ADJUST AN INSPECTION OPERATION IN RESPONSE TO THE SHAPE DESCRIPTION

END

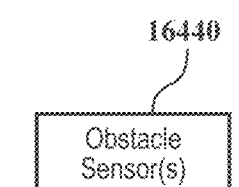
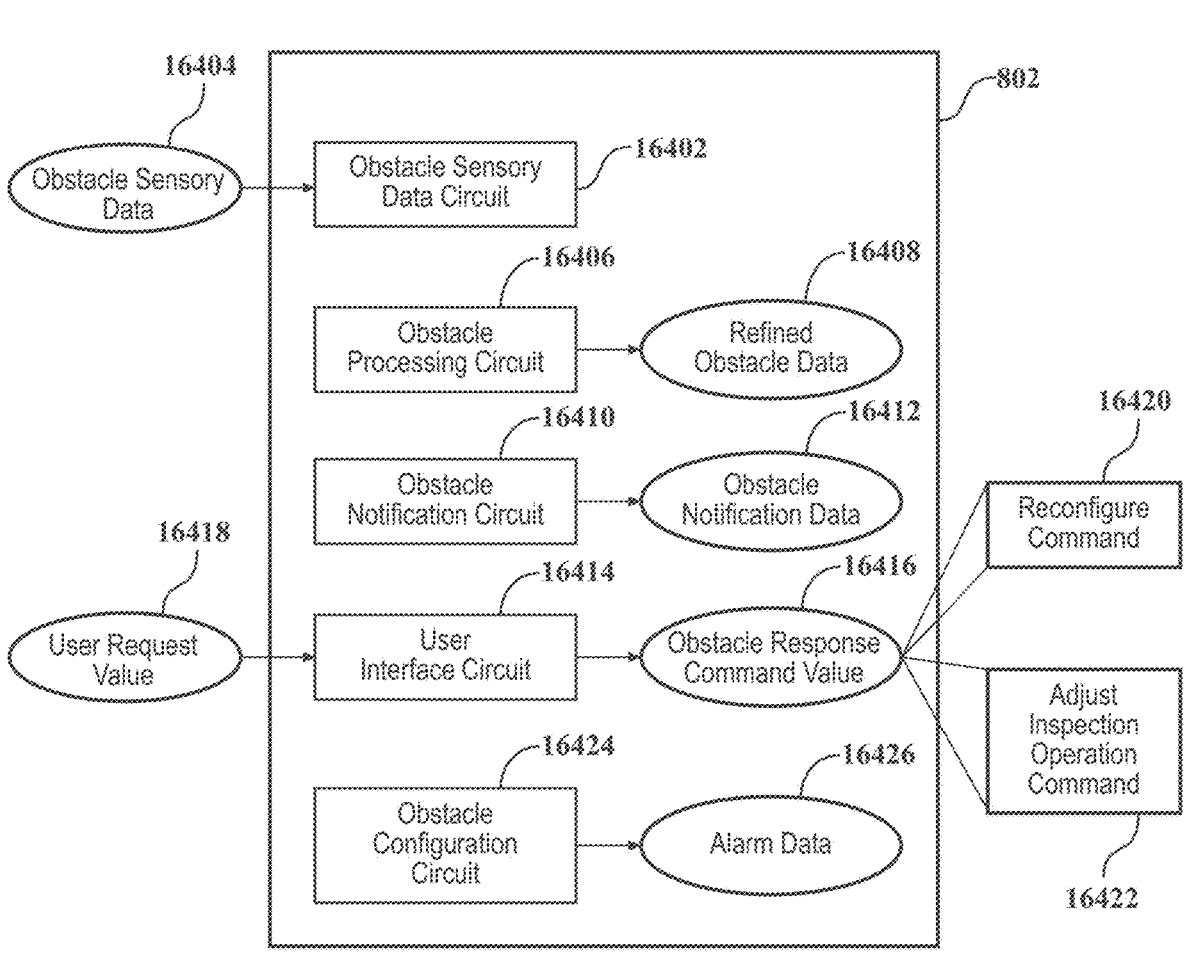
FIG. 20

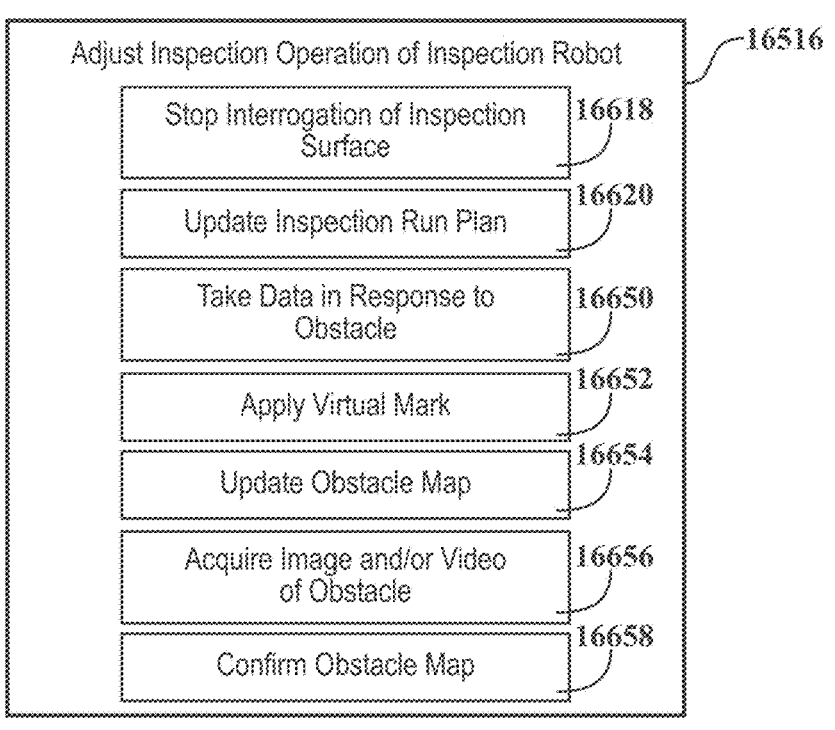

Adjust Inspection Operation of Inspection Robot — 16516

Stop Interrogation of Inspection Surface — 16618

Update Inspection Run Plan — 16620

Take Data in Response to Obstacle — 16650

Apply Virtual Mark — 16652

Update Obstacle Map — 16654

Acquire Image and/or Video of Obstacle — 16656

Confirm Obstacle Map — 16658

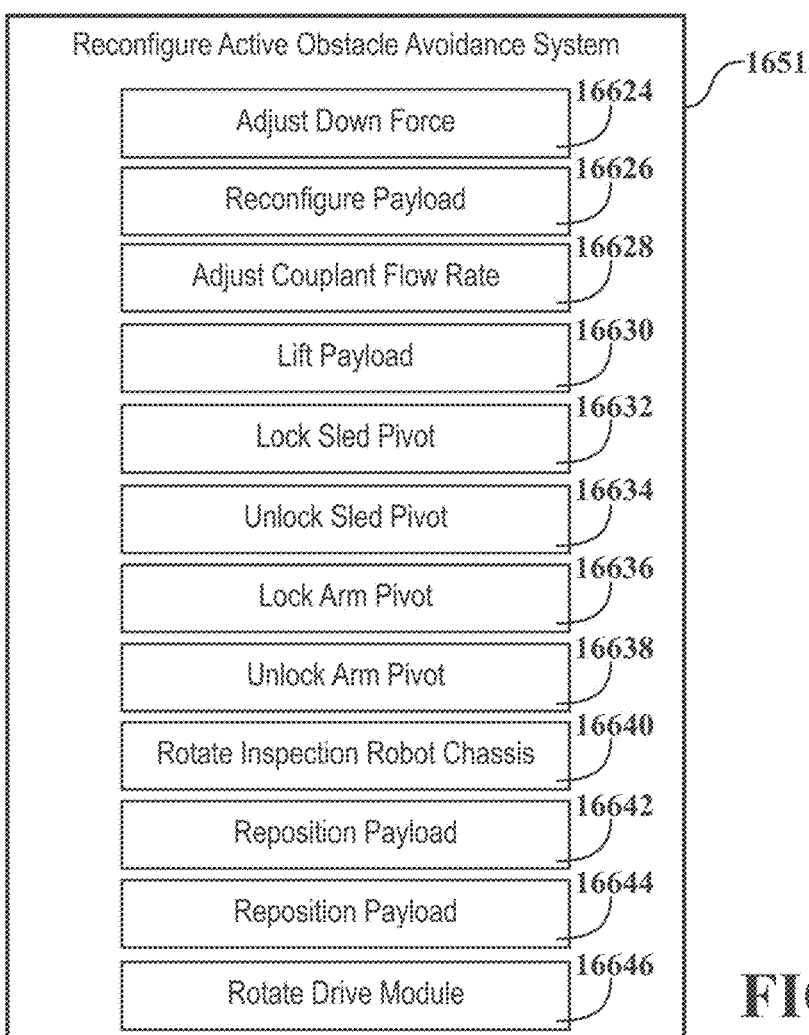

Reconfigure Active Obstacle Avoidance System — 16518

Adjust Down Force — 16624

Reconfigure Payload — 16626

Adjust Couplant Flow Rate — 16628

Lift Payload — 16630

Lock Sled Pivot — 16632

Unlock Sled Pivot — 16634

Lock Arm Pivot — 16636

Unlock Arm Pivot — 16638

Rotate Inspection Robot Chassis — 16640

Reposition Payload — 16642

Reposition Payload — 16644

Rotate Drive Module — 16646

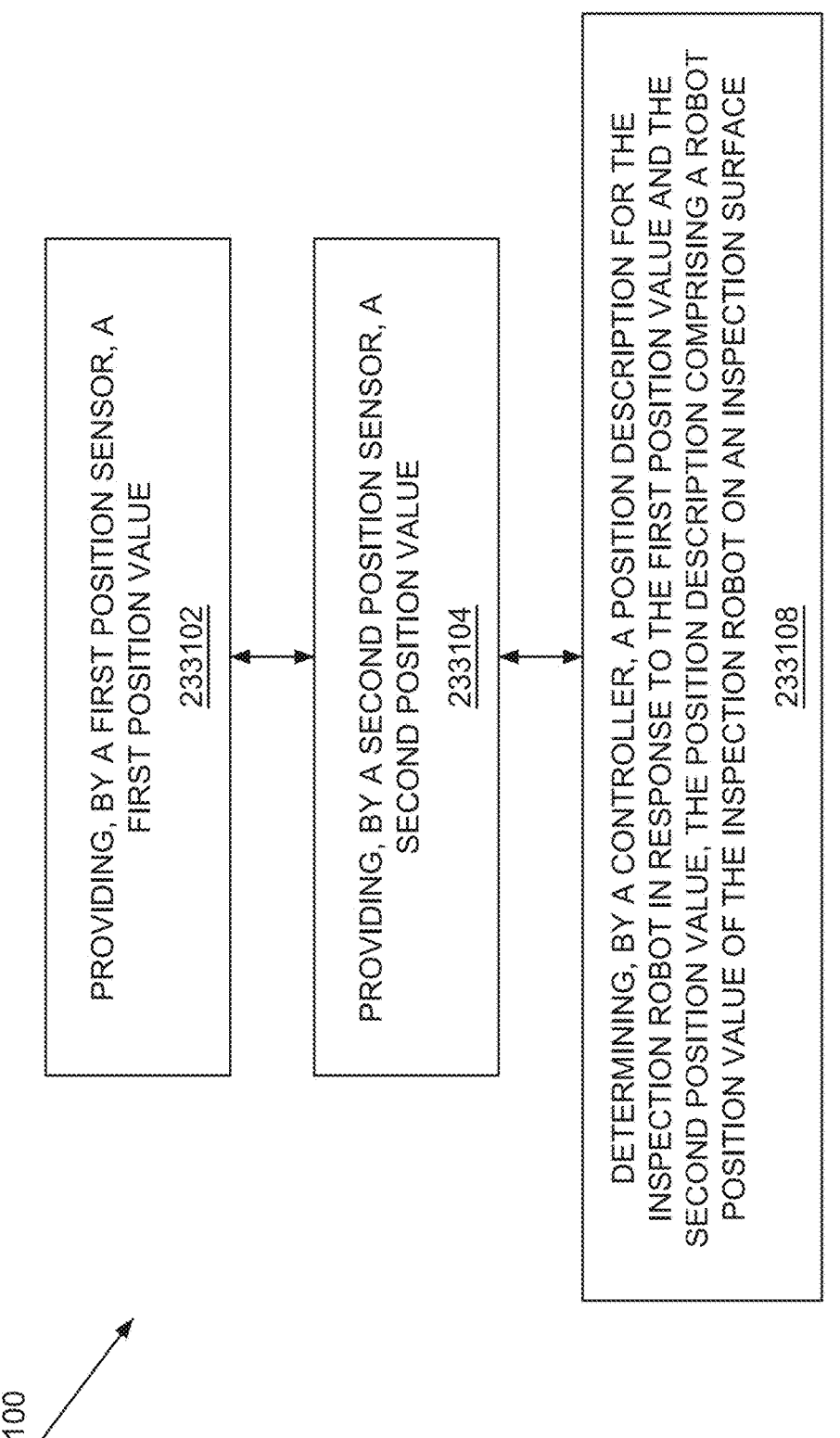

PROVIDING, BY A FIRST POSITION SENSOR, A FIRST POSITION VALUE
233102

PROVIDING, BY A SECOND POSITION SENSOR, A SECOND POSITION VALUE
233104

DETERMINING, BY A CONTROLLER, A POSITION DESCRIPTION FOR THE INSPECTION ROBOT IN RESPONSE TO THE FIRST POSITION VALUE AND THE SECOND POSITION VALUE, THE POSITION DESCRIPTION COMPRISING A ROBOT POSITION VALUE OF THE INSPECTION ROBOT ON AN INSPECTION SURFACE
233108

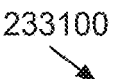

233100

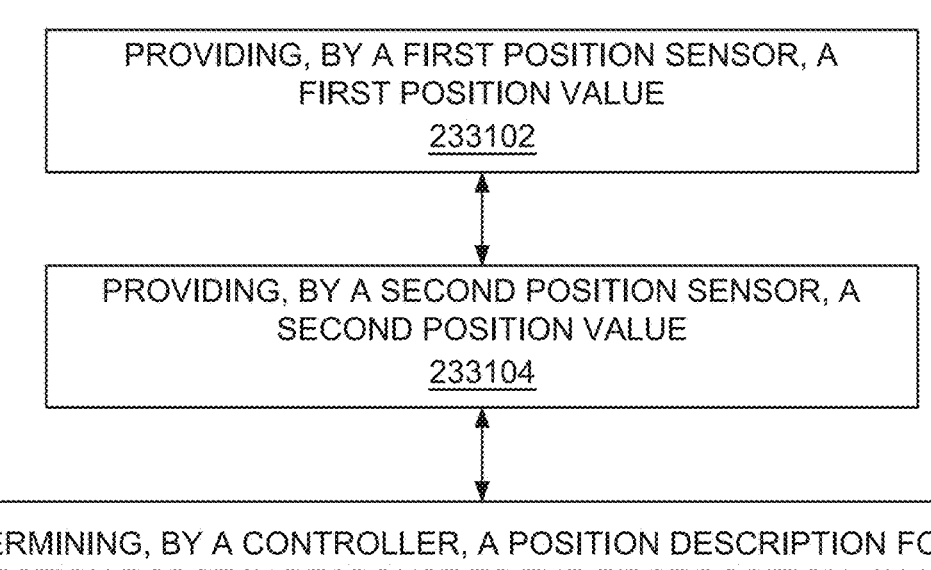

PROVIDING, BY A FIRST POSITION SENSOR, A
FIRST POSITION VALUE
233102

PROVIDING, BY A SECOND POSITION SENSOR, A
SECOND POSITION VALUE
233104

DETERMINING, BY A CONTROLLER, A POSITION DESCRIPTION FOR THE
INSPECTION ROBOT IN RESPONSE TO THE FIRST POSITION VALUE AND
THE SECOND POSITION VALUE, THE POSITION DESCRIPTION
COMPRISING A ROBOT POSITION VALUE OF THE INSPECTION ROBOT ON
AN INSPECTION SURFACE
233108

INTERPRETING, BY A COMPONENT LAYER IN THE CONTROLLER, THE
FIRST POSITION VALUE AND THE SECOND POSITION VALUE
234102

PROCESSING, BY A SUBSYSTEM LAYER IN THE CONTROLLER, THE
FIRST POSITION VALUE INTO A FIRST POSITION DESCRIPTOR
234104

PROCESSING, BY THE SUBSYSTEM LAYER, THE SECOND POSITION
VALUE INTO A SECOND POSITION DESCRIPTOR
234108

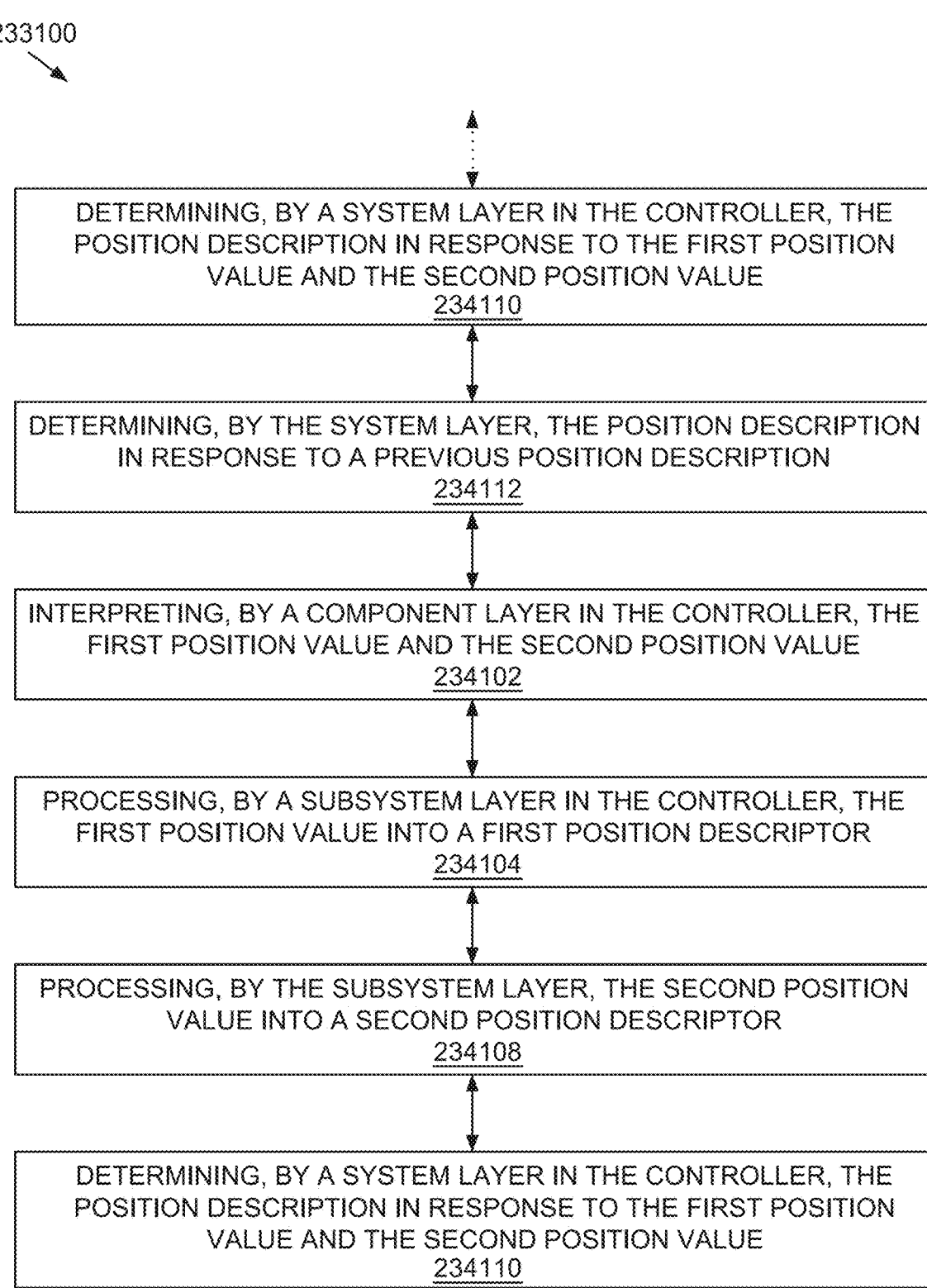

DETERMINING, BY A SYSTEM LAYER IN THE CONTROLLER, THE POSITION DESCRIPTION IN RESPONSE TO THE FIRST POSITION VALUE AND THE SECOND POSITION VALUE
234110

DETERMINING, BY THE SYSTEM LAYER, THE POSITION DESCRIPTION IN RESPONSE TO A PREVIOUS POSITION DESCRIPTION
234112

INTERPRETING, BY A COMPONENT LAYER IN THE CONTROLLER, THE FIRST POSITION VALUE AND THE SECOND POSITION VALUE
234102

PROCESSING, BY A SUBSYSTEM LAYER IN THE CONTROLLER, THE FIRST POSITION VALUE INTO A FIRST POSITION DESCRIPTOR
234104

PROCESSING, BY THE SUBSYSTEM LAYER, THE SECOND POSITION VALUE INTO A SECOND POSITION DESCRIPTOR
234108

DETERMINING, BY A SYSTEM LAYER IN THE CONTROLLER, THE POSITION DESCRIPTION IN RESPONSE TO THE FIRST POSITION VALUE AND THE SECOND POSITION VALUE
234110

FIG. 39

233100

DETERMINING, BY THE SYSTEM LAYER, THE POSITION DESCRIPTION IN RESPONSE TO: A FIRST COMPETENCE VALUE ASSOCIATED WITH THE FIRST POSITION VALUE, AND A SECOND COMPETENCE VALUE ASSOCIATED WITH THE SECOND POSITION VALUE
235102

DETERMINING, BY THE SUBSYSTEM LAYER, THE FIRST COMPETENCE VALUE IN RESPONSE TO AT LEAST ONE OF: AN OPERATING REGION OF THE FIRST POSITION SENSOR, AN OPERATING CONDITION OF THE INSPECTION ROBOT, AN INTEGRATED ERROR WALK ESTIMATE CORRESPONDING TO THE FIRST POSITION SENSOR, A FAULT VALUE ASSOCIATED WITH THE FIRST POSITION SENSOR, A FIRST CORRESPONDENCE VALUE FOR CORRESPONDENCE OF THE FIRST POSITION VALUE WITH A PREVIOUS POSITION DESCRIPTION, OR A SECOND CORRESPONDENCE VALUE FOR CORRESPONDENCE OF THE FIRST POSITION VALUE WITH AT LEAST ONE OTHER POSITION VALUE
235104

INTERPRETING, BY A COMPONENT LAYER IN THE CONTROLLER, THE FIRST POSITION VALUE AND THE SECOND POSITION VALUE
234102

PROCESSING, BY A SUBSYSTEM LAYER IN THE CONTROLLER, THE FIRST POSITION VALUE INTO A FIRST POSITION DESCRIPTOR
234104

PROCESSING, BY THE SUBSYSTEM LAYER, THE SECOND POSITION VALUE INTO A SECOND POSITION DESCRIPTOR
234108

Figure 41:
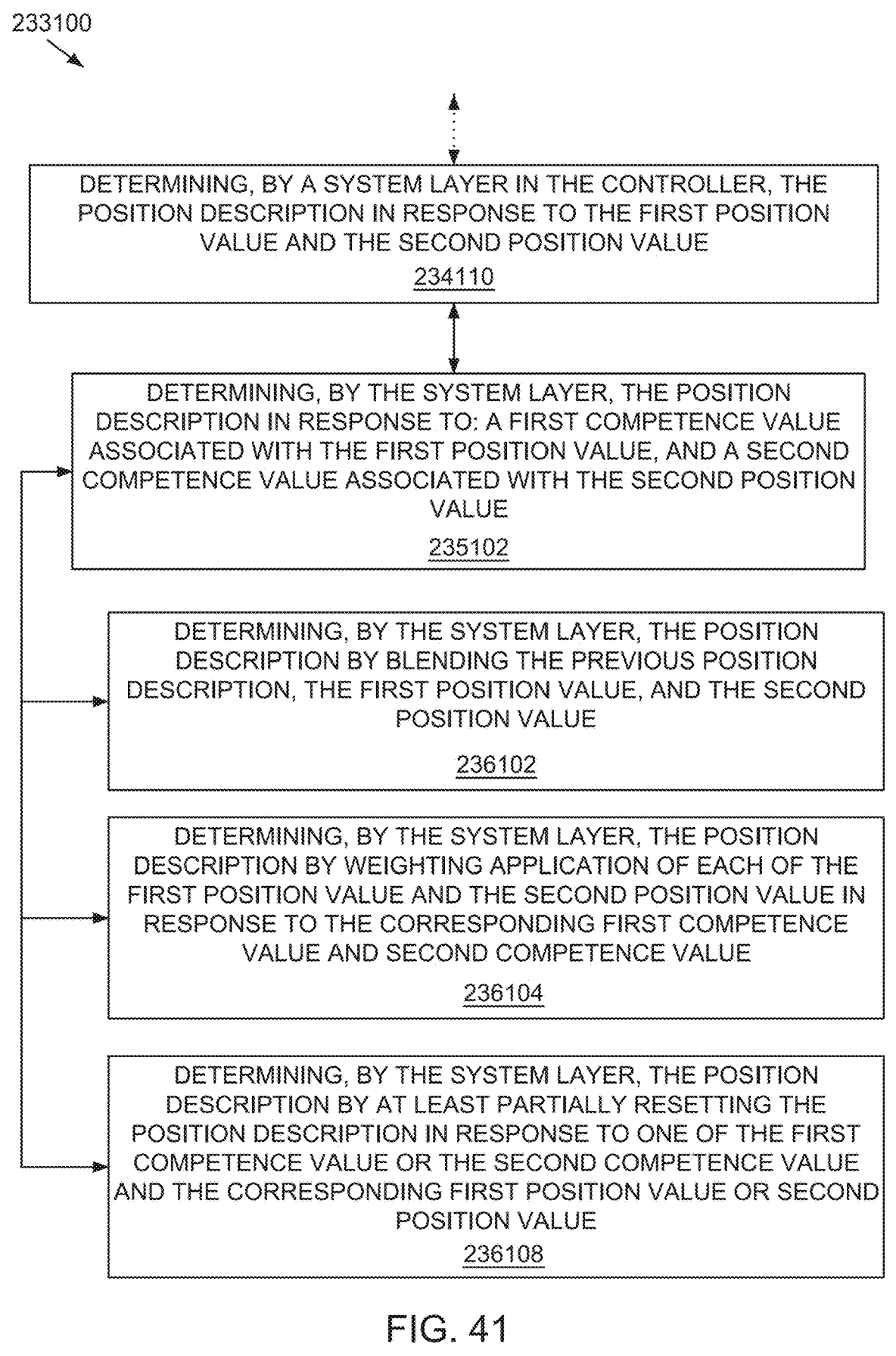

DETERMINING, BY A SYSTEM LAYER IN THE CONTROLLER, THE POSITION DESCRIPTION IN RESPONSE TO THE FIRST POSITION VALUE AND THE SECOND POSITION VALUE

234110

DETERMINING, BY THE SYSTEM LAYER, THE POSITION DESCRIPTION IN RESPONSE TO: A FIRST COMPETENCE VALUE ASSOCIATED WITH THE FIRST POSITION VALUE, AND A SECOND COMPETENCE VALUE ASSOCIATED WITH THE SECOND POSITION VALUE

235102

DETERMINING, BY THE SYSTEM LAYER, THE POSITION DESCRIPTION BY BLENDING THE PREVIOUS POSITION DESCRIPTION, THE FIRST POSITION VALUE, AND THE SECOND POSITION VALUE

236102

DETERMINING, BY THE SYSTEM LAYER, THE POSITION DESCRIPTION BY WEIGHTING APPLICATION OF EACH OF THE FIRST POSITION VALUE AND THE SECOND POSITION VALUE IN RESPONSE TO THE CORRESPONDING FIRST COMPETENCE VALUE AND SECOND COMPETENCE VALUE

236104

DETERMINING, BY THE SYSTEM LAYER, THE POSITION DESCRIPTION BY AT LEAST PARTIALLY RESETTING THE POSITION DESCRIPTION IN RESPONSE TO ONE OF THE FIRST COMPETENCE VALUE OR THE SECOND COMPETENCE VALUE AND THE CORRESPONDING FIRST POSITION VALUE OR SECOND POSITION VALUE

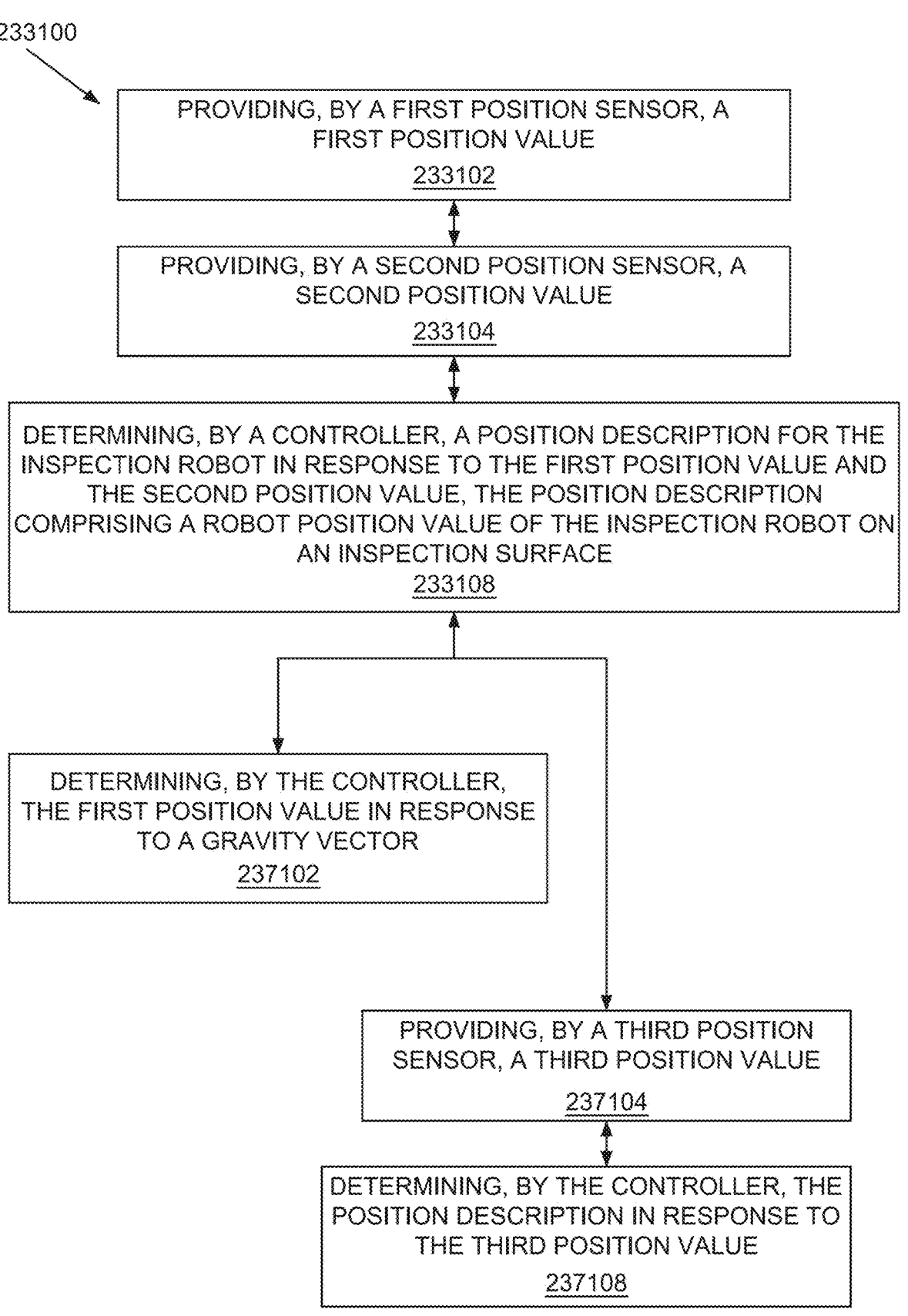

PROVIDING, BY A FIRST POSITION SENSOR, A FIRST POSITION VALUE
233102

PROVIDING, BY A SECOND POSITION SENSOR, A SECOND POSITION VALUE
233104

DETERMINING, BY A CONTROLLER, A POSITION DESCRIPTION FOR THE INSPECTION ROBOT IN RESPONSE TO THE FIRST POSITION VALUE AND THE SECOND POSITION VALUE, THE POSITION DESCRIPTION COMPRISING A ROBOT POSITION VALUE OF THE INSPECTION ROBOT ON AN INSPECTION SURFACE
233108

DETERMINING, BY THE CONTROLLER, THE FIRST POSITION VALUE IN RESPONSE TO A GRAVITY VECTOR
237102

PROVIDING, BY A THIRD POSITION SENSOR, A THIRD POSITION VALUE
237104

DETERMINING, BY THE CONTROLLER, THE POSITION DESCRIPTION IN RESPONSE TO THE THIRD POSITION VALUE
237108

SYSTEM, APPARATUS, AND METHOD FOR IMPROVED LOCATION IDENTIFICATION

CROSS-REFERENCE TO RELATED APPLICATIONS

This application claims the benefit of and priority to U.S. Provisional Patent Application Ser. No. 63/476,114, filed Dec. 19, 2022, and entitled "SYSTEM, APPARATUS AND METHOD FOR IMPROVED LOCATION IDENTIFICATION".

Each of the foregoing patents and/or applications is incorporated herein by reference in its entirety for all purposes.

Certain aspects of the present disclosure include one or more features of the following patents and/or applications, which are incorporated herein by reference in their entirety for all purposes:

PCT Patent Application Serial No. PCT/US2023/075691, filed on Oct. 2, 2023, and entitled "SYSTEM, APPARATUS, AND METHOD FOR IMPROVED LOCATION IDENTIFICATION";

U.S. patent application Ser. No. 16/863,594, filed Apr. 30, 2020, entitled "SYSTEM, METHOD AND APPARATUS FOR RAPID DEVELOPMENT OF AN INSPECTION SCHEME FOR AN INSPECTION ROBOT", now U.S. Pat. No. 11,511,426 issued on Nov. 29, 2022;

PCT Patent Application Serial No. PCT/US20/21779, filed Mar. 9, 2020, entitled "INSPECTION ROBOT", now published as WO 2020/185719;

U.S. Provisional Patent Application Ser. No. 62/815,724, filed Mar. 8, 2019, entitled "INSPECTION ROBOT";

U.S. patent application Ser. No. 15/853,391, filed Dec. 22, 2017, entitled "INSPECTION ROBOT WITH COUPLANT CHAMBER DISPOSED WITHIN SLED FOR ACOUSTIC COUPLING," now U.S. Pat. No. 10,698,412 issued on Jun. 30, 2020;

U.S. Provisional Patent Application Ser. No. 62/596,737, filed Dec. 8, 2017, entitled "METHOD AND APPARATUS TO INSPECT A SURFACE UTILIZING REAL-TIME POSITION INFORMATION"; and U.S. Provisional Patent Application Ser. No. 62/438,788, filed Dec. 23, 2016, entitled "STRUCTURE TRAVERSING ROBOT WITH INSPECTION FUNCTIONALITY".

BACKGROUND

The present disclosure relates to robotic inspection and treatment of industrial surfaces.

SUMMARY

Previously known inspection and treatment systems for industrial surfaces suffer from a number of drawbacks. Industrial surfaces are often required to be inspected to determine whether a pipe wall, tank surface, or other industrial surface feature has suffered from corrosion, degradation, loss of a coating, damage, wall thinning or wear, or other undesirable aspects. Industrial surfaces are often present within a hazardous location—for example in an environment with heavy operating equipment, operating at high temperatures, in a confined environment, at a high elevation, in the presence of high voltage electricity, in the presence of toxic or noxious gases, in the presence of corrosive liquids, and/or in the presence of operating equipment that is dangerous to personnel. Accordingly, presently known systems require that a system be shutdown, that a system be operated at a reduced capacity, that stringent safety procedures be followed (e.g., lockout/tagout, confined space entry procedures, harnessing, etc.), and/or that personnel are exposed to hazards even if proper procedures are followed. Additionally, the inconvenience, hazards, and/or confined spaces of personnel entry into inspection areas can result in inspections that are incomplete, of low resolution, that lack systematic coverage of the inspected area, and/or that are prone to human error and judgement in determining whether an area has been properly inspected.

As an inspection robot pitches, for example, due to crossing a weld line, traversing an obstacle, or traversing a curved and/or irregular inspection surface, the beam of an inspection laser and/or distancing laser (e.g., to determine the position of an inspection robot) can pitch into and away from the tank shell surface. This may be particularly problematic when the inspection robot is far from the point being measured. At large distances, even small angular changes can cause the measurement point to travel several feet from the inspection surface or even intersect with the inspection surface giving erroneous measurements.

Embodiments of the present disclosure provide for systems and methods that improve localization of an inspection robot. Example embodiments include sensor fusion and mixing.

Embodiments of the present disclosure may provide for an inspection robot, and/or an inspection system including an inspection robot, having improved distance information, range finding, and/or position-based information.

Embodiments of the current disclosure provide for an inspection robot positioning system that includes a first position sensor, a second position sensor, and a controller. The first position sensor is configured to provide a first position value. The second position sensor is configured to provide a second position value. The controller is configured to: determine a position description for an inspection robot in response to the first position value and the second position value, the position description comprising a robot position value of the inspection robot on an inspection surface; and transmit the position description. At least one of the first position sensor or the second position sensor comprise an inertial measurement unit (IMU).

Embodiments of the current disclosure also provide a method for localizing an inspection robot. The method includes: determining a first position value via a first position sensor disposed on the inspection robot; determining a second position value via a second position sensor disposed on the inspection robot; determining, via a controller and in response to the first position value and the second position value, a position description for the inspection robot, the position description comprising a robot position value of the inspection robot on an inspection surface; and transmitting the position description. At least one of the first position sensor or the second position sensor comprise an inertial measurement unit (IMU).

Embodiments of the current disclosure further provide for an inspection robot that includes: a body; an arm coupled to the body; a payload coupled to the arm; an inspection surface sensor disposed in the payload and for inspecting an inspection surface; a first position sensor configured to provide a first position value; a second position sensor configured to provide a second position value; and a controller configured to determine a position description for an inspection robot in response to the first position value and the second position value, the position description comprising a robot position value of the inspection robot on an inspection surface. At least one of the first position sensor or the second position sensor comprise an inertial measurement unit (IMU).

Embodiments of the current disclosure further provide for an inspection robot positioning system that includes: a first position sensors, a second position sensor, and a controller. The first position sensor is configured to provide a first position value. The second position sensor is configured to provide a second position value. The controller configured to: determine a position description for an inspection robot in response to the first position value and the second position value, the position description comprising a robot position value of the inspection robot on an inspection surface; and transmit the position description. At least one of the first position sensor or the second position sensor includes a robot total station (RTS).

BRIEF DESCRIPTION OF THE FIGURES

FIG. 20 is a schematic diagram of a system for traversing an obstacle with an inspection robot consistent with certain embodiments of the present disclosure.

FIG. 22 is another flow chart depicting the method for traversing the obstacle with the inspection robot.

FIG. 37 is a schematic flow diagram of a method for sensor fusion consistent with certain embodiments of the present disclosure.

FIG. 38 depicts an aspect of a method of sensor fusion in an inspection robot positioning system consistent with certain embodiments of the present disclosure.

FIG. 39 depicts an aspect of a method of sensor fusion in an inspection robot positioning system consistent with certain embodiments of the present disclosure.

FIG. 40 depicts an aspect of a method of sensor fusion in an inspection robot positioning system consistent with certain embodiments of the present disclosure.

FIG. 41 depicts an aspect of a method of sensor fusion in an inspection robot positioning system consistent with certain embodiments of the present disclosure.

FIG. 42 depicts an aspect of a method of sensor fusion in an inspection robot positioning system consistent with certain embodiments of the present disclosure.

DETAILED DESCRIPTION

Figure 1:
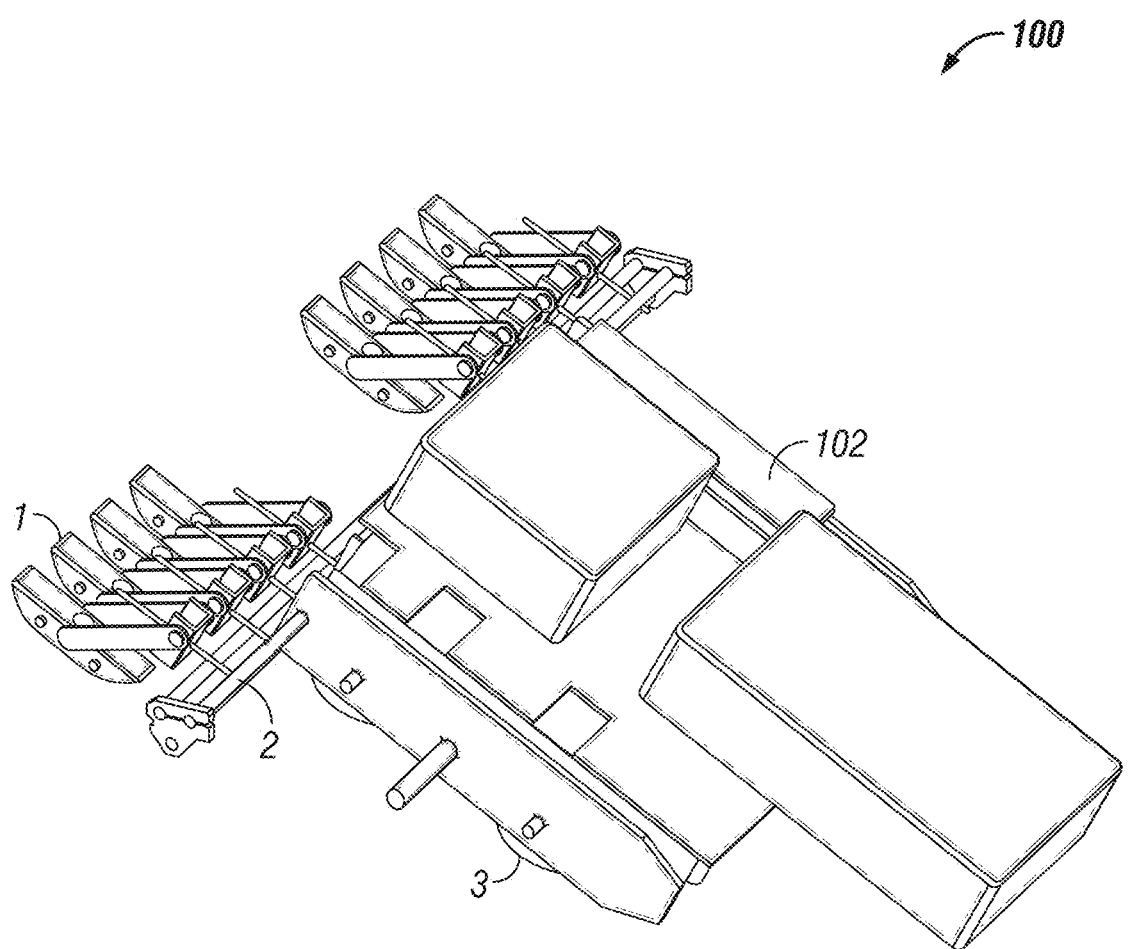
FIG. 1 is a schematic depiction of an inspection robot consistent with certain embodiments of the present disclosure.

The present disclosure relates to a system developed for traversing, climbing, or otherwise traveling over walls (curved or flat), or other industrial surfaces. Industrial surfaces, as described herein, include any tank, pipe, housing, or other surface utilized in an industrial environment, including at least heating and cooling pipes, conveyance pipes or conduits, and tanks, reactors, mixers, or containers. In certain embodiments, an industrial surface is ferromagnetic, for example including iron, steel, nickel, cobalt, and alloys thereof. In certain embodiments, an industrial surface is not ferromagnetic.

Certain descriptions herein include operations to inspect a surface, an inspection robot or inspection device, or other descriptions in the context of performing an inspection. Inspections, as utilized herein, should be understood broadly. Without limiting any other disclosures or embodiments herein, inspection operations herein include operating one or more sensors in relation to an inspected surface, electromagnetic radiation inspection of a surface (e.g., operating a camera) whether in the visible spectrum or otherwise (e.g., infrared, UV, X-Ray, gamma ray, etc.), high-resolution inspection of the surface itself (e.g., a laser profiler, caliper, etc.), performing a repair operation on a surface, performing a cleaning operation on a surface, and/or marking a surface for a later operation (e.g., for further inspection, for repair, and/or for later analysis). Inspection operations include operations for a payload carrying a sensor or an array of sensors (e.g. on sensor sleds) for measuring characteristics of a surface being traversed such as thickness of the surface, curvature of the surface, ultrasound (or ultra-sonic) measurements to test the integrity of the surface and/or the thickness of the material forming the surface, heat transfer, heat profile/mapping, profiles or mapping any other parameters, the presence of rust or other corrosion, surface defects or pitting, the presence of organic matter or mineral deposits on the surface, weld quality and the like. Sensors may include magnetic induction sensors, acoustic sensors, laser sensors, LIDAR, a variety of image sensors, and the like. The inspection sled may carry a sensor for measuring characteristics near the surface being traversed such as emission sensors to test for gas leaks, air quality monitoring, radioactivity, the presence of liquids, electro-magnetic interference, visual data of the surface being traversed such as uniformity, reflectance, status of coatings such as epoxy coatings, wall thickness values or patterns, wear patterns, and the like. The term inspection sled may indicate one or more tools for repairing, welding, cleaning, applying a treatment or coating the surface being treated. Treatments and coatings may include rust proofing, sealing, painting, application of a coating, and the like. Cleaning and repairing may include removing debris, sealing leaks, patching cracks, and the like. The term inspection sled, sensor sled, and sled may be used interchangeably throughout the present disclosure.

In certain embodiments, for clarity of description, a sensor is described in certain contexts throughout the present disclosure, but it is understood explicitly that one or more tools for repairing, cleaning, and/or applying a treatment or coating to the surface being treated are likewise contemplated herein wherever a sensor is referenced. In certain embodiments, where a sensor provides a detected value (e.g., inspection data or the like), a sensor rather than a tool may be contemplated, and/or a tool providing a feedback value (e.g., application pressure, application amount, nozzle open time, orientation, etc.) may be contemplated as a sensor in such contexts.

Referring to FIG. 1, inspections are conducted with a robotic system 100 (e.g., an inspection robot, a robotic vehicle, etc.) which may utilize sensor sleds 1 and a sled array system 2 which enables accurate, self-aligning, and self-stabilizing contact with a surface (not shown) while also overcoming physical obstacles and maneuvering at varying or constant speeds. In certain embodiments, mobile contact of the system 100 with the surface includes a magnetic wheel 3. In certain embodiments, a sled array system 2 is referenced herein as a payload 2—wherein a payload 2 is an arrangement of sleds 1 with sensor mounted thereon, and wherein, in certain embodiments, an entire payload 2 can be changed out as a unit. The utilization of payloads 2, in certain embodiments, allows for a pre-configured sensor array that provides for rapid re-configuration by swapping out the entire payload 2. In certain embodiments, sleds 1 and/or specific sensors on sleds 1, are changeable within a payload 2 to reconfigure the sensor array.

An example sensor sled 1 includes, without limitation, one or more sensors mounted thereon such that the sensor(s) is operationally couplable to an inspection surface in contact with a bottom surface of the corresponding one of the sleds. For example, the sled 1 may include a chamber or mounting structure, with a hole at the bottom of the sled 1 such that the sensor can maintain line-of-sight and/or acoustic coupling with the inspection surface. The sled 1 as described throughout the present disclosure is mounted on and/or operationally coupled to the inspection robot 100 such that the sensor maintains a specified alignment to the inspection surface 500 (FIG. 2)—for example a perpendicular arrangement to the inspection surface, or any other specified angle. In certain embodiments, a sensor mounted on a sled 1 may have a line-of-sight or other detecting arrangement to the inspection surface that is not through the sled 1—for example a sensor may be mounted at a front or rear of a sled 1, mounted on top of a sled 1 (e.g., having a view of the inspection surface that is forward, behind, to a side, and/or oblique to the sled 1). It will be seen that, regardless of the sensing orientation of the sensor to the inspection surface, maintenance of the sled 1 orientation to the inspection surface will support more consistent detection of the inspection surface by the sensor, and/or sensed values (e.g., inspection data) that is more consistently comparable over the inspection surface and/or that has a meaningful position relationship compared to position information determined for the sled 1 or inspection robot 100. In certain embodiments, a sensor may be mounted on the inspection robot 100 and/or a payload 2—for example a camera mounted on the inspection robot 100.

The present disclosure allows for gathering of structural information from a physical structure. Example physical structures include industrial structures such as boilers, pipe-lines, tanks, ferromagnetic structures, and other structures. An example system 100 is configured for climbing the outside of tube walls.

As described in greater detail below, in certain embodiments, the disclosure provides a system that is capable of integrating input from sensors and sensing technology that may be placed on a robotic vehicle. The robotic vehicle is capable of multi-directional movement on a variety of surfaces, including flat walls, curved surfaces, ceilings, and/or floors (e.g., a tank bottom, a storage tank floor, and/or a recovery boiler floor). The ability of the robotic vehicle to operate in this way provides unique access especially to traditionally inaccessible or dangerous places, thus permitting the robotic vehicle to gather information about the structure it is climbing on.

The system 100 (e.g., an inspection robot, a robotic vehicle, and/or supporting devices such as external computing devices, couplant or fluid reservoirs and delivery systems, etc.) in FIG. 1 includes the sled 1 mounted on a payload 2 to provide for an array of sensors having selectable contact (e.g., orientation, down force, sensor spacing from the surface, etc.) with an inspected surface. The payload 2 includes mounting posts mounted to a main body 102 of the system 100. The payload 2 thereby provides a convenient mounting position for a number of sleds 1, allowing for multiple sensors to be positioned for inspection in a single traverse of the inspected surface. The number and distance of the sleds 1 on the payload 2 are readily adjustable—for example by sliding the sled mounts on the payload 2 to adjust spacing.

Figures 2, 3:
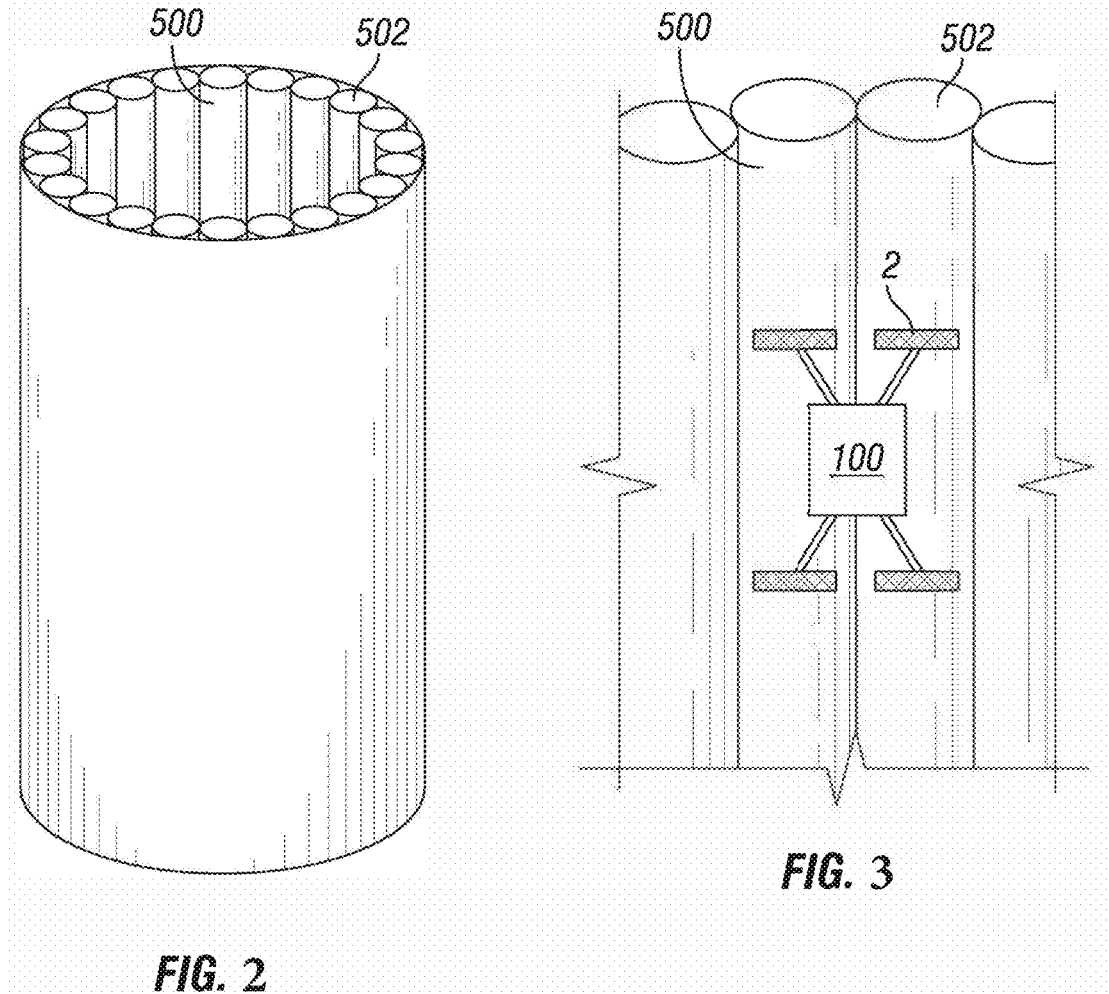
FIG. 2 is a schematic depiction of an inspection surface consistent with certain embodiments of the present disclosure.
FIG. 3 is a schematic depiction of an inspection robot positioned on an inspection surface consistent with certain embodiments of the present disclosure.

FIG. 2 depicts an inspection surface 500 having a rounded surface (e.g., pipe, or other raised feature). The inspection surface 500 may have surface features, such as raised features, and may be a single pipe or formed by two or more pipes 502 (which may be adjacent pipes or spaced pipes). In embodiments, the inspection surface 500 may have a curvature defined, in part, by a tube, pipe, and/or tank (e.g., when the inspection robot 100 traverses the interior of a pipe 502).

An example system 100 includes an apparatus 800 (reference FIG. 5 and the disclosure referencing FIG. 5) for providing enhanced inspection information, including position-based information. The apparatus 800 and operations to provide the position-based information are described in the context of a particular physical arrangement of an industrial system for convenient illustration, however any physical arrangement of an industrial system is contemplated herein.

Referencing FIG. 2, an example system includes a number of pipes 502—for example vertically arranged pipes such as steam pipes in a power plant, pipes in a cooling tower, exhaust or effluent gas pipes, or the like. The pipes 502 in FIG. 2 are arranged to create a tower having a circular cross-section for ease of description. In certain embodiments, periodic inspection of the pipes is utilized to ensure that pipe degradation is within limits, to ensure proper operation of the system, to determine maintenance and repair schedules, and/or to comply with policies or regulations. In the example of FIG. 2, an inspection surface 500 includes the inner portion of the tower, whereby an inspection robot 100 traverses the pipes 502 (e.g., vertically, inspecting one or more pipes on each vertical run). An example inspection robot 100 includes configurable payloads 2, and may include ultra-sonic sensors (e.g., to determine wall thickness and/or pipe integrity), magnetic sensors (e.g., to determine the presence and/or thickness of a coating on a pipe), cameras (e.g., to provide for visual inspection, including in EM ranges outside of the visual range, temperatures, etc.), composition sensors (e.g., gas chromatography in the area near the pipe, spectral sensing to detect leaks or anomalous operation, etc.), temperature sensing, pressure sensing (ambient and/or specific pressures), vibration sensing, density sensing, etc. The type of sensing performed by the inspection robot 100 is not limiting to the present disclosure except where specific features are described in relation to specific sensing challenges and opportunities for those sensed parameters as will be understood to one of skill in the art having the benefit of the disclosures herein.

In certain embodiments, the inspection robot 100 has alternatively or additionally, payload(s) 2 configured to provide for marking of aspects of the inspection surface 500 (e.g., a paint sprayer, an invisible or UV ink sprayer, and/or a virtual marking device configured to mark the inspection surface 500 in a memory location of a computing device but not physically), to repair a portion of the inspection surface 500 (e.g., apply a coating, provide a welding operation, apply a temperature treatment, install a patch, etc.), and/or to provide for a cleaning operation.

Referencing FIG. 3, an example inspection robot 100 is depicted in position on the inspection surface 500 at a location. In the example, the inspection robot 100 traverses vertically and is positioned between two pipes 502, with payloads 2 configured to clean, sense, treat, and/or mark two adjacent pipes 502 in a single inspection run. The inspection robot 100 in the example includes two payloads 2 at the "front" (ahead of the robot housing in the movement direction) and two payloads 2 at the "rear" (behind the robot housing in the movement direction). The inspection robot 100 may include any arrangement of payloads 2, including just one or more payloads in front or behind, just one or more payloads off to either or both sides, and combinations of these. Additionally, or alternatively, the inspection robot 100 may be positioned on a single pipe, and/or may traverse between positions during an inspection operation, for example to inspect selected areas of the inspection surface 500 and/or to traverse obstacles which may be present.

In certain embodiments, a "front" payload 2 includes sensors configured to determine properties of the inspection surface, and a "rear" payload 2 includes a responsive payload, such as an enhanced sensor, a cleaning device such as a sprayer, scrubber, and/or scraper, a marking device, and/or a repair device. The front-back arrangement of payloads 2 provides for adjustments, cleaning, repair, and/or marking of the inspection surface 500 in a single run—for example where an anomaly, gouge, weld line, area for repair, previously repaired area, past inspection area, etc., is sensed by the front payload 2, the anomaly can be marked, cleaned, repaired, etc. without requiring an additional run of the inspection robot 100 or a later visit by repair personnel. In another example, a first calibration of sensors for the front payload may be determined to be incorrect (e.g., a front ultra-sonic sensor calibrated for a particular coating thickness present on the pipes 502) and a rear sensor can include an adjusted calibration to account for the detected aspect (e.g., the rear sensor calibrated for the observed thickness of the coating). In another example, certain enhanced sensing operations may be expensive, time consuming, consume more resources (e.g., a gamma ray source, an alternate coupling such as a non-water or oil-based acoustic coupler, require a high energy usage, require greater processing resources, and/or incur usage charges to an inspection client for any reason) and the inspection robot 100 can thereby only utilize the enhanced sensing operations selectively and in response to observed conditions.

Figure 4:
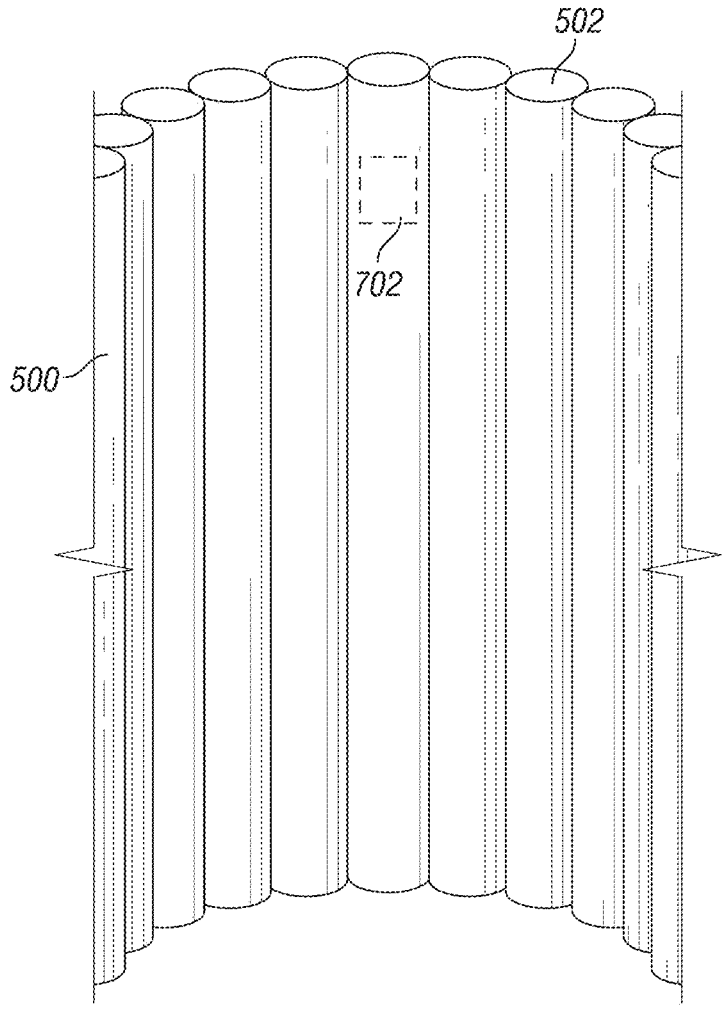
FIG. 4 is a schematic depiction of a location on an inspection surface consistent with certain embodiments of the present disclosure.
Figure 5:
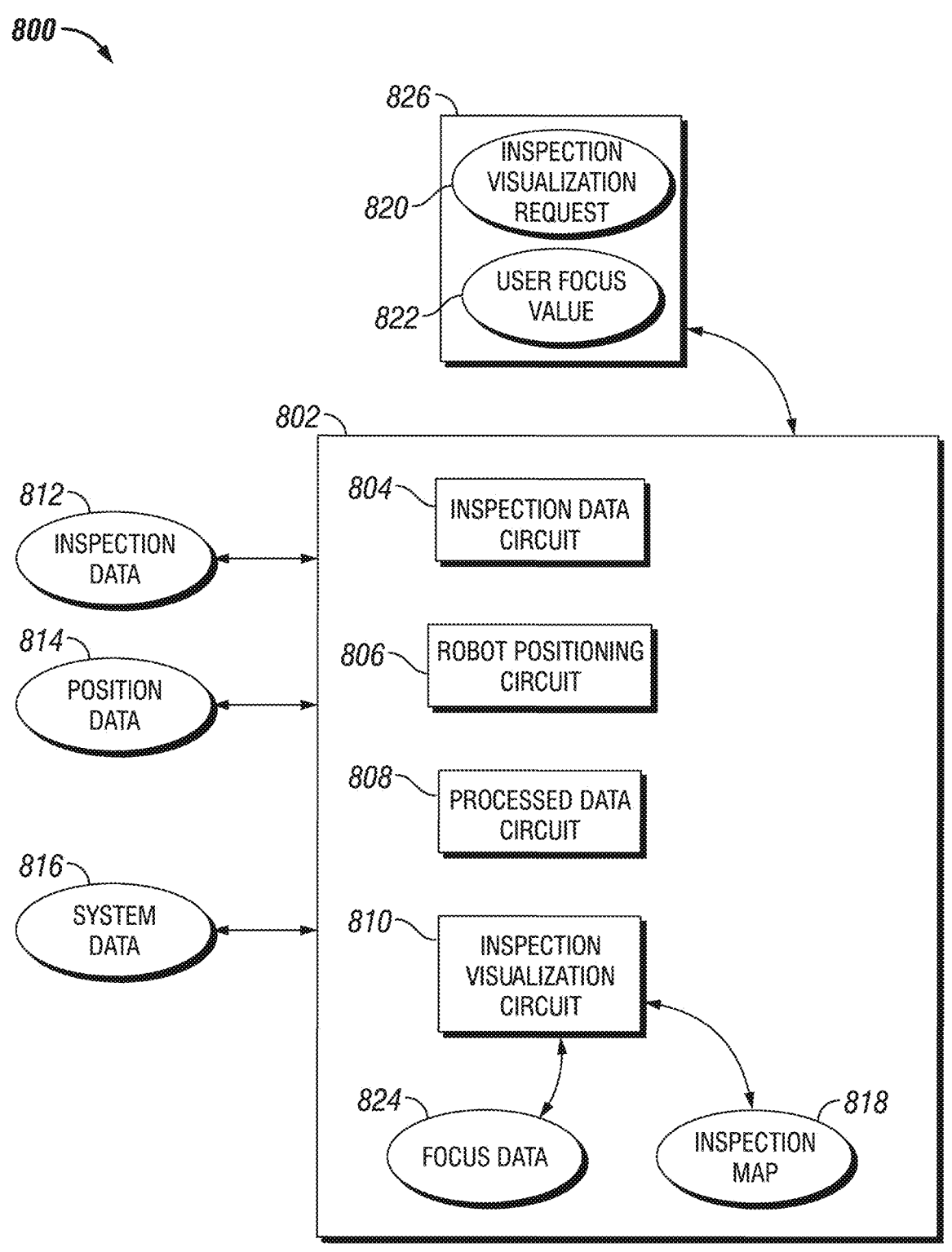
FIG. 5 is a schematic block diagram of an apparatus for providing an inspection map consistent with certain embodiments of the present disclosure.

Referencing FIG. 4, a location 702 on the inspection surface 500 is identified for illustration. In certain embodiments, as shown in FIG. 5, the inspection robot 100 and/or apparatus 800 includes a controller 802 having a number of circuits structured to functionally execute operations of the controller 802. The controller 802 may be a single device (e.g., a computing device present on the robot 100, a computing device in communication with the robot 100 during operations and/or post-processing information communicated after inspection operations, etc.) and/or a combination of devices, such as a portion of the controller 802 positioned on the robot 100, a portion of the controller 802 positioned on a computing device in communication with the robot 100, a portion of the controller 802 positioned on a handheld device (not shown) of an inspection operator, and/or a portion of the controller 802 positioned on a computing device networked with one or more of the preceding devices. Additionally, or alternatively, aspects of the controller 802 may be included on one or more logic circuits, embedded controllers, hardware configured to perform certain aspects of the controller 802 operations, one or more sensors, actuators, network communication infrastructure (including wired connections, wireless connections, routers, switches, hubs, transmitters, and/or receivers), and/or a tether between the robot 100 and another computing device. The described aspects of the example controller 802 are non-limiting examples, and any configuration of the robot 100 and devices in communication with the robot 100 to perform all or selected ones of operations of the controller 802 are contemplated herein as aspects of an example controller 802.

An example controller 802 includes an inspection data circuit 804 that interprets inspection data 812—for example sensed information from sensors mounted on the payload and determining aspects of the inspection surface 500, the status, deployment, and/or control of marking devices, cleaning devices, and/or repair devices, and/or post-processed information from any of these such as a wall thickness determined from ultra-sonic data, temperature information determined from imaging data, and the like. The example controller 802 further includes a robot positioning circuit 806 that interprets position data 814. An example robot positioning circuit 806 determines position data by any available method, including at least triangulating (or other positioning methods) from a number of available wireless devices (e.g., routers available in the area of the inspection surface 500, intentionally positioned transmitters/transceivers, etc.), a distance of travel measurement (e.g., a wheel rotation counter which may be mechanical, electro-magnetic, visual, etc.; a barometric pressure measurement; direct visual determinations such as radar, Lidar, or the like), a reference measurement (e.g., determined from distance to one or more reference points); a time-based measurement (e.g., based upon time and travel speed); and/or a dead reckoning measurement such as integration of detection movements. In the example of FIG. 5, a position measurement may include a height determination combined with an azimuthal angle measurement and/or a pipe number value such that the inspection surface 500 location is defined thereby. Any coordinate system and/or position description system is contemplated herein. In certain embodiments, the controller 802 includes a processed data circuit 808 that combines the inspection data 812 with the position data 814 to determine position-based inspection data. The operations of the processed data circuit 808 may be performed at any time—for example during operations of the inspection robot 100 such that inspection data 812 is stored with position data 814, during a post-processing operation which may be completed separately from the inspection robot 100, and/or which may be performed after the inspection is completed, and/or which may be commenced while the inspection is being performed. In certain embodiments, the linking of the position data 814 with the inspection data 812 may be performed if the linked position-inspection data is requested—for example upon a request by a client for an inspection map 818. In certain embodiments, portions of the inspection data 812 are linked to the position data 814 at a first time, and other portions of the inspection data 812 are linked to the position data 814 at a later time and/or in response to post-processing operations, an inspection map 818 request, or other subsequent event.

The example controller 802 further includes an inspection visualization circuit 810 that determines the inspection map 818 in response to the inspection data 812 and the position data 814, for example using post-processed information from the processed data circuit 808. In a further example, the inspection visualization circuit 810 determines the inspection map 818 in response to an inspection visualization request 820, for example from a client computing device 826. In the example, the client computing device 826 may be communicatively coupled to the controller 802 over the internet, a network, through the operations of a web application, and the like. In certain embodiments, the client computing device 826 securely logs in to control access to the inspection map 818, and the inspection visualization circuit 810 may prevent access to the inspection map 818, and/or provide only portions of the inspection map 818, depending upon the successful login from the client computing device 826, the authorizations for a given user of the client computing device 826, and the like.

In certain embodiments, the inspection visualization circuit 810 and/or inspection data circuit 804 further accesses system data 816, such as a time of the inspection, a calendar date of the inspection, the robot 100 utilized during the inspection and/or the configurations of the robot 100, a software version utilized during the inspection, calibration and/or sensor processing options selected during the inspection, and/or any other data that may be of interest in characterizing the inspection, that may be requested by a client, that may be required by a policy and/or regulation, and/or that may be utilized for improvement to subsequent inspections on the same inspection surface 500 or another inspection surface. In certain embodiments, the processed data circuit 808 combines the system data 816 with the processed data for the inspection data 812 and/or the position data 814, and/or the inspection visualization circuit incorporates the system data 816 or portions thereof into the inspection map 818. In certain embodiments, any or all aspects of the inspection data 812, position data 814, and/or system data 816 may be stored as meta-data (e.g., not typically available for display), may be accessible in response to prompts, further selections, and/or requests from the client computing device 826, and/or may be utilized in certain operations with certain identifiable aspects removed (e.g., to remove personally identifiable information or confidential aspects) such as post-processing to improve future inspection operations, reporting for marketing or other purposes, or the like.

In certain embodiments, the inspection visualization circuit 810 is further responsive to a user focus value 822 to update the inspection map 818 and/or to provide further information (e.g., focus data 824) to a user, such as a user of the client computing device 826. For example, a user focus value 822 (e.g., a user mouse position, menu selection, touch screen indication, keystroke, or other user input value indicating that a portion of the inspection map 818 has received the user focus) indicates that a location 702 (FIG. 4) of the inspection map 818 has the user focus, and the inspection visualization circuit 810 generates the focus data 824 in response to the user focus value 822, including potentially the location 702 indicated by the user focus value 822.

Figure 6:
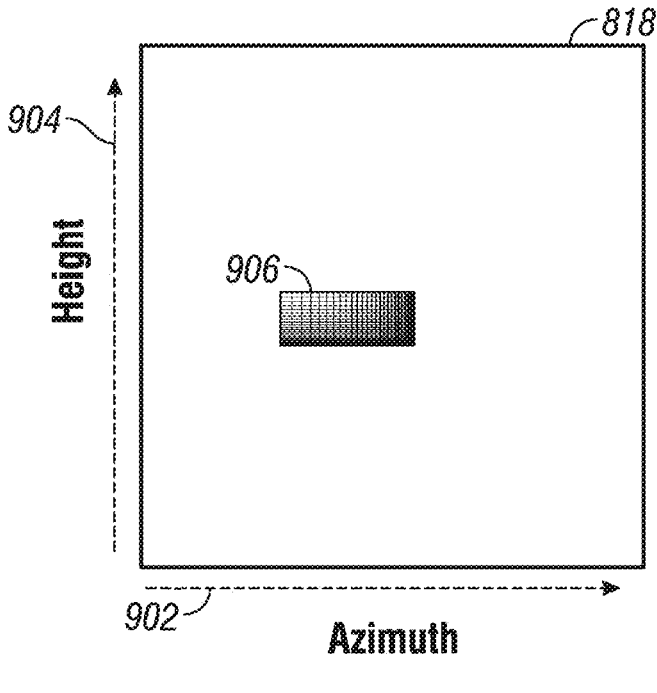
FIG. 6 depicts an illustrative inspection map consistent with certain embodiments of the present disclosure.

Referencing FIG. 6, an example inspection map 818 is depicted. In the example, the inspection surface 500 may be similar to that depicted in FIG. 2—for example the interior surface of tower formed by a number of pipes to be inspected. The example inspection map 818 includes an azimuthal indication 902 and a height indication 904, with data from the inspection depicted on the inspection map 818 (e.g., shading at 906 (FIG. 7) indicating inspection data corresponding to that visual location). Example and non-limiting inspection maps 818 include numeric values depicted on the visualization, colors, shading or hatching, and/or any other visual depiction method. In certain embodiments, more than one inspection dimension may be visualized (e.g., temperatures and wall thickness), and/or the inspection dimension may be selected or changed by the user. Additionally, or alternatively, physical elements such as obstacles, build up on the inspection surface, weld lines, gouges, repaired sections, photos of the location (e.g., the inspection map 818 laid out over a panoramic photograph of the inspection surface 500 with data corresponding to the physical location depicted), may be depicted with or as a part of the inspection map 818. Additionally, or alternatively, visual markers may be positioned on the inspection map 818—for example, a red "X" (or any other symbol, including a color, bolded area, highlight, image data, a thumbnail, etc.) at a location of interest on the map—which marking may be physically present on the actual inspection surface 500 or only virtually depicted on the inspection map 818. It can be seen that the inspection map 818 provides for a convenient and powerful reference tool for a user to determine the results of the inspection operation and plan for future maintenance, repair, or inspections, as well as planning logistics in response to the number of aspects of the system requiring further work or analysis and the location of the aspects requiring further work or analysis. Accordingly, inspection results can be analyzed more quickly, regulatory or policy approvals and system up-time can be restored more quickly (if the system was shut-down for the inspection), configurations of an inspection robot 100 for a future inspection can be performed more quickly (e.g., preparing payload 2 configurations, obstacle management, and/or sensor selection or calibration), any of the foregoing can be performed with greater confidence that the results are reliable, and/or any combinations of the foregoing. Additionally, or alternatively, less invasive operations can be performed, such as virtual marking which would not leave marks on the inspection surface 500 that might be removed (e.g., accidentally) before they are acted upon, which may remain after being acted upon, or which may create uncertainty as to when the marks were made over the course of multiple inspections and marking generations.

Figure 7:
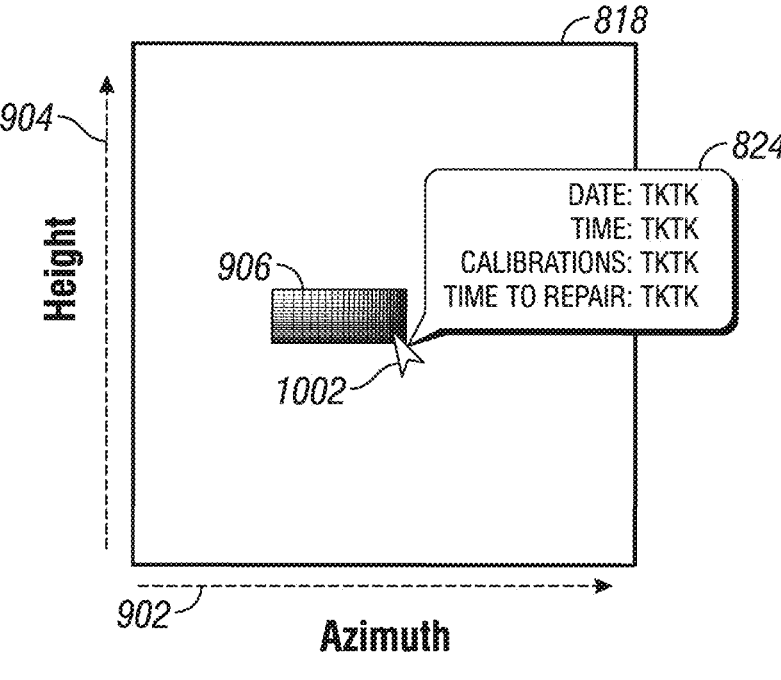
FIG. 7 depicts an illustrative inspection map and focus data consistent with certain embodiments of the present disclosure.

Referencing FIG. 7, an illustrative example inspection map 818 having focus data 824 is depicted. The example inspection map 818 is responsive to a user focus value 822, such as a mouse cursor 1002 hovering over a portion of the inspection map 818. In the example, the focus data 824 comes up as a tooltip, although any depiction operations such as output to a file, populating a static window for focus data 824, or any other operations known in the art are contemplated herein. The example focus data 824 includes a date (e.g., of the inspection), a time (e.g., of the inspection), the sensor calibrations utilized for the inspection, and the time to repair (e.g., down-time that would be required, actual repair time that would be required, the estimated time until the portion of the inspection surface 500 will require a repair, or any other description of a "time to repair"). The depicted focus data 824 is a non-limiting example, and any other information of interest may be utilized as focus data 824. In certain embodiments, a user may select the information, or portions thereof, utilized on the inspection map 818—including at least the axes 902, 904 (e.g., units, type of information, relative versus absolute data, etc.) and the depicted data (e.g., units, values depicted, relative versus absolute values, thresholds or cutoffs of interest, processed values such as virtually determined parameters, and/or categorical values such as "PASSED" or "FAILED"). Additionally, or alternatively, a user may select the information, or portions thereof, utilized as the focus data 824.

In certain embodiments, an inspection map 818 (or display) provides an indication of how long a section of the inspection surface 500 is expected to continue under nominal operations, how much material should be added to a section of the inspection surface 500 (e.g., a repair coating or other material), and/or the type of repair that is needed (e.g., wall thickness correction, replacement of a coating, fixing a hole, breach, rupture, etc.).

In embodiments, the robotic vehicle may incorporate a number of sensors distributed across a number of sensor sleds 1, such as with a single sensor mounted on a single sensor sled 1, a number of sensors mounted on a single sensor sled 1, a number of sensor sleds 1 arranged in a linear configuration perpendicular to the direction of motion (e.g., side-to-side across the robotic vehicle), arranged in a linear configuration along the direction of motion (e.g., multiple sensors on a sensor sled 1 or multiple sensor sleds 1 arranged to cover the same surface location one after the other as the robotic vehicle travels). Additionally, or alternatively, a number of sensors may be arranged in a two-dimensional surface area, such as by providing sensor coverage in a distributed manner horizontally and/or vertically (e.g., in the direction of travel), including offset sensor positions. In certain embodiments, the utilization of payloads 2 with sensor sleds mounted thereon enables rapid configuration of sensor placement as desired, sleds 1 on a given payload 2 can be further adjusted, and/or sensor(s) on a given sled can be changed or configured as desired.

In certain embodiments, two payloads 2 side-by-side allow for a wide horizontal coverage of sensing for a given travel of the inspection robot 100—for example as depicted in FIG. 1. In certain embodiments, a payload 2 is coupled to the inspection robot 100 with a pin or other quick-disconnect arrangement, allowing for the payload 2 to be removed, to be reconfigured separately from the inspection robot 100, and/or to be replaced with another payload 2 configured in a desired manner. The payload 2 may additionally have a couplant connection to the inspection robot 100 and/or an electrical connection to the inspection robot 100. Each sled may include a couplant connection conduit where the couplant connection conduit is coupled to a payload couplant connection at the upstream end and is coupled to the couplant entry of the cone at the downstream end. Multiple payload couplant connections on a single payload may be coupled together to form a single couplant connection between the payload and the inspection robot. The single couplant connection per payload facilitates the changing of the payload without having to connect/disconnect the couplant line connections at each sled. The couplant connection conduit between the payload couplant connection and the couplant entry of the cone facilitates connecting/disconnecting a sled from a payload without having to connect/disconnect the couplant connection conduit from the couplant entry of the cone. The couplant and/or electrical connections may include power for the sensors as required, and/or communication coupling (e.g., a datalink or network connection). Additionally, or alternatively, sensors may communicate wirelessly to the inspection robot 100 or to another computing device, and/or sensors may store data in a memory associated with the sensor, sled 1, or payload 2, which may be downloaded at a later time. Any other connection type required for a payload 2, such as compressed air, paint, cleaning solutions, repair spray solutions, or the like, may similarly be coupled from the payload 2 to the inspection robot 100.

The horizontal configuration of sleds 1 (and sensors) is selectable to achieve the desired inspection coverage. For example, sleds 1 may be positioned to provide a sled running on each of a selected number of pipes of an inspection surface, positioned such that several sleds 1 combine on a single pipe of an inspection surface (e.g., providing greater radial inspection resolution for the pipe), and/or at selected horizontal distances from each other (e.g., to provide (1) inch resolution, (2) inch resolution, (3) inch resolution, etc.). In certain embodiments, the degrees of freedom of the sensor sleds 1 allow for distributed sleds 1 to maintain contact and orientation with complex surfaces.

In certain embodiments, sleds 1 are articulable to a desired horizontal position. For example, quick disconnects may be provided (pins, claims, set screws, etc.) that allow for the sliding of a sled 1 to any desired location on a payload 2, allowing for any desired horizontal positioning of the sleds 1 on the payload 2. Additionally, or alternatively, sleds 1 may be movable horizontally during inspection operations. For example, a worm gear or other actuator may be coupled to the sled 1 and operable (e.g., by a controller 802) to position the sled 1 at a desired horizontal location. In certain embodiments, only certain ones of the sleds 1 are moveable during inspection operations—for example outer sleds 1 for maneuvering past obstacles. In certain embodiments, all of the sleds 1 are moveable during inspection operations—for example to support arbitrary inspection resolution (e.g., horizontal resolution, and/or vertical resolution), to configure the inspection trajectory of the inspection surface, or for any other reason. In certain embodiments, the payload 2 is horizontally moveable before or during inspection operations. In certain embodiments, an operator configures the payload 2 and/or sled 1 horizontal positions before inspection operations (e.g., before or between inspection runs). In certain embodiments, an operator, or a controller 802 configures the payload 2 and/or sled 1 horizontal positions during inspection operations. In certain embodiments, an operator can configure the payload 2 and/or sled 1 horizontal positions remotely, for example communicating through a tether or wirelessly to the inspection robot.

The vertical configuration of sleds 1 is selectable to achieve the desired inspection coverage (e.g., horizontal resolution, vertical resolution, and/or redundancy). The utilization of aligned payloads 2 provides for a number of capabilities for the inspection robot 100, including at least: redundancy of sensing values (e.g., to develop higher confidence in a sensed value); the utilization of more than one sensing calibration for the sensors (e.g., a front sensor utilizes a first calibration set, and a rear sensor utilizes a second calibration set); the adjustment of sensing operations for a rear sensor relative to a forward sensor (e.g., based on the front sensed parameter, a rear sensor can operate at an adjusted range, resolution, sampling rate, or calibration); the utilization of a rear sensor in response to a front sensor detected value (e.g., a rear sensor may be a high cost sensor—either high power, high computing/processing requirements, an expensive sensor to operate, etc.) where the utilization of the rear sensor can be conserved until a front sensor indicates that a value of interest is detected; the operation of a repair, marking, cleaning, or other capability rear payload that is responsive to the detected values of the forward payload; and/or for improved vertical resolution of the sensed values (e.g., if the sensor has a given resolution of detection in the vertical direction, the front and rear payloads can be operated out of phase to provide for improved vertical resolution).

Sensors may be modularly configured on the robotic vehicle to collect data on specific locations across the surface of travel (e.g., on a top surface of an object, on the side of an object, between objects, and the like), repeat collection of data on the same surface location (e.g., two sensors serially collecting data from the same location, either with the same sensor type or different sensor types), provide predictive sensing from a first sensor to determine if a second sensor should take data on the same location at a second time during a single run of the robotic vehicle (e.g., an ultra-sonic sensor mounted on a leading sensor sled taking data on a location determines that a gamma-ray measurement should be taken for the same location by a sensor mounted on a trailing sensor sled configured to travel over the same location as the leading sensor), provide redundant sensor measurements from a plurality of sensors located in leading and trailing locations (e.g., located on the same or different sensor sleds to repeat sensor data collection), and the like.

In certain embodiments, the robotic vehicle includes sensor sleds with one sensor and sensor sleds with a plurality of sensors. A number of sensors arranged on a single sensor sled may be arranged with the same sensor type across the direction of robotic vehicle travel (e.g., perpendicular to the direction of travel, or "horizontal") to increase coverage of that sensor type (e.g., to cover different surfaces of an object, such as two sides of a pipe), arranged with the same sensor type along the direction of robotic vehicle travel (e.g., parallel to the direction of travel, or "vertical") to provide redundant coverage of that sensor type over the same location (e.g., to ensure data coverage, to enable statistical analysis based on multiple measurements over the same location), arranged with a different sensor type across the direction of robotic vehicle travel to capture a diversity of sensor data in side-by-side locations along the direction of robotic vehicle travel (e.g., providing both ultra-sonic and conductivity measurements at side-by-side locations), arranged with a different sensor type along the direction of robotic vehicle travel to provide predictive sensing from a leading sensor to a trailing sensor (e.g., running a trailing gamma-ray sensor measurement only if a leading ultra-sonic sensor measurement indicates the need to do so), combinations of any of these, and the like. The modularity of the robotic vehicle may permit exchanging sensor sleds with the same sensor configuration (e.g., replacement due to wear or failure), different sensor configurations (e.g., adapting the sensor arrangement for different surface applications), and the like.

Providing for multiple simultaneous sensor measurements over a surface area, whether for taking data from the same sensor type or from different sensor types, provides the ability to maximize the collection of sensor data in a single run of the robotic vehicle. If the surface over which the robotic vehicle was moving were perfectly flat, the sensor sled could cover a substantial surface with an array of sensors. However, the surface over which the robotic vehicle travels may be highly irregular and have obstacles over which the sensor sleds must adjust, and so the preferred embodiment for the sensor sled is relatively small with a highly flexible orientation, as described herein, where a plurality of sensor sleds is arranged to cover an area along the direction of robotic vehicle travel.

Sensors may be distributed amongst the sensor sleds as described for individual sensor sleds (e.g., single sensor per sensor sled, multiple sensors per sensor sled (arranged as described herein)), where total coverage is achieved through a plurality of sensor sleds mounted to the robotic vehicle. One such embodiment, as introduced herein, such as depicted in FIG. 1, comprises a plurality of sensor sleds arranged linearly across the direction of robotic vehicle travel, where the plurality of sensor sleds is capable of individually adjusting to the irregular surface as the robotic vehicle travels. Further, each sensor sled may be positioned to accommodate regular characteristics in the surface (e.g., positioning sensor sleds to ride along a selected portion of a pipe aligned along the direction of travel), to provide for multiple detections of a pipe or tube from a number of radial positions, sensor sleds may be shaped to accommodate the shape of regular characteristics in the surface (e.g., rounded surface of a pipe), and the like. In this way, the sensor sled arrangement may accommodate both the regular character-istics in the surface (e.g., a series of features along the direction of travel) and irregular characteristics along the surface (e.g., obstacles that the sensor sleds flexibly mitigate during travel along the surface).

Although FIG. 1 depicts a linear arrangement of sensor sleds with the same extension (e.g., the same connector arm length), another example arrangement may include sensor sleds with different extensions, such as where some sensor sleds are arranged to be positioned further out, mounted on longer connection arms. This arrangement may have the advantage of allowing a greater density of sensors across the configuration, such as where a more leading sensor sled could be positioned linearly along the configuration between two more trailing sensor sleds such that sensors are provided greater linear coverage than would be possible with all the sensor sleds positioned side-by-side. This configuration may also allow improved mechanical accommodation between the springs and connectors that may be associated with connections of sensor sleds to the arms and connection assembly (e.g., allowing greater individual movement of sensor sleds without the sensor sleds making physical con-tact with one another).

Embodiments with multiple sensor sled connector assem-blies provide configurations and area distribution of sensors that may enable greater flexibility in sensor data taking and processing, including alignment of same-type sensor sleds allowing for repeated measurements (e.g., the same sensor used in a leading sensor sled as in a trailing sensor sled, such as for redundancy or verification in data taking when leading and trailing sleds are co-aligned), alignment of different-type sensor sleds for multiple different sensor measurements of the same path (e.g., increase the number of sensor types taking data, have the lead sensor provide data to the pro-cessor to determine whether to activate the trailing sensor (e.g., ultra-sonic/gamma-ray, and the like)), off-set align-ment of same-type sensor sleds for increased coverage when leading and trailing sleds are off-set from one another with respect to travel path, off-set alignment of different-type sensor sleds for trailing sensor sleds to measure surfaces that have not been disturbed by leading sensor sleds (e.g., when the leading sensor sled is using a couplant), and the like.

The modular design of the robotic vehicle may provide for a system flexible to different applications and surfaces (e.g., customizing the robot and modules of the robot ahead of time based on the application, and/or during an inspection operation), and to changing operational conditions (e.g., flexibility to changes in surface configurations and condi-tions, replacement for failures, reconfiguration based on sensed conditions), such as being able to change out sensors, sleds, assemblies of sleds, number of sled arrays, and the like.

An example inspection robot utilizes a magnet-based wheel design. Although the inspection robot may utilize flux directing ferromagnetic wheel components, such as ferro-magnetic magnet enclosures 3 (FIG. 1) to minimize the strength of the extended magnetic field, ferromagnetic com-ponents within the inspection robot may be exposed to a magnetic field.

Throughout the present description, certain orientation parameters are described as "horizontal," "perpendicular," and/or "across" the direction of travel of the inspection robot, and/or described as "vertical," "parallel," and/or in line with the direction of travel of the inspection robot. It is specifically contemplated herein that the inspection robot may be travelling vertically, horizontally, at oblique angles, and/or on curves relative to a ground-based absolute coor-dinate system. Accordingly, except where the context oth-erwise requires, any reference to the direction of travel of the inspection robot is understood to include any orientation of the robot—such as an inspection robot traveling horizontally on a floor may have a "vertical" direction for purposes of understanding sled distribution that is in a "horizontal" absolute direction. Additionally, the "vertical" direction of the inspection robot may be a function of time during inspection operations and/or position on an inspection sur-face—for example as an inspection robot traverses over a curved surface. In certain embodiments, where gravitational considerations or other context-based aspects may indi-cate—vertical indicates an absolute coordinate system ver-tical—for example in certain embodiments where couplant flow into a cone is utilized to manage bubble formation in the cone. In certain embodiments, a trajectory through the inspection surface of a given sled may be referenced as a "horizontal inspection lane"—for example, the track that the sled takes traversing through the inspection surface.

Certain embodiments include an apparatus for acoustic inspection of an inspection surface with arbitrary resolution. Arbitrary resolution, as utilized herein, includes resolution of features in geometric space with a selected resolution—for example resolution of features (e.g., cracks, wall thick-ness, anomalies, etc.) at a selected spacing in horizontal space (e.g., perpendicular to a travel direction of an inspec-tion robot) and/or vertical space (e.g., in a travel direction of an inspection robot). While resolution is described in terms of the travel motion of an inspection robot, resolution may instead be considered in any coordinate system, such as cylindrical or spherical coordinates, and/or along axes unre-lated to the motion of an inspection robot. It will be understood that the configurations of an inspection robot and operations described in the present disclosure can support arbitrary resolution in any coordinate system, with the inspection robot providing sufficient resolution as operated, in view of the target coordinate system. Accordingly, for example, where inspection resolution of (6)-inches is desired in a target coordinate system that is diagonal to the travel direction of the inspection robot, the inspection robot and related operations described throughout the present disclosure can support whatever resolution is required (whether greater than (6)-inches, less than (6)-inches, or variable resolution depending upon the location over the inspection surface) to facilitate the (6)-inch resolution of the target coordinate system. As will be understood, an inspection robot and/or related operations capable of achieving an arbitrary resolution in the coordinates of the movement of the inspection robot can likewise achieve arbitrary resolution in any coordinate system for the mapping of the inspection surface. For clarity of description, apparatus, and operations to support an arbitrary resolution are described in view of the coordinate system of the movement of an inspection robot.

An example apparatus to support acoustic inspection of an inspection surface includes an inspection robot having a payload and a number of sleds mounted thereon, with the sleds each having at least one acoustic sensor mounted thereon. Accordingly, the inspection robot is capable of simultaneously determining acoustic parameters at a range of positions horizontally. Sleds may be positioned horizontally at a selected spacing, including providing a number of sleds to provide sensors positioned radially around several positions on a pipe or other surface feature of the inspection surface. In certain embodiments, vertical resolution is supported according to the sampling rate of the sensors, and/or the movement speed of the inspection robot. Additionally, or alternatively, the inspection robot may have vertically displaced payloads, having an additional number of sleds mounted thereon, with the sleds each having at least one acoustic sensor mounted thereon. The utilization of additional vertically displaced payloads can provide additional resolution, either in the horizontal direction (e.g., where sleds of the vertically displaced payload(s) are offset from sleds in the first payload(s)) and/or in the vertical direction (e.g., where sensors on sleds of the vertically displaced payload(s) are sampling such that sensed parameters are vertically offset from sensors on sleds of the first payload (s)). Accordingly, as will be understood, even where physical limitations of sled spacing, numbers of sensors supported by a given payload, or other considerations limit horizontal resolution for a given payload, horizontal resolution can be enhanced through the utilization of additional vertically displaced payloads. In certain embodiments, an inspection robot can perform another inspection run over a same area of the inspection surface, for example with sleds tracking in an offset line from a first run, with positioning information to ensure that both horizontal and/or vertical sensed parameters are offset from the first run.

Accordingly, an apparatus is provided that achieves significant resolution improvements, horizontally and/or vertically, over previously known systems. Additionally, or alternatively, an inspection robot performs inspection operations at distinct locations on a descent operation than on an ascent operation, providing for additional resolution improvements without increasing a number of run operations required to perform the inspection (e.g., where an inspection robot ascends an inspection surface, and descends the inspection surface as a normal part of completing the inspection run). In certain embodiments, an apparatus is configured to perform multiple run operations to achieve the selected resolution. As will be understood, the greater the number of inspection runs required to achieve a given spatial resolution, the longer the down time for the system (e.g., an industrial system) being inspected (where a shutdown of the system is required to perform the inspection), the longer the operating time and greater the cost of the inspection, and/or the greater chance that a failure occurs during the inspection. Accordingly, even where multiple inspection runs are required, a reduction in the number of the inspection runs is beneficial.

In certain embodiments, an inspection robot includes a low fluid loss couplant system, enhancing the number of sensors that are supportable in a given inspection run, thereby enhancing available sensing resolution. In certain embodiments, an inspection robot includes individual down force support for sleds and/or sensors, providing for reduced fluid loss, reduced off-nominal sensing operations, and/or increasing the available number of sensors supportable on a payload, thereby enhancing available sensing resolution. In certain embodiments, an inspection robot includes a single couplant connection for a payload, and/or a single couplant connection for the inspection robot, thereby enhancing reliability and providing for a greater number of sensors on a payload and/or on the inspection robot that are available for inspections under commercially reasonable operations (e.g., configurable for inspection operations with reasonable reliability, checking for leaks, expected to operate without problems over the course of inspection operations, and/or do not require a high level of skill or expensive test equipment to ensure proper operation). In certain embodiments, an inspection robot includes acoustic sensors coupled to acoustic cones, enhancing robust detection operations (e.g., a high percentage of valid sensing data, case of acoustic coupling of a sensor to an inspection surface, etc.), reducing couplant fluid losses, and/or easing integration of sensors with sleds, thereby supporting an increased number of sensors per payload and/or inspection robot, and enhancing available sensing resolution. In certain embodiments, an inspection robot includes utilizing water as a couplant, thereby reducing fluid pumping losses, reducing risks due to minor leaks within a multiple plumbing line system to support multiple sensors, and/or reducing the impact (environmental, hazard, clean-up, etc.) of performing multiple inspection runs and/or performing an inspection operation with a multiplicity of acoustic sensors operating.

Figure 8:
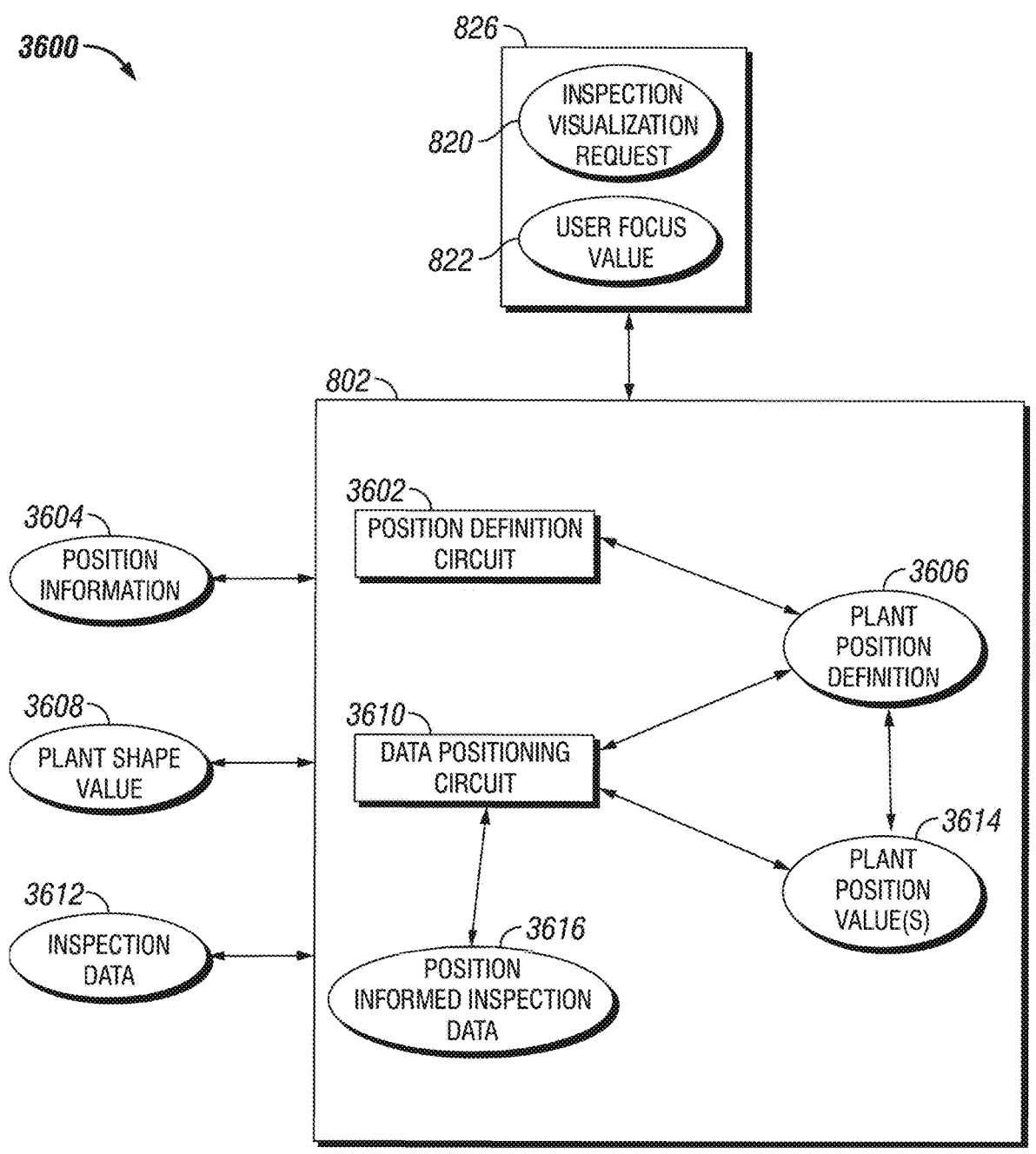
FIG. 8 is a schematic block diagram of an apparatus for providing position informed inspection data consistent with certain embodiments of the present disclosure.

Referencing FIG. 8, an example apparatus 3600 to inspect a plant, industrial system, and/or inspection surface utilizing position information is depicted schematically. The example apparatus 3600 includes a position definition circuit 3602 that interprets position information 3604, and/or determines a plant position definition 3606 (e.g., a plant definition value) and an inspection robot position (e.g., as one or more plant position values 3614) in response to the position information 3604. Example and non-limiting position information 3604 includes relative and/or absolute position information—for example a distance from a reference position (e.g., a starting point, stopping point, known object in proximity to the plant, industrial system, and/or inspection surface, or the like). In certain embodiments, position information 3604 is determinable according to a global positioning service (GPS) device, ultra-wide band radio frequency (RF) signaling, LIDAR or other direct distance measurement devices (including line-of-sight and/or sonar devices), aggregating from reference points (e.g., routers, transmitters, know devices in communication with the inspection robot, or the like), utilizing known obstacles as a reference point, encoders (e.g., a wheel counter or other device), barometric sensors (e.g., altitude determination), utilization of a known sensed value correlated to position (e.g., sound volume or frequency, temperature, vibration, etc.), and/or utilizing an inertial measurement unit (e.g., measuring and/ or calculating utilizing an accelerometer and/or gyroscope). In certain embodiments, values may be combined to determine the position information 3604—for example in 3-D space without further information, four distance measurements are ordinarily required to determine a specific position value. However, utilizing other information, such as a region of the inspection surface that the inspection robot is operating on (e.g., which pipe the inspection robot is climbing), an overlay of the industrial surface over the measurement space, a distance traveled from a reference point, a distance to a reference point, etc., the number of distance measurements required to determine a position value can be reduced to three, two, one, or even eliminated and still position information 3604 is determinable. In certain embodiments, the position definition circuit 3602 determines the position information 3604 completely or partially on dead reckoning (e.g., accumulating speed and direction from a known position, and/or direction combined with a distance counter), and/or corrects the position information 3604 when feedback-based position data (e.g., a true detected position) is available.

Example and non-limiting plant position values 3614 include the robot position information 3604 integrated within a definition of the plant space, such as the inspection surface, a defined map of a portion of the plant or industrial system, and/or the plant position definition 3606. In certain embodiments, the plant space is predetermined, for example as a map interpreted by the controller 802 and/or pre-loaded in a data file describing the space of the plant, inspection surface, and/or a portion of the plant or industrial surface. In certain embodiments, the plant position definition 3606 is created in real-time by the position definition circuit 3602—for example by integrating the position information 3604 traversed by the inspection robot, and/or by creating a virtual space that includes the position information 3604 traversed by the inspection robot. For example, the position definition circuit 3602 may map out the position information 3604 over time and create the plant position definition 3606 as the aggregate of the position information 3604, and/or create a virtual surface encompassing the aggregated plant position values 3614 onto the surface. In certain embodiments, the position definition circuit 3602 accepts a plant shape value 3608 as an input (e.g., a cylindrical tank being inspected by the inspection robot having known dimensions), deduces the plant shape value 3608 from the aggregated position information 3604 (e.g., selecting from one of a number of simple or available shapes that are consistent with the aggregated plant position definition 3606), and/or prompts a user (e.g., an inspection operator and/or a client for the data) to select one of a number of available shapes to determine the plant position definition 3606.

The example apparatus 3600 includes a data positioning circuit 3610 that interprets inspection data 3612 and correlates the inspection data 3612 to the position information 3604 and/or to the plant position values 3614. Example and non-limiting inspection data 3612 includes: sensed data by an inspection robot; environmental parameters such as ambient temperature, pressure, time-of-day, availability and/or strength of wireless communications, humidity, etc.; image data, sound data, and/or video data taken during inspection operations; metadata such as an inspection number, customer number, operator name, etc.; setup parameters such as the spacing and positioning of sleds, payloads, mounting configuration of sensors, and the like; calibration values for sensors and sensor processing; and/or operational parameters such as fluid flow rates, voltages, pivot positions for the payload and/or sleds, inspection robot speed values, downforce parameters, etc. In certain embodiments, the data positioning circuit 3610 determines the position information 3604 corresponding to inspection data 3612 values and includes the positional information 3604 as an additional parameter with the inspection data 3612 values and/or stores a correspondence table or other data structure to relate the position information 3604 to the inspection data 3612 values. In certain embodiments, the data positioning circuit 3610 additionally or alternatively determines the plant position definition 3606, and includes a plant position value 3614 (e.g., as a position within the plant as defined by the plant position definition 3606) as an additional parameter with the inspection data 3612 values and/or stores a correspondence table or other data structure to relate the plant position values 3614 to the inspection data 3612 values. In certain embodiments, the data positioning circuit 3610 creates position informed inspection data 3616, including one or more, or all, aspects of the inspection data 3612 correlated to the position information 3604 and/or to the plant position values 3614.

In certain embodiments, for example where dead reckoning operations are utilized to provide position information 3604 over a period of time, and then a corrected position is available through a feedback position measurement, the data positioning circuit 3602 updates the position informed inspection data 3616—for example re-scaling the data according to the estimated position for values according to the changed feedback position (e.g., where the feedback position measurement indicates the inspection robot traveled 25% further than expected by dead reckoning, position information 3604 during the dead reckoning period can be extended by 25%) and/or according to rationalization determinations or externally available data (e.g., where over 60 seconds the inspection robot traverses 16% less distance than expected, but sensor readings or other information indicate the inspection robot may have been stuck for 10 seconds, then the position information 3604 may be corrected to represent the 10-seconds of non-motion rather than a full re-scale of the position informed inspection data 3616). In certain embodiments, dead reckoning operations may be corrected based on feedback measurements as available, and/or in response to the feedback measurement indicating that the dead reckoning position information exceeds a threshold error value (e.g., 1%, 0.1%, 0.01%, etc.).

It can be seen that the operations of apparatus 3600 provide for position-based inspection information. Certain systems, apparatuses, and procedures throughout the present disclosure utilize and/or can benefit from position informed inspection data 3616, and all such embodiments are contemplated herein. Without limitation to any other disclosures herein, certain aspects of the present disclosure include: providing a visualization of inspection data 3612 in position information 3604 space and/or in plant position value 3614 space; utilizing the position informed inspection data 3616 in planning for a future inspection on the same or a similar plant, industrial system, and/or inspection surface (e.g., configuring sled number and spacing, inspection robot speed, inspection robot downforce for sleds and/or sensors, sensor calibrations, planning for traversal and/or avoidance of obstacles, etc.); providing a format for storing a virtual mark (e.g., replacing a paint or other mark with a virtual mark as a parameter in the inspection data 3612 correlated to a position); determining a change in a plant condition in response to the position informed inspection data 3616 (e.g., providing an indication that expected position information 3604 did not occur in accordance with the plant position definition 3606—for example indicating a failure, degradation, or unexpected object in a portion of the inspected plant that is not readily visible); and/or providing a health indicator of the inspection surface (e.g., depicting regions that are nominal, passed, need repair, will need repair, and/or have failed). In certain embodiments, it can be seen that constructing the position informed inspection data 3616 using position information 3604 only, including dead reckoning based position information 3604, nevertheless yields many of the benefits of providing the position informed inspection data 3616. In certain further embodiments, the position informed inspection data 3616 is additionally or alternatively constructed utilizing the plant position definition 3606, and/or the plant position values 3614.

Figures 9, 10:
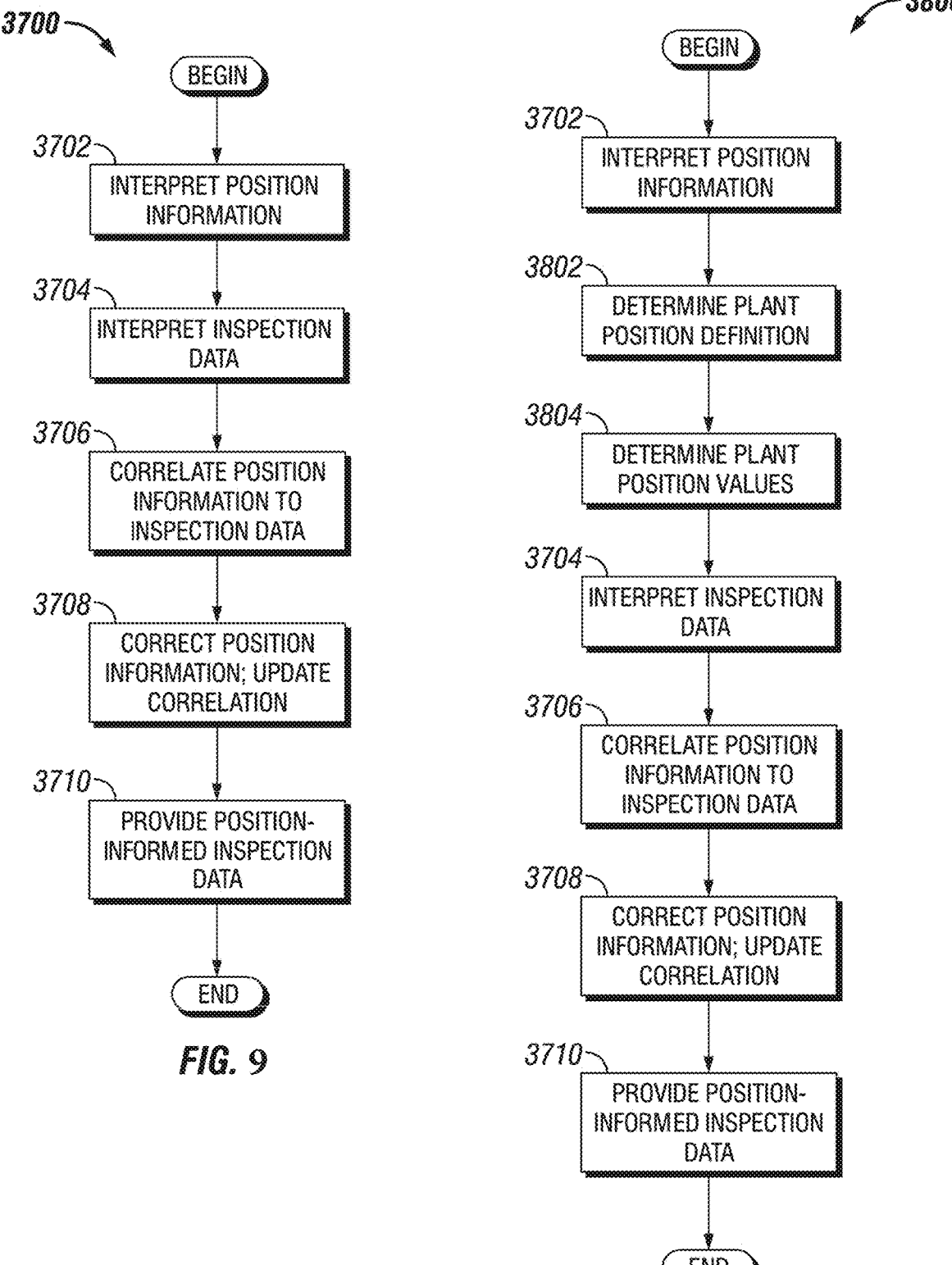
FIG. 9 is a schematic flow diagram of a procedure to provide position informed inspection data consistent with certain embodiments of the present disclosure.
FIG. 10 is a schematic flow diagram of another procedure to provide position informed inspection data consistent with certain embodiments of the present disclosure.

Referencing FIG. 9, an example procedure 3700 to inspect a plant, industrial system, and/or inspection surface utilizing position information is depicted. The example procedure 3700 includes an operation 3702 to interpret position information, an operation 3704 to interpret inspection data, and an operation 3706 correlate the inspection data to the position information. The example procedure 3700 further includes an operation 3708 to correct the position information (e.g., updating a dead reckoning-based position information), and to update the correlation of the inspection data to the position information. The example procedure further includes an operation 3710 to provide position informed inspection data in response to the correlated inspection data. In certain embodiments, operation 3706 is additionally or alternatively performed on the position informed inspection data, where the position informed inspection data is corrected, and operation 3710 includes providing the position informed inspection data. In certain embodiments, one or more operations of a procedure 3700 are performed by a controller 802.

Referencing FIG. 10, an example procedure 3800 to inspect a plant, industrial system, and/or inspection surface utilizing position information is depicted. In addition to operations of procedure 3700, example procedure 3800 includes an operation 3802 to determine a plant definition value, and an operation 3804 to determine plant position values in response to the position information and the plant position definition. Operation 3706 further includes an operation to correlate the inspection data with the position information and/or the plant position values. In certain embodiments, one or more operations of procedure 3800 are performed by a controller 802.

Figure 11:
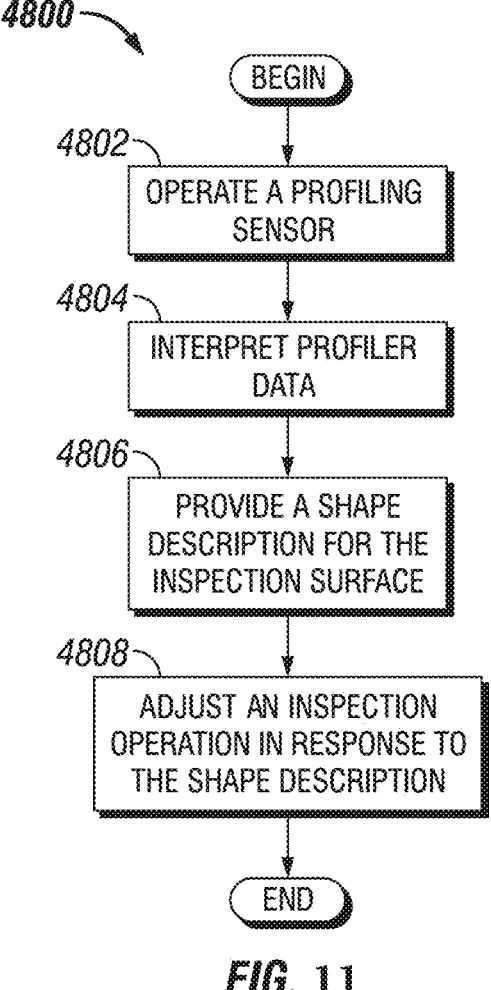
FIG. 11 is a schematic flow diagram of a procedure to adjust an inspection operation in response to profiler data consistent with certain embodiments of the present disclosure.

Referencing FIG. 11, an example procedure 4800 for utilizing a profiling sensor on an inspection robot is schematically depicted. The example procedure 4800 includes an operation 4802 to operate a profiling sensor on at least a portion of an inspection surface, and an operation 4804 to interpret profiler data in response to the operation 4802. The example procedure 4800 further includes an operation 4806 to characterize a shape of the inspection surface, and/or thereby provide a shape description for the inspection surface, and an operation 4808 to adjust an inspection operation in response to the shape of the inspection surface.

Figure 12:
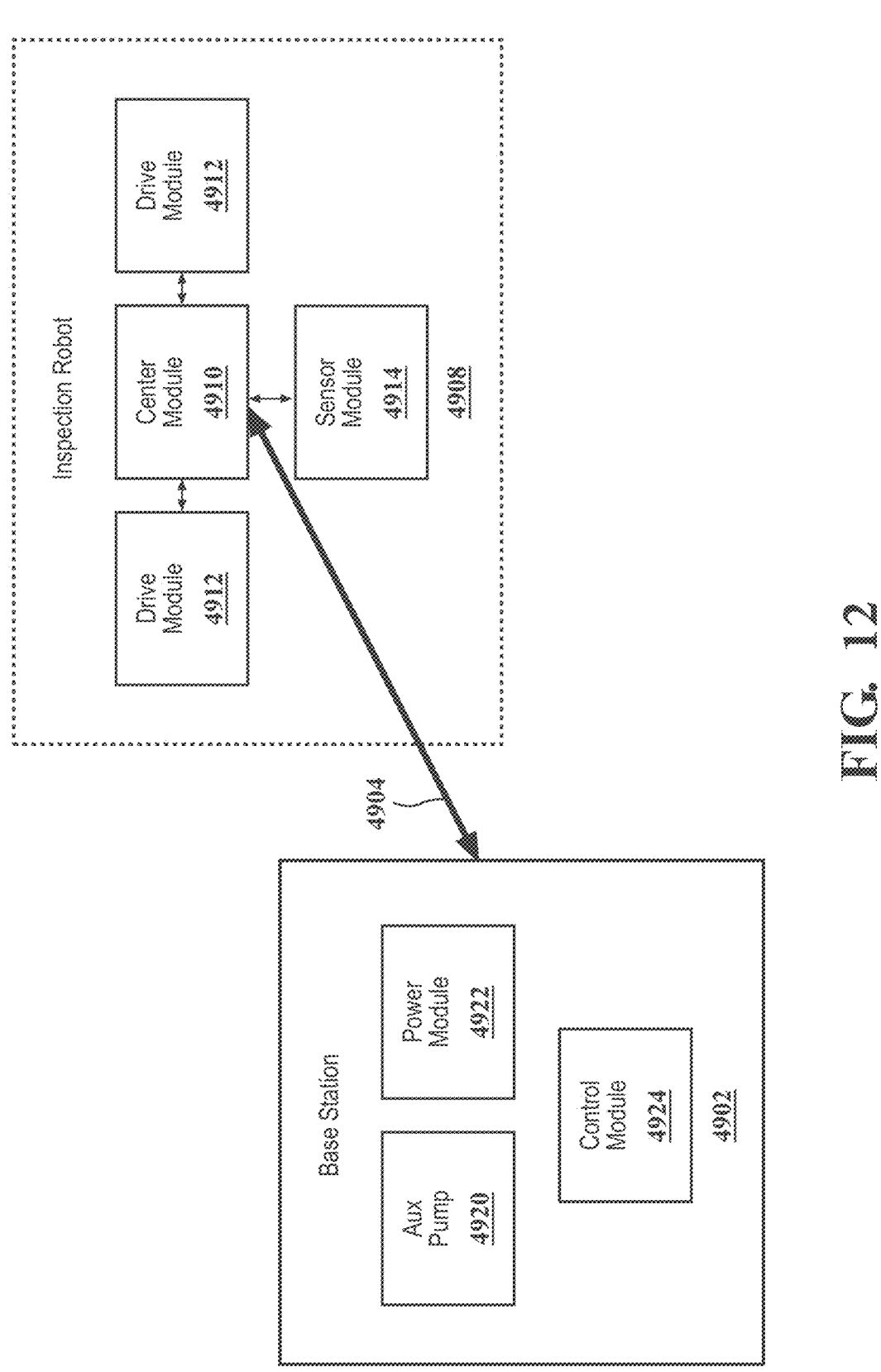
FIG. 12 depicts a schematic of an example system including a base station and an inspection robot consistent with certain embodiments of the present disclosure.

As shown in FIG. 12, a system, in accordance with certain embodiments of the current disclosure, may comprise a base station 4902 connected by a tether 4904 to a center module 4910 of a robot 4908 used to traverse an industrial surface. The tether 4904 may be a conduit for power, fluids, control, and data communications between the base station 4902 and the robot 4908. The robot 4908 may include a center module 4910 connected to one or more drive modules 4912 which enable the robot 4908 to move along an industrial surface. The center module 4910 may be coupled to one or more sensor modules 4914 for measuring an industrial surface—for example the sensor modules 4914 may be positioned on a drive module 4912, on the payload, in the center body housing, and/or aspects of a sensor module 4914 may be distributed among these. An example embodiment includes the sensor modules 4914 each positioned on an associated drive module 4912, and electrically coupled to the center module 4910 for power, communications, and/or control. The base station 4902 may include an auxiliary pump 4920, a control module 4924 and a power module 4922. The example robot 4908 may be an inspection robot, which may include any one or more of the following features: inspection sensors, cleaning tools, and/or repair tools. In certain embodiments, it will be understood that an inspection robot 4908 is configured to perform only cleaning and/or repair operations, and/or may be configured for sensing, inspection, cleaning, and/or repair operations at different operating times (e.g., performing one type of operation at a first operating time, and performing another type of operation at a second operating time), and/or may be configured to perform more than one of these operations in a single run or traversal of an industrial surface (e.g., the "inspection surface"). The modules 4910, 4912, 4914, 4920, 4922, 4924 are configured to functionally execute operations described throughout the present disclosure and may include any one or more hardware aspects as described herein, such as sensors, actuators, circuits, drive wheels, motors, housings, payload configurations, and the like.

Figure 13:
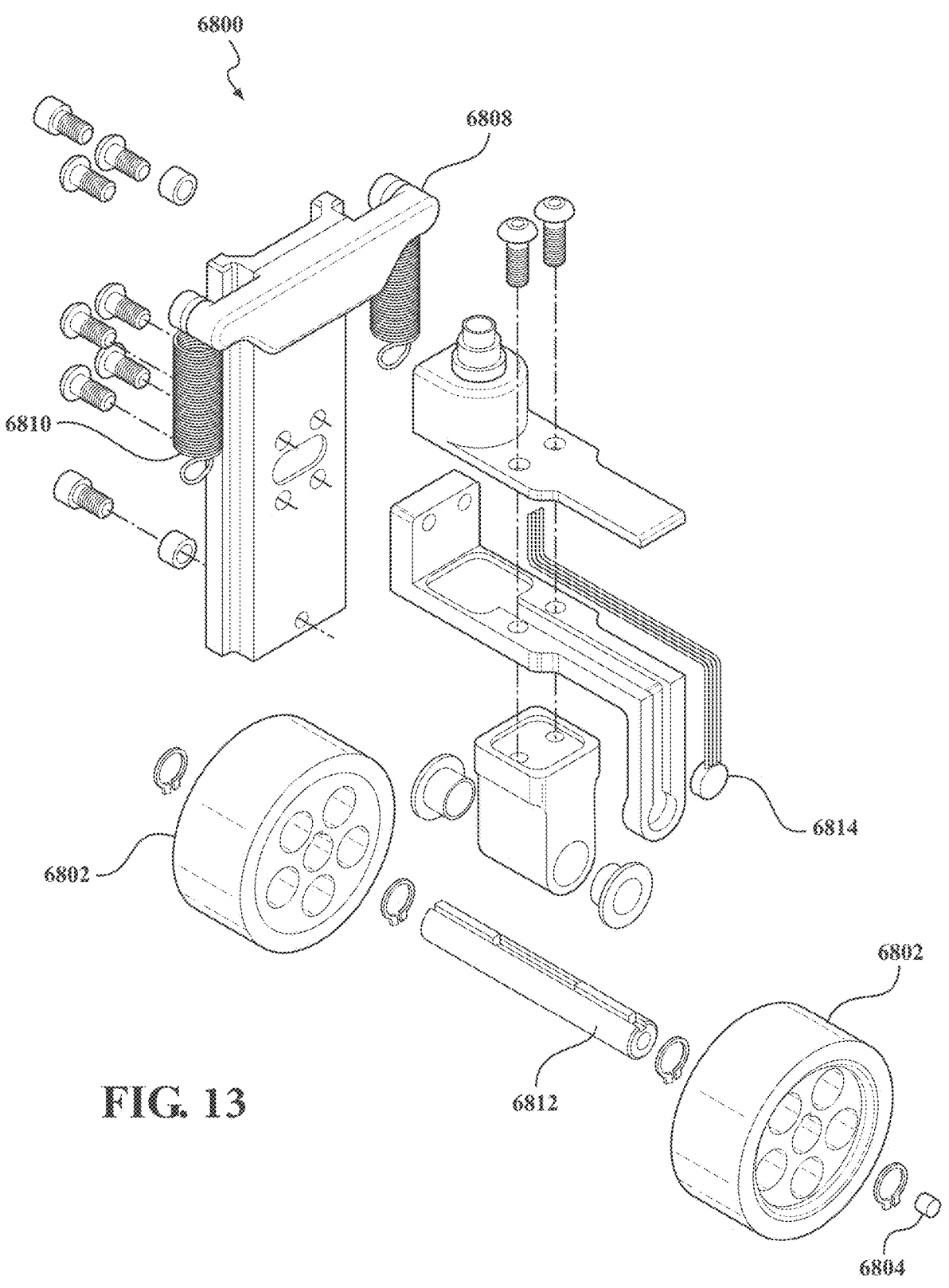
FIG. 13 depicts an exploded view of a contact encoder consistent with certain embodiments of the present disclosure.

Referencing FIG. 13, the inspection robot 100 (FIG. 1) may include a contact encoder module 6800 positioned between the two drive wheels of a drive module. As shown in FIG. 13, the encoder module 6800 may include two over molded encoder wheels 6802 having a non-slip surface to ensure continuous monitoring of the industrial surface being inspected. An encoder wheel 6802 mounted on an encoder roller shaft 6812 may include an encoder magnet 6804 which creates a changing electro-magnetic field as the encoder wheel 6802 rolls along the industrial surface. This changing magnetic field may be measured by an encoder 6814 in close proximity to the encoder magnet 6804. Without limitation to any particular theory of operation, it has been found that the encoder assembly operates successfully without EMI shielding, which may be due to the close proximity, approximately a millimeter or less, of the encoder magnet 6804 to the encoder 6814 the contact encoder, and/or due to the symmetry of the magnetic fields from the wheels in the region of the encoder. The encoder module 6800 may include a spring mount 6808 having a sliding coupler and a spring 6810 that exerts a downward pressure on the encoder wheels 6802 to ensure contact with the industrial surface as the robot negotiates obstacles and angle transitions. There may be one or two encoder wheels positioned between the drive wheels, either side by side or in a linear orientation, and in certain embodiments a sensor may be associated with only one, or with both, encoder wheels. In certain embodiments, each drive module may have a separate encoder assembly associated therewith, providing for the capability to determine rotational angles (e.g., as a failure condition where linear motion is expected, and/or to enable two-dimensional traversal on a surface such as a tank or pipe interior), differential slip between drive modules, and the like.

Data from the encoder assembly 6800 encoder and the driven wheel encoder (e.g., the motion and/or position sensor associated with the drive motor for the magnetic wheels) provide an example basis for deriving additional information, such as whether a wheel is slipping by comparing the encoder assembly readings (which should reliably show movement only when actual movement is occurring) to those of the driven wheel encoders on the same drive module. If the encoder assembly shows limited or no motion while the driven wheel encoder(s) show motion, drive wheels slipping may be indicated. Data from the encoder assembly and the driven wheel encoders may provide a basis for deriving additional information such as whether the robot is travelling in a straight line, as indicated by similar encoder values between corresponding encoders in each of the two drive modules on either side of the robot. If the encoders on one of the drive modules indicate little or no motion while the encoders of the other drive module show motion, a turning of the inspection robot toward the side with limited movement may be indicated.

The base station may include a GPS module or other facility for recognizing the position of the base station in a plant. The encoders on the drive module provide both absolute (relative to the robot) and relative information regarding movement of the robot over time. The combination of data regarding an absolute position of the base station and the relative movement of the robot may be used to ensure complete plant inspection and the ability to correlate location with inspection map.

The central module may have a camera that may be used for navigation and obstacle detection, and/or may include both a front and rear camera. A video feed from a forward-facing camera (relative to the direction of travel) may be communicated to the base station to assist an operator in obstacle identification, navigation, and the like. The video feed may switch between cameras with a change in direction, and/or an operator may be able to selectively switch between the two camera feeds. Additionally, or alternatively, both cameras may be utilized at the same time (e.g., provided to separate screens, and/or saved for later retrieval). The video and the sensor readings may be synchronized such that, for example: an operator (or display utility) reviewing the data would be able to have (or provide) a coordinated visual of the inspection surface in addition to the sensor measurements to assist in evaluating the data; to provide repairs, mark repair locations, and/or confirm repairs; and/or to provide cleaning operations and/or confirm cleaning operations. The video camera feeds may also be used for obstacle detection and path planning, and/or coordinated with the encoder data, other position data, and/or motor torque data for obstacle detection, path planning, and/or obstacle clearance operations.

Figure 14:
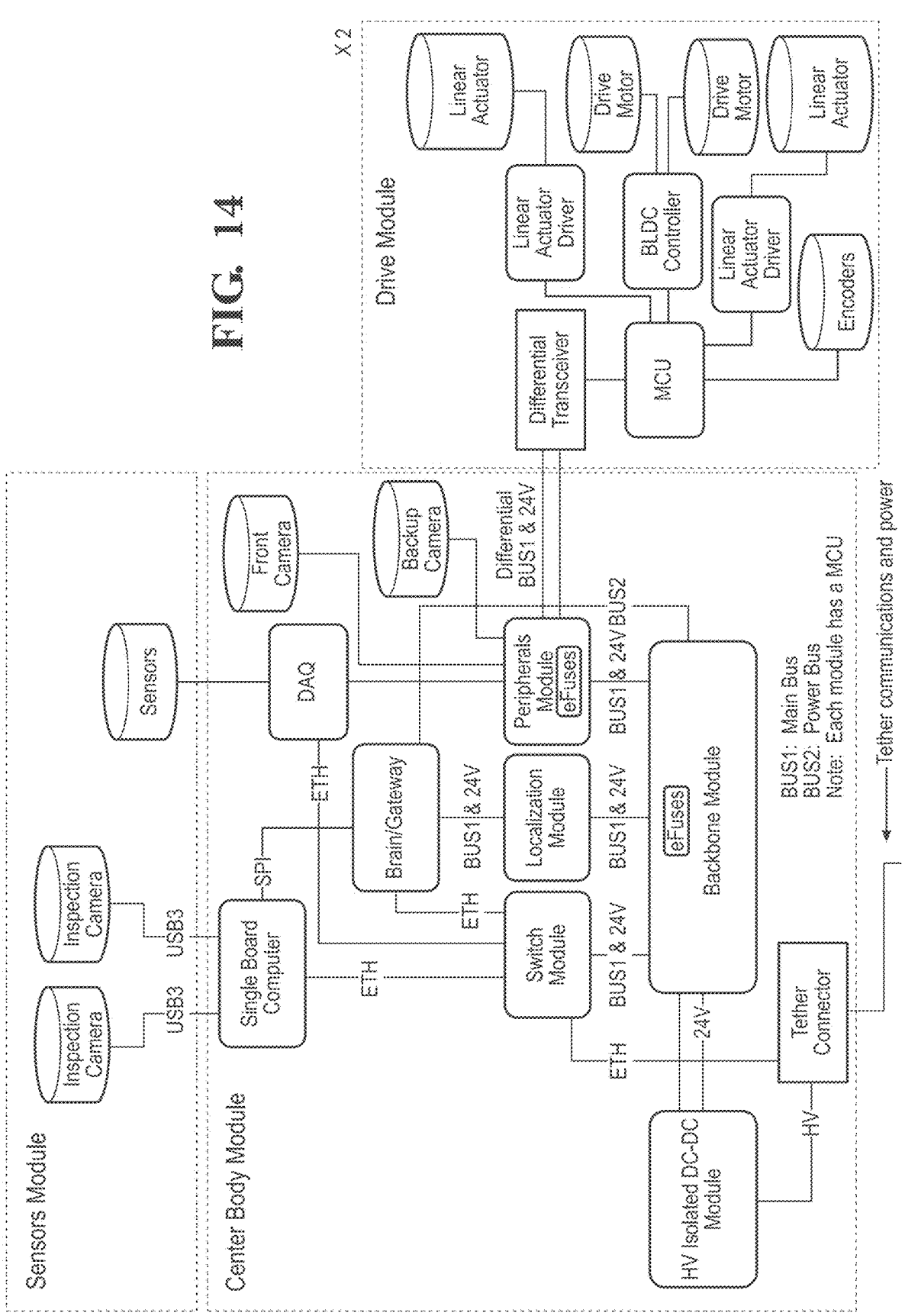
FIG. 14 depicts a schematic block diagram of a control scheme for an inspection robot consistent with certain embodiments of the present disclosure.

FIG. 14 depicts a schematic block diagram of a control scheme for an inspection robot. The example control scheme includes distributed control, with a high-level controller (e.g., the brain/gateway, and/or with distributed elements in the base station) providing standardized commands and communications to highly capable low-level controllers that provide hardware specific responses. Various communication and/or power paths are depicted between controllers in the example of FIG. 14, although specific communication protocols, electrical power characteristics, and the like are non-limiting examples for clarity of the present description. In the example of FIG. 14, two separate drive modules may be present in certain embodiments, each having an interface to the center body. In the example of FIG. 14, the sensor module includes the inspection cameras and sensor communications and may be on the payload and/or associated with the payload (e.g., on the center body side and in communication with sensors of the payload).

Figure 15:
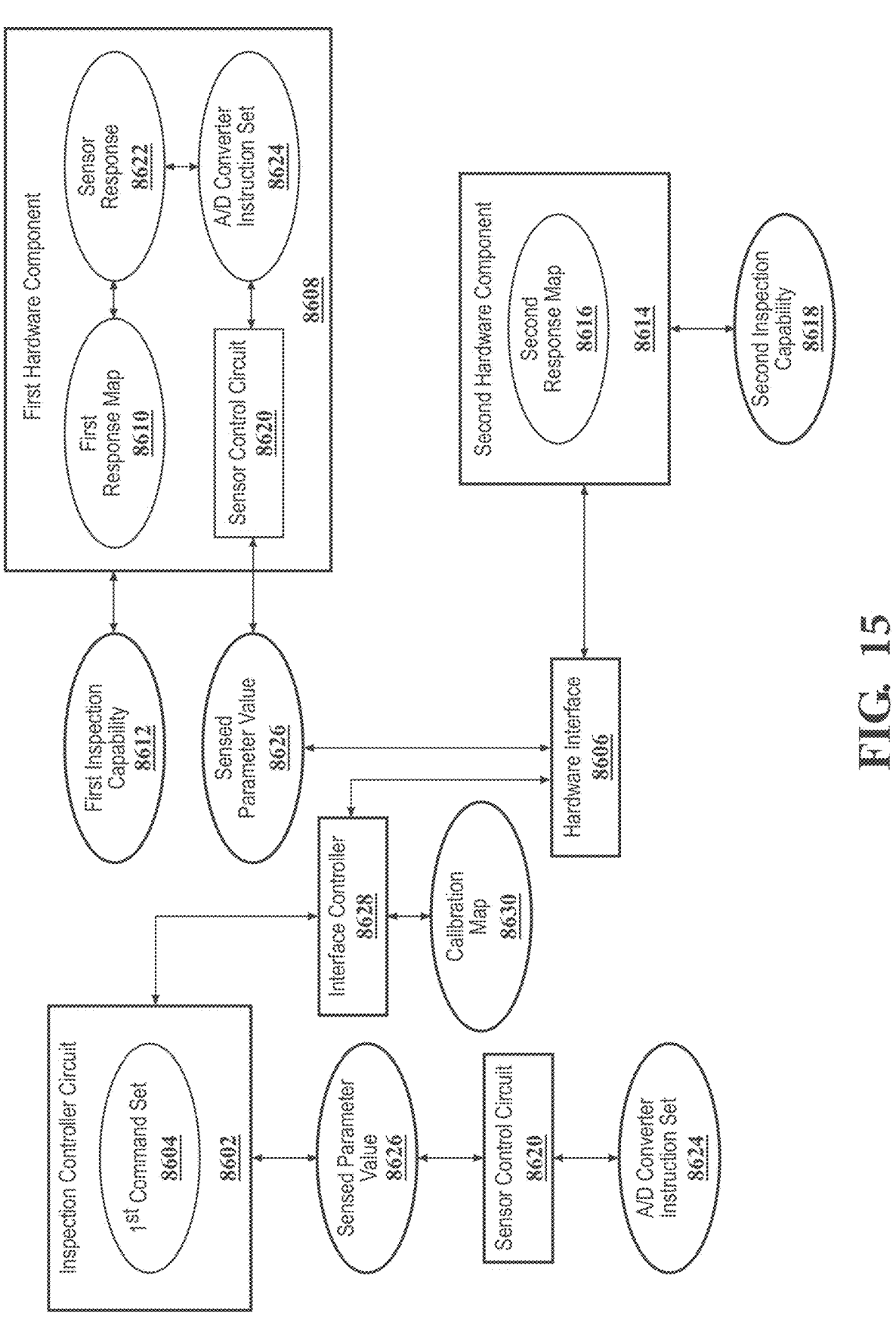
FIG. 15 is a schematic diagram of a system for distributed control of an inspection robot consistent with certain embodiments of the present disclosure.

Referencing FIG. 15, an example system for operating an inspection robot having a distributed microcontroller assembly is depicted, the distributed microcontroller assembly supporting modular control operations, and allowing for rapid prototyping, testing, reconfiguration of the inspection robot, and swapping of hardware components without requiring changes to the primary inspection control functions of the inspection robot.

The example system includes an inspection controller circuit 8602 that operates an inspection robot using a first command set 8604. In certain embodiments, the first command set 8604 includes high-level inspection control commands, such as robot positioning and/or movement instructions, instructions to perform sensing operations and/or actuator operations, and may further include instructions using standardized parameters, state values, and the like that are separated from low-level instructions that might be configured for the specific characteristics of hardware components of the inspection robot. For example, an actuator may be responsive to specific voltage values, position instructions, or the like, where the example first command set includes instructions such as whether the actuator should be activated, a down force to be applied by the actuator, a position target value of an actuated component such as a payload or stability assist device, and/or a state value such as "inspecting", "stability assist stored", "stability assist deployed", "payload raised", etc.

The example system includes a hardware interface 8606 in communication with the inspection coordination controller 8704 (FIG. 16), where the hardware interface utilizes the first command set 8604. The example system further includes a first hardware component 8608 that is operatively couplable to the hardware interface 8606, and a second hardware component 8614 that is couplable to the hardware interface 8606. The hardware components 8608, 8614 may include sensors, actuators, payloads, and/or any other device that, when coupled to the inspection robot, communicates and/or is controlled by the inspection robot during inspection operations. In certain embodiments, one or more of the hardware components 8608, 8614 includes a painting device, an actuator, a camera, a welding device, a marking device, and/or a cleaning device. The example first hardware component 8608 includes a first response map 8610, which may include a description of sensor response values (e.g., voltages, frequency values, current values, or the like) provided by the hardware component 8608 and corresponding values used by the inspection robot, such as the represented sensed values (e.g., temperature, UT return time, wall thickness indicated, etc.). Another example first response map 8610 may include a description of actuation command values provided by the inspection robot corresponding to actuator responses for the values. For example, actuation command values may be an actuator position value, where the actuator responses may be voltage values, current values, or the like provided to the actuator. The example second hardware component 8614 including a second response map 8616. In certain embodiments, the first response map 8610 is distinct from the second response map 8616.

In certain embodiments, the actuation command values and/or the represented sensed values are more specific to the hardware component than parameters utilized in the first command set 8604. In certain embodiments, as described following, an interface controller 8628 and/or a low-level hardware control circuit (e.g., sensor control circuit 8620) may be present and interposed between the hardware component and the inspection controller circuit 8602. Intermediate controllers or control circuits may be positioned on either side of the hardware interface 8606 and may further be positioned on the respective hardware controller.

The system includes the inspection controller circuit 8602 controlling the first hardware component 8608 or the second hardware component 8614 utilizing the first command set 8604. The system having the first hardware component 8608 coupled to the hardware interface 8606 has a first inspection capability 8612, and the system having the second hardware component 8614 coupled to the hardware interface 8606 has a second inspection capability 8618. In certain embodiments, the first inspection capability 8612 is distinct from the second inspection capability 8618, such as distinct inspection and/or sensing capabilities, and/or distinct actuation capabilities. The first hardware component 8608 and/or the second hardware component 8614 may include more than one sensor (e.g., a group of sensors having a single interface to the hardware interface 8606), more than one actuator (e.g., a drive module having a drive actuator and a payload actuator), or combinations of these (e.g., a drive module or payload having at least one sensor and at least one actuator).

An example system includes at least one of the hardware components 8608, 8614 including a sensor (depicted as the first hardware component 8608 in the example of FIG. 15), and a sensor control circuit 8620 that converts a sensor response 8622 to a sensed parameter value 8626. The example sensor control circuit 8620 is depicted as positioned on the hardware component, and as interposed between the hardware interface 8606 and the inspection controller circuit 8602, although the sensor control circuit 8620 may be positioned in only one of these locations for a given embodiment. The example sensor control circuit 8620 utilizes an A/D converter instruction set 8624 to convert the sensor response 8622. In certain embodiments, the sensor control circuit 8620 performs one or more operations such as debouncing, noise removal, filtering, saturation management, slew rate management, hysteresis operations, and/or diagnostic processing on the sensor response 8622 to determine the sensed parameter value 8626. In certain embodiments, the sensor control circuit 8620 additionally or alternatively interprets the sensor response 8622 by converting the sensor response 8622 from sensor provided units (e.g., voltage, bits, frequency values, etc.) to the sensed parameter value 8626. In certain embodiments, for example where the sensor is a smart sensor or a high capability sensor, the sensor may be configured to provide the sensed parameter value 8626 directly, and/or the sensor control circuit 8620 may be positioned on the sensor to provide the sensed parameter value 8626.

In certain embodiments, the inspection controller circuit 8602 utilizes the sensed parameter value 8626. The sensed parameter value 8626 may be communicated to the inspection controller circuit 8602 from the sensor control circuit 8620, for example where the interface controller 8628 receives the sensor response 8622, and the sensor control circuit 8620 is interposed between the hardware interface 8606 and the inspection controller circuit 8602. In certain embodiments, the sensed parameter value 8626 may be communicated to the inspection controller circuit 8602 from the interface controller 8628, for example where the interface controller 8628 receives the sensed parameter value 8626 from the sensor control circuit 8620 interposed between the hardware interface 8606 and the sensor.

An example interface controller 8628 interprets the sensor response 8622 utilizing a calibration map 8630. For example, the calibration map 8630 may include interface information between the first command set 8604 and responses and/or commands from/to the respective hardware component 8608, 8614. In certain embodiments, when a hardware component coupled to the hardware interface 8606 is changed, the interface controller updates the calibration map 8630, for example selecting an applicable calibration map 8630 from a number of available calibration maps 8630, and/or receiving an update (e.g., a new calibration, and/or updated firmware for the interface controller 8628) to provide the updated calibration map 8630. In certain embodiments, the hardware component provides an identifier, such as part number, build number, component type information, or the like, and the interface controller 8628 selects a calibration map 8630 in response to the identifier of the hardware component.

Figure 16:
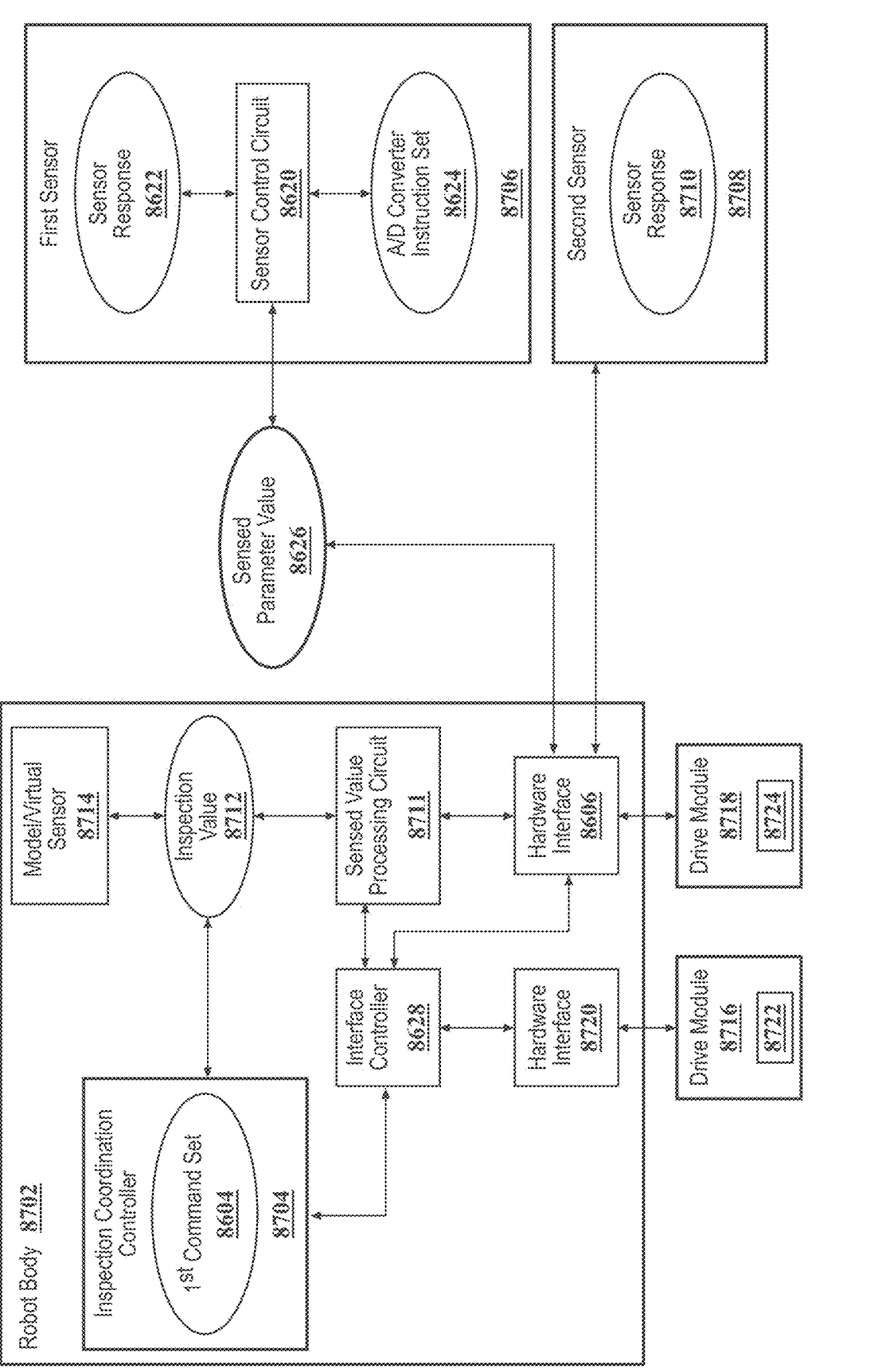
FIG. 16 is a schematic diagram of an inspection robot supporting modular component operations consistent with certain embodiments of the present disclosure.

Referencing FIG. 16, an example inspection robot for performing inspection operations having a distributed microcontroller assembly is depicted, the distributed microcontroller assembly supporting modular control operations, and allowing for rapid prototyping, testing, reconfiguration of the inspection robot, and swapping of hardware components without requiring changes to the primary inspection control functions of the inspection robot. The inspection robot includes a robot body 8702 including an inspection coordination controller 8704 that controls a first inspection utilizing a first command set 8604. The inspection robot includes a hardware interface 8606 in communication with the inspection coordination controller 8704, a first sensor 8706 operatively couplable to the hardware interface 8606, where the first sensor has a first response map 8610, and a second sensor 8708 operatively couplable to the hardware interface 8606, where the second sensor 8708 has a second response map 8616. In certain embodiments, the second response map 8616 is distinct from the first response map 8610. The inspection coordination controller 8704 further controls, using the first command set 8604, the first sensor 8706 or the second sensor 8708.

In certain embodiments, the first sensor 8706 and second sensor 8708 are swappable, such as where either the first sensor 8706 or the second sensor 8708 can be coupled to the hardware interface 8606, and the inspection coordination controller 8704 can continue to control inspection operations without a change to the first command set 8604. In certain embodiments, the swappable first sensor 8706 or the second sensor 8708 indicates that a same functionality of the inspection robot is available, even where the sensor responses 8622, 8710 are distinct (e.g., the sensors have a same type, can fulfill a same function, and/or they can be utilized with other components of the inspection robot to provide a same function).

An example inspection robot includes a sensor control circuit 8620 included on the first sensor 8706 and/or the second sensor 8708 (the first sensor 8706 in the example of FIG. 16) that converts the sensor response 8622 to a sensed parameter value 8626. In certain embodiments, the sensor control circuit 8620 provides the sensed parameter value 8626 to the hardware interface 8606. In certain embodiments, the sensor control circuit 8620 converts the sensor response 8622 by performing one or more of debouncing, noise removal, filtering, saturation management, slew rate management, hysteresis operations, and/or diagnostic processing on the sensor response 8622 provided by the sensor. In certain embodiments, the sensor control circuit 8620 performs an A/D conversion on the sensor response 8622 provided by the sensor.

An example inspection robot includes an interface controller 8628 in communication with the hardware interface 8606, where the interface controller 8628 further receives one of the sensed parameter value 8626 or the sensor response 8622, 8710. In certain embodiments, the inspection robot further includes a sensed value processing circuit 8711 that converts the sensed parameter value 8626 to an inspection value 8712 (e.g., converting a sensed value to a secondary value such as a wall thickness, coating thickness, etc.). An example sensed value processing circuit 8711 provides the inspection value 8712 to the inspection coordination controller 8704, and/or to a model or virtual sensor 8714. In certain embodiments, the model or virtual sensor 8714 utilizes the inspection value 8712 to determine other values in the system.

An example inspection robot includes two drive modules 8716, 8718, each operatively coupled to a respective hardware interface 8606, 8720. The example system includes the interface controller 8628 interposed between the inspection coordination controller 8704 and each of the hardware interfaces 8606, 8720. The example inspection robot further includes each drive module 8716, 8718 having a respective drive controller 8722, 8724, where each drive controller 8722, 8724 is in communication with the respective hardware interface 8606, 8720. The example inspection robot including the drive modules 8716, 8718 and the interface controller 8628 provides for separation between the first command set 8604 and the specific communication protocols, command values, and the like for the drive modules 8716, 8718. In certain embodiments, the example including the drive modules 8716, 8718 and the interface controller 8628 provides for swapability and/or reversibility of the drive modules 8716, 8718 between the hardware interfaces 8606, 8720.

Figure 17:
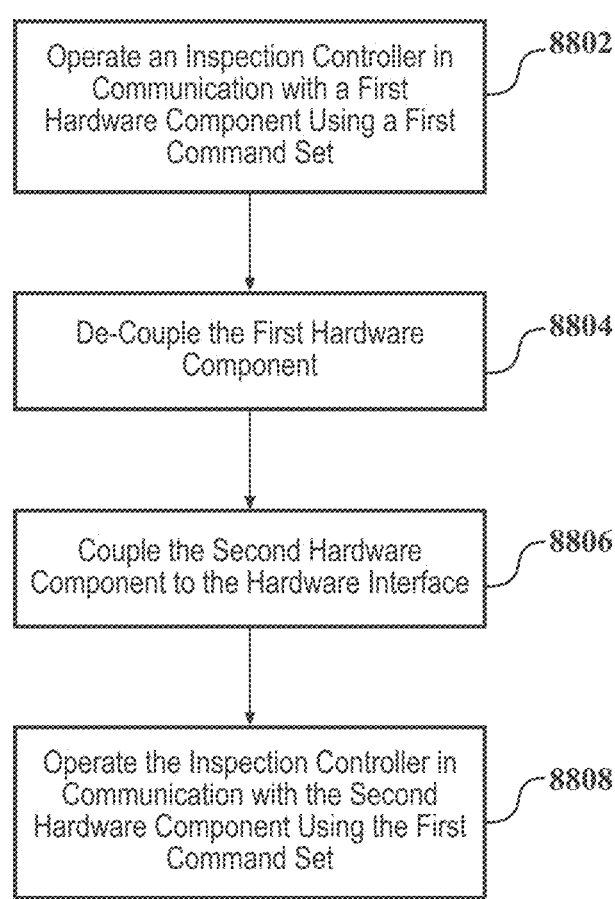
FIG. 17 is a schematic flow diagram of a procedure for operating an inspection robot consistent with certain embodiments of the present disclosure.

Referencing FIG. 17, an example procedure for operating an inspection robot having a distributed microcontroller assembly is depicted. The example procedure includes an operation 8802 to operate an inspection controller in communication with a first hardware component coupled to a hardware interface utilizing a first command set, where the first hardware component includes a first response map, an operation 8804 to de-couple the first hardware component from the hardware interface, an operation 8806 to couple a second hardware component to the hardware interface, where the second hardware component includes a second response map, and an operation 8808 to operate the inspection controller in communication with the second hardware component utilizing the first command set.

An example procedure includes one of the response maps including an A/D converter instruction set, and/or where the first response map is distinct from the second response map. An example procedure includes an operation (not shown) to operate an interface controller communicatively coupled to the hardware interface, where the operating of the interface controller includes interpreting data from the first hardware component utilizing the first response map, interpreting data from the second hardware component utilizing the second response map, and communicating with the inspection controller in response to the first command set. In certain embodiments, interpreting data from the first hardware component is performed in a first hardware configuration (e.g., with the first hardware component coupled to the hardware interface), and interpreting data from the second hardware component is performed in a second hardware configuration (e.g., with the second hardware component coupled to the hardware interface).

An example procedure includes one of the response maps including an A/D converter instruction set, and/or where the first response map is distinct from the second response map. An example procedure includes an operation (not shown) to operate an interface controller communicatively coupled to the hardware interface, where the operating of the interface controller includes providing actuator command values to the first hardware component utilizing the first response map, providing actuator command values to the second hardware component utilizing the second response map, and communicating with the inspection controller in response to the first command set. In certain embodiments, providing actuator command values to the first hardware component is performed in a first hardware configuration (e.g., with the first hardware component coupled to the hardware interface), and providing actuator command values to the second hardware component is performed in a second hardware configuration (e.g., with the second hardware component coupled to the hardware interface). In certain embodiments, the procedure includes an operation to update computer readable instructions accessible to the interface controller before operating the inspection controller in communication with one of the hardware components, for example after a swap from the first hardware component to the second hardware component.

Figure 18:
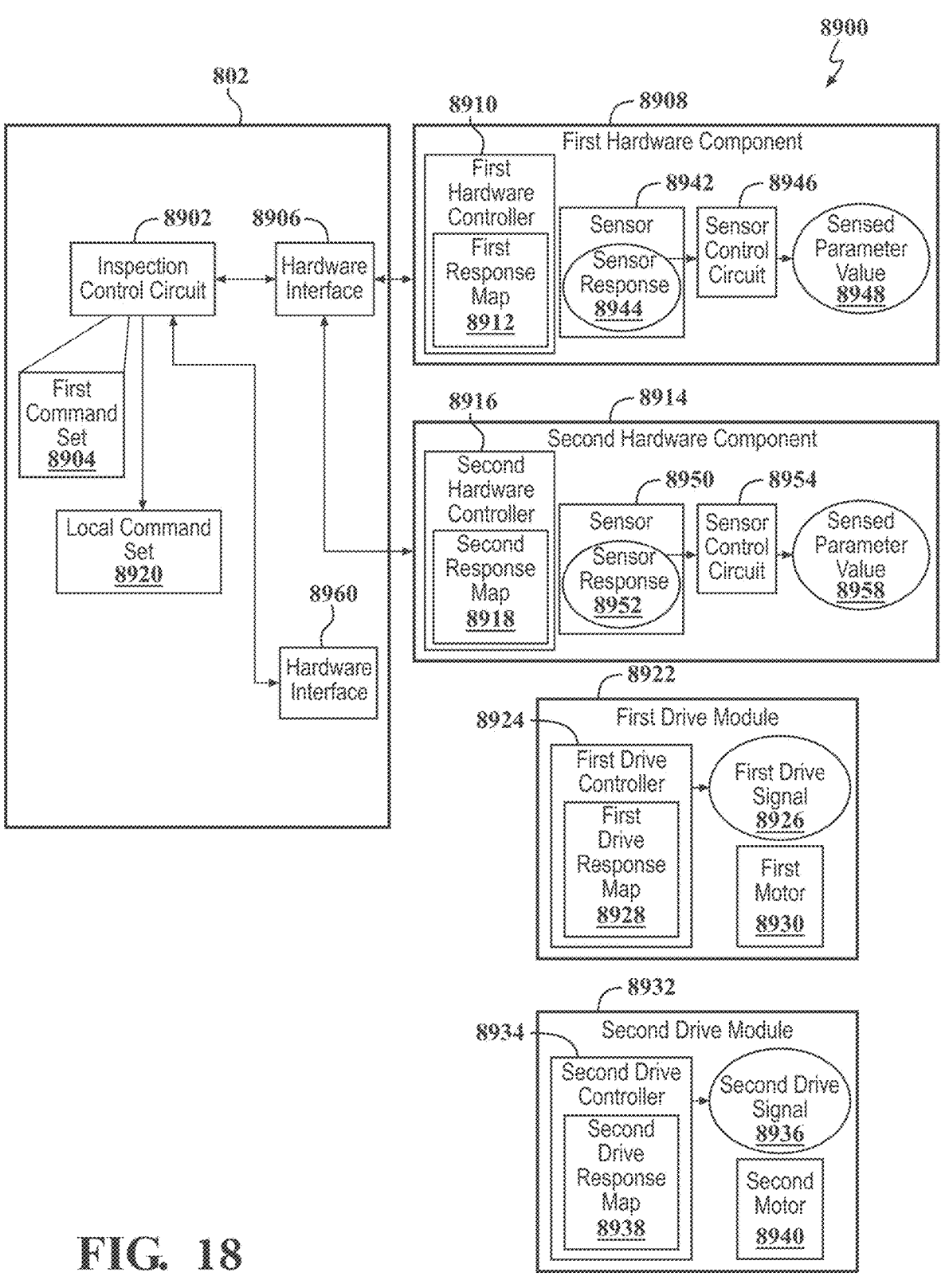
FIG. 18 is a schematic diagram of a system for distributed control of an inspection robot consistent with certain embodiments of the present disclosure.

Referencing FIG. 18, an example system 8900 for distributed control of an inspection robot is depicted. The inspection robot may include any embodiment of an inspection robot as set forth throughout the present disclosure. The example system includes an inspection control circuit 8902 structured to operate the inspection robot utilizing a first command set, such as high level operation descriptions including movement commands, sensor commands (e.g., sensor on/off times, sampling rates, etc.), actuator commands (e.g., actuator activation or deactivation, actuator positions, and/or result commands such as applying a selected downforce, position for a payload, position for a sled, etc.). The example system includes a hardware interface 8906 in communication with the inspection control circuit 8902, where the hardware interface utilizes the first command set.

The example system includes a first hardware component 8908 operatively couplable to the hardware interface 8906, where the first hardware component includes and/or is in communication with a first hardware controller 8910. The first hardware controller 8910 includes a first response map 8912, for example including interface descriptions, A/D mapping, hardware responses to commands, and the like, where the first hardware controller 8910 commands the first hardware component 8908 in response to the first response map 8912 and the first command set 8904.

The example system includes a second hardware component 8914 operatively couplable to the hardware interface 8906, where the second hardware component includes and/or is in communication with a second hardware controller 8916. The second hardware controller 8916 includes a second response map 8918 and commands the second hardware component 8914 in response to the second response map 8918 and the first command set 8904.

It can be seen that the system of FIG. 18 provides for an inspection robot controller 802 operable to command inspection operations of the inspection robot, with either the first hardware component 8908 or the second hardware component 8914 coupled to the hardware interface 8906, without a change in the coupled hardware component requiring a change in the inspection robot controller 802 or the first command set 8904.

The example system 8900 further includes the first hardware controller 8910 utilizing a local command set 8920 to command the first hardware component 8908. For example, the inspection robot controller 802 may store a number of command sets thereon, wherein the first hardware controller 8910 selects one of the number of command sets as the local command set 8920 based on the type of hardware component being controlled, a function of the hardware component (e.g., sensing, a type of sensor, actuating a payload, actuating a sensor position, actuating a down force value, actuating a drive wheel, etc.) and/or the type of command present in the first command set 8904. The utilization of a local command set 8920 allows for the implementation of different hardware component types, while allowing the high level first command set 8904 to operate utilizing functional commands disassociated with the specific hardware components implementing the commands. In certain embodiments, a system 8900 may be changed to be compatible with additional hardware component types, actuator positions (e.g., a payload actuator coupled to a drive module or to a center chassis), by adding to available command sets available as local command sets 8920 without changing the inspection control circuit 8902 or the first command set 8904.

An example system 8900 includes the first response map 8912 being distinct from the second response map 8918, for example where the first hardware component 8908 is a different type of component than the second hardware component 8914, and/or has different interaction values such as response curves relative to electrical control values.

An example system 8900 includes a first drive module 8922 (which may be the first hardware component 8908, although they are depicted separately in the example of FIG. 18) having a first drive controller 8924 that determines a first drive signal 8926 in response to the first command set 8904 and a first drive module response map 8928. The first drive module 8922 may include a first motor 8930 (e.g., coupled to a drive wheel of the first drive module 8922) that is responsive to the first drive signal 8926.

An example system 8900 includes a second drive module 8932 (which may be the second hardware component 8914) having a second drive controller 8934 that determines a second drive signal 8936 in response to the first command set 8904 and a second drive module response map 8938. The second drive module 8932 may include a second motor 8940 that is responsive to the second drive signal 8936.

In certain embodiments, one of the first drive module 8922 or the second drive module 8932 may be coupled to the hardware interface 8906. Additionally, or alternatively, one or both of the drive modules may be coupled to one or more additional hardware interfaces 8960, for example with a first drive module 8922 coupled to a center chassis on a first side, and a second drive module 8932 coupled to the center chassis on a second side. In certain embodiments, the drive controllers 8924, 8934 are configured to provide appropriate drive signals 8926, 8936 to the drive modules 8922, 8932 responsive to the first command set 8904, based on the response maps 8928, 8938 and/or which hardware interface 8960 the drive modules 8922, 8932 are coupled to. In certain embodiments, the first command set 8904 may include a command to move the inspection robot in a desired direction and speed, and the operation of the drive controllers 8924, 8934 allow for proper movement (direction and speed) regardless of which side the drive modules are coupled to. Accordingly, in certain embodiments, the drive modules 8922, 8932 are swappable, and/or reversible, without changes to the inspection control circuit 8902 or the first command set 8904. In certain embodiments, the first drive module response map 8928 is distinct from the second drive module response map 8938, for example where the motors are distinct, where the drive modules 8922, 8932 include different actuators (e.g., a payload actuator on one, and a stability support device actuator on the other), and/or where the drive modules 8922, 8932 are positioned on opposing sides of the center chassis (e.g., where reversibility management is performed response map 8928, 8938 rather than through interface 8960 detection). In certain embodiments, the first drive signal 8926 is distinct from the second drive signal 8936, even where an identical drive response is desired from the first drive module 8922 and the second drive module 8932. In certain embodiments, the drive signals 8926, 8936 may be a commanded parameter to the motor (e.g., 50% torque), and/or the drive signals 8926, 8936 may be a voltage value or a current value provided to the respective drive motor 8930, 8940.

An example hardware component 8908, 8914 includes a sensor 8942, 8950, where the hardware component 8908, 8914 further includes a sensor control circuit 8946, 8954 that converts a sensor response of the sensor (e.g., depicted as 8944, 8952) to a sensed parameter value 8948, 8958. In certain embodiments, the inspection control circuit 8902 utilizes the sensed parameter value 8948, 8958, for example as a representation of a parameter sensed by the respective sensor, as a base sensor value, and/or as a minimally processed sensor value.

In certain embodiments, the sensor control circuit 8946, 8954 converts the sensor response 8944, 8952 by performing one or more of debouncing, noise removal, filtering, saturation management, slew rate management (e.g., allowable sensor response change per unit time, sampling value, and/or execution cycle), hysteresis operations (e.g., filtering, limiting, and/or ignoring sensor response sign changes and/or increase/decrease changes to smooth the sensed parameter value 8948, 8958 and/or avoid cycling), and/or diagnostic processing (e.g., converting known sensor response 8944, 8952 values that may be indicating a fault, electrical failure, and/or diagnostic condition instead of a sensed value—for example utilizing reserved bits of the sensor response map) on the sensor response 8944 value.

In certain embodiments, one or more hardware controllers 8910, 8946, 8916, 8954, 8924, 8934 and/or response maps 8912, 8918, 8928, 8938 may be positioned on the inspection robot controller 802, positioned on another controller in communication with the inspection robot controller 802, and/or positioned on the respective hardware component (e.g., as a smart component, and/or as a closely coupled component controller). In certain embodiments, one or more hardware controllers 8910, 8946, 8916, 8954, 8924, 8934 are interposed between the inspection control circuit 8902 and the respective hardware component.

Figure 19:
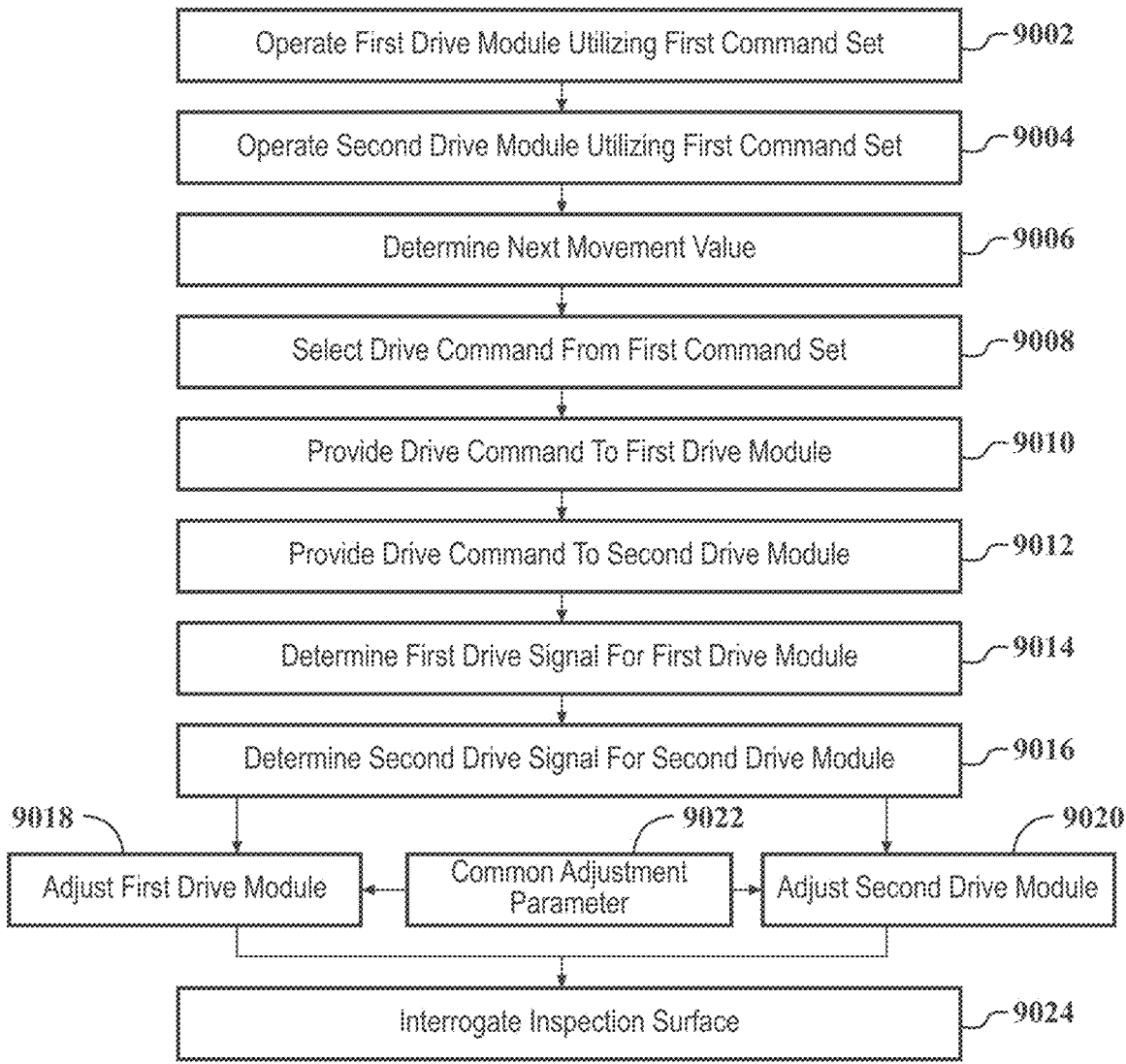
FIG. 19 is a schematic flow diagram of a procedure for operating an inspection robot having distributed control consistent with certain embodiments of the present disclosure.

Referencing FIG. 19, an example procedure to operate distinct hardware devices, such as drive modules, utilizing a same first command set, and/or utilizing a swappable hardware interface, is depicted. The example procedure includes an operation 9002 to operate a first drive module with the first command set, and an operation 9004 to operate a second drive module with the first command set. The example procedure further includes an operation 9006 to determine a next movement value in response to the first command set, an operation 9008 to select a drive command from the first command set (e.g., where the first command set includes a number of additional commands in addition to drive commands), and an operations 9010, 9012 to provide drive command to each of the first drive module and the second drive module.

In certain embodiments, the example procedure further includes an operation 9014 to determine a first drive signal for the first drive module in response to a first response map for the first drive module, and an operation 9016 to determine a second drive signal for the second drive module in response to a second response map for the second drive module. The example procedure includes operations 9018, 9020 to adjust the first drive module and the second drive module (and/or the first drive signal or the second drive signal), respectively, by an adjustment amount having a common adjustment parameter. In certain embodiments, the procedure includes an operation 9022 to determine the common adjustment parameter as one of a speed parameter, a distance parameter, and/or a direction parameter. For example, the common adjustment parameter 9022 may be utilized to adjust the first drive module 9108 in a first direction and the second drive module 9016 in an opposite direction to account for the positions of the reversible drive modules with respect to a center chassis of the inspection robot. In another example, the common adjustment parameter 9022 may be utilized to prevent wheel slipping, for example where the inspection robot is turning on a surface, by commanding an inner one of the drive modules to turn slightly slower and/or traverse a smaller distance and commanding an outer one of the drive modules to turn slightly faster or traverse a larger distance.

In certain embodiments, operations 9018, 9020 to adjust the drive modules (and/or drive module signals) are performed to achieve a target provided by the first command set, where the adjustments do not have a common adjustment parameter, and/or where the adjustments are not adjusted by a same or similar amount (e.g., where a wheel of one of the drive modules is determined to be slipping). The procedure further includes an operation 9024 to interrogate the inspection surface (e.g., perform sensing operations) in response to the first command set.

Turning now to FIG. 20, an example system and/or apparatus for traversing an obstacle with an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 20. In certain embodiments, the inspection robot 100 may have one or more payloads 2 (FIG. 1) and may include one or more sensors on each payload.

Operations of the inspection robot 100 provide the sensors in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

Referring to FIG. 20, the example system includes the inspection robot 100 (FIG. 1) and one or more obstacle sensors 16440, e.g., lasers, cameras, sonars, radars, a ferrous substrate detection sensor, contact sensors, etc., coupled to the inspection robot and/or otherwise disposed to detect obstacle in the path of the inspection robot 100 as it inspects an inspection surface 500 (FIGS. 3-4).

The system further includes a controller 802 having a number of circuits configured to functionally perform operations of the controller 802. The example controller 802 has an obstacle sensory data circuit 16402, an obstacle processing circuit 16406, an obstacle notification circuit 16410, a user interface circuit 16414, and/or an obstacle configuration circuit 16424. The example controller 802 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 802 are set forth, without limitation, in the portion of the disclosure referencing FIGS. 20-22.

The example controller 802 is depicted schematically as a single device for clarity of description, but the controller 802 may be a single device, a distributed device, and/or may include portions at least partially positioned with other devices in the system (e.g., on the inspection robot 100). In certain embodiments, the controller 802 may be at least partially positioned on a computing device associated with an operator of the inspection (not shown), such as a local computer at a facility including the inspection surface 500, a laptop, and/or a mobile device. In certain embodiments, the controller 802 may alternatively or additionally be at least partially positioned on a computing device that is remote to the inspection operations, such as on a web-based computing device, a cloud computing device, a communicatively coupled device, or the like.

Figure 21:
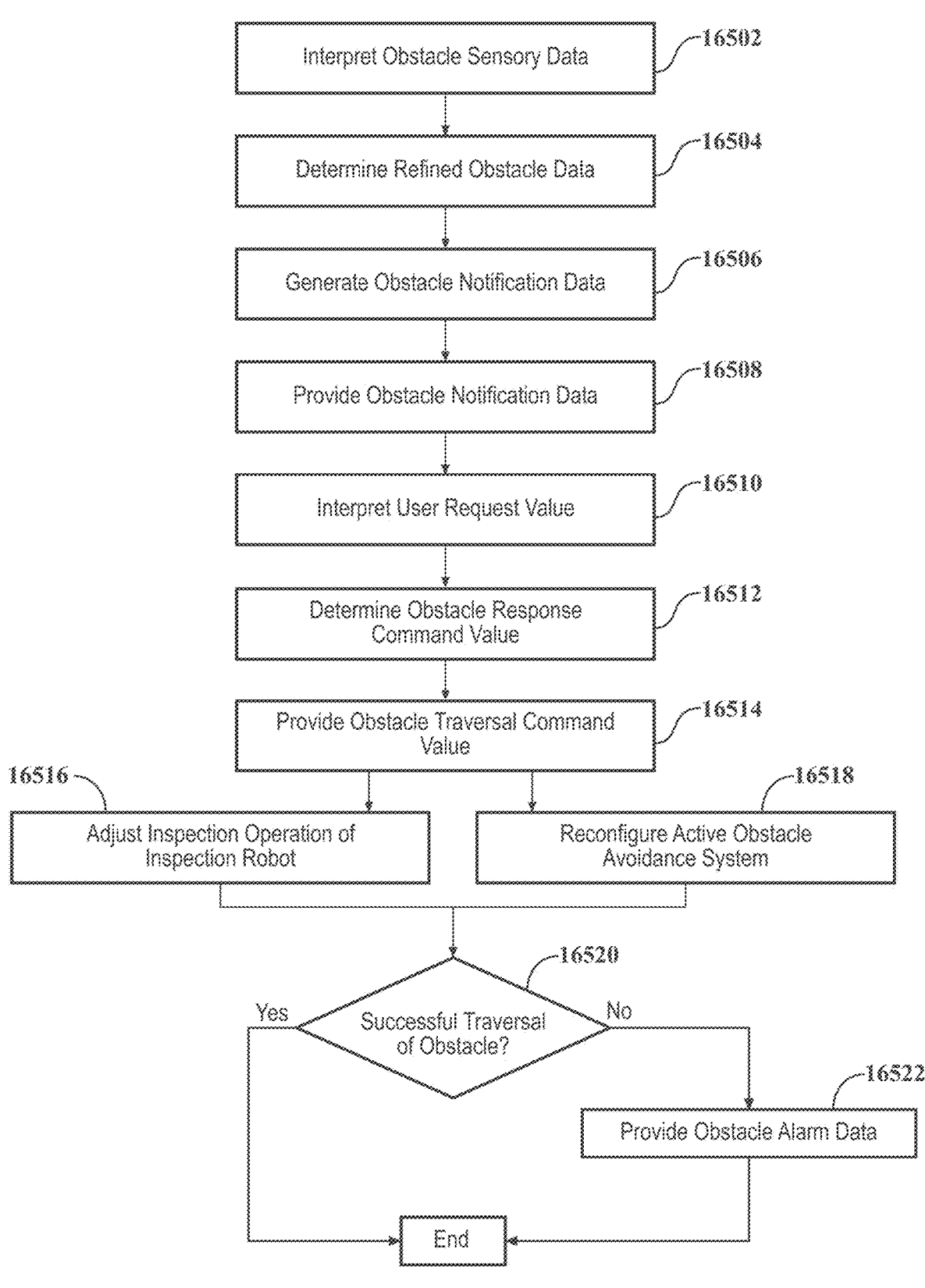
FIG. 21 is a flow chart depicting a method for traversing an obstacle with an inspection robot consistent with certain embodiments of the present disclosure.

Accordingly, as illustrated in FIGS. 20-22, the obstacle sensory data circuit 16402 interprets obstacle sensory data 16404 comprising data provided by the obstacle sensors 16440. With reference to FIG. 20, the obstacle sensory data may include the position, type, traversal difficulty rating, imagery and/or any other type of information suitable for identifying the obstacle and determining a plan to overcome/traverse the obstacle. In embodiments, the obstacle sensory data 16404 may include imaging data from an optical camera of the inspection robot. The imaging data may be related to at least one of: the body/structure of the obstacle, a position of the obstacle, a height of the obstacle, an inspection surface surrounding the obstacle, a horizontal extent of the obstacle, a vertical extent of the obstacle, or a slope of the obstacle.

The obstacle processing circuit 16406 determines refined obstacle data 16408 in response to the obstacle sensory data 16404. Refined obstacle data 16408 may include information distilled and/or derived from the obstacle sensory data 16404 and/or any other information that the controller 802 may have access to, e.g., pre-known and/or expected conditions of the inspection surface.

The obstacle notification circuit 16410 generates and provides obstacle notification data 16412 to a user interface device in response to the refined obstacle data 16408. The user interface circuit 16414 interprets a user request value 16418 from the user interface device and determines an obstacle response command value 16416 in response to the user request value 16418. The user request value 16418 may correspond to a graphical user interface interactive event, e.g., menu selection, screen region selection, data input, etc.

The obstacle configuration circuit 16424 provides the obstacle response command value 16416 to the inspection robot 100 during the interrogating of the inspection surface 500. In embodiments, the obstacle response command value 16416 may correspond to a command to reconfigure 16420 the inspection robot and/or to adjust 16422 an inspection operation of the inspection robot. For example, in embodiments, the adjust inspection operation command 16422 may include a command that instructions the inspection robot to go around the obstacle, lift one or more payloads, change a downforce applied to one or more payloads, change a with between payloads and/or the sensors on the payloads, traverse/slide one or more payloads to the left or to the right, change a speed at which the inspection robot traverses the inspection surface, to "test travel" the obstacle, e.g., to proceed slowly and observe, to mark (in reality or virtually) the obstacle, to alter the planned inspection route/path of the inspection robot across the inspection surface, and/or to remove a portion from an inspection map corresponding to the obstacle.

In embodiments, the obstacle response command value 16416 may include a command to employ a device for mitigating the likelihood that the inspection robot will top over. Such a device may include stabilizers, such as rods, mounted to and extendable away from the inspection robot. In embodiments, the obstacle response command value 16416 may include a request to an operator to confirm the existence of the obstacle. Operator confirmation of the obstacle may be received as a user request value 16418.

In embodiments, the obstacle configuration circuit 16424 determines, based at least in part on the refined obstacle data 16408, whether the inspection robot 100 has traversed an obstacle in response to execution of a command corresponding to the obstacle response command value 16416 by the inspection robot 100. The obstacle configuration circuit 16424 may determine that the obstacle has been traversed by detecting that the obstacle is no longer present in the obstacle sensory data 16404 acquired by the obstacle sensors 16440. In embodiments, the obstacle processing circuit 16406 may be able to determine the location of the obstacle from the obstacle sensory data 16404 and the obstacle configuration circuit 16424 may determine that the obstacle has been traversed by comparing the location of the obstacle to the location of the inspection robot. In embodiments, determining that an obstacle has been successfully traversed may be based at least in part on detecting a change in a flow rate of couplant used to couple the inspection sensors to the inspection surface. For example, a decrease in the couplant flow rate may indicate that the payload has moved past the obstacle.

The obstacle configuration circuit 16424 may provide an obstacle alarm data value 16426 in response to determining that the inspection robot 100 has not traversed the obstacle. As will be appreciated, in embodiments, the obstacle configuration circuit 16424 may provide the obstacle alarm data value 16426 regardless of whether traversal of the obstacle was attempted by the inspection robot 100. For example, the obstacle configuration circuit 16424 may provide the obstacle alarm data value 16426 as a command responsive to the obstacle response command value 16416.

In embodiments, the obstacle processing circuit 16406 may determine the refined obstacle data 16408 as indicating the potential presence of an obstacle in response to comparing the obstacle data comprising an inspection surface depiction to a nominal inspection surface depiction. For example, the nominal inspection surface depiction may have been derived based in part on inspection data previously acquired from the inspection surface at a time the conditions of the inspection surface were known. In other words, the nominal inspection surface depiction may represent the normal and/or desired condition of the inspection surface 500. In embodiments, the presence of an obstacle may be determined based at least in part on an identified physical anomaly between obstacle sensory data 16404 and the nominal inspection surface data, e.g., a difference between acquired and expected image data, EMI readings, coating thickness, wall thickness, etc. For example, in embodiments, the obstacle processing circuit 16406 may determine the refined obstacle data 16408 as indicating the potential presence of an obstacle in response to comparing the refined obstacle data 16408, which may include an inspection surface depiction, to a predetermined obstacle inspection surface depiction. As another example, the inspection robot may identify a marker on the inspection surface and compare the location of the identified marker to an expected location of the marker, with differences between the two indicating a possible obstacle. In embodiments, the presence of an obstacle may be determined based on detecting a change in the flow rate of the couplant that couples the inspection sensors to the inspection surface. For example, an increase in the couplant flow rate may indicate that the payload has encountered an obstacle that is increasing the spacing between the inspection sensors and the inspection surface.

In embodiments, the obstacle notification circuit 16410 may provide the obstacle notification data 16412 as at least one of an operator alert communication and/or an inspection surface depiction of at least a portion of the inspection surface. The obstacle notification data 16412 may be presented to an operator in the form of a pop-up picture and/or pop-up inspection display. In embodiments, the obstacle notification data 16412 may depict a thin or non-ferrous portion of the inspection surface. In embodiments, information leading to the obstacle detection may be emphasized, e.g., circled, highlighted, etc. For example, portions of the inspection surface identified as being cracked may be circled while portions of the inspection surface covered in dust may be highlighted.

In embodiments, the obstacle processing circuit 16406 may determine the refined obstacle data 16408 as indicating the potential presence of an obstacle in response to determining a non-ferrous substrate detection of a portion of the inspection surface and/or a reduced magnetic interface detection of a portion of the inspection surface. Examples of reduced magnetic interface detection include portions of a substrate/inspection surface lacking sufficient ferrous material to support the inspection robot, lack of a coating, accumulation of debris and/or dust, and/or any other conditions that may reduce the ability of the magnetic wheel assemblies to couple the inspection robot to the inspection surface.

In embodiments, the obstacle notification circuit 16410 may provide a stop command to the inspection robot in response to the refined obstacle data 16408 indicating the potential presence of an obstacle.

In embodiments, the obstacle response command value 16416 may include a command to reconfigure an active obstacle avoidance system of the inspection robot 100. Such a command may be a command to: reconfigure a down force applied to one or more payloads coupled to the inspection robot; reposition a payload coupled to the inspection robot; lift a payload coupled to the inspection robot; lock a pivot of a sled, the sled housing and/or an inspection sensor of the inspection robot; unlock a pivot of a sled, the sled housing and/or an inspection sensor of the inspection robot; lock a pivot of an arm, the arm coupled to a payload of the inspection robot, and/or an inspection sensor coupled to the arm; unlock a pivot of an arm, the arm coupled to a payload of the inspection robot, and/or an inspection sensor coupled to the arm; rotate a chassis of the inspection robot relative to a drive module of the inspection robot; rotate a drive module of the inspection robot relative to a chassis of the inspection robot; deploy a stability assist device coupled to the inspection robot; reconfigure one or more payloads coupled to the inspection robot; and/or adjust a couplant flow rate of the inspection robot. In certain embodiments, adjusting the couplant flow rate is performed to ensure acoustic coupling between a sensor and the inspection surface, to perform a re-coupling operation between the sensor and the inspection surface, to compensate for couplant loss occurring during operations, and/or to cease or reduce couplant flow (e.g., if the sensor, an arm, and/or a payload is lifted from the surface, and/or if the sensor is not presently interrogating the surface). An example adjustment to the couplant flow includes adjusting the couplant flow in response to a reduction of the down force (e.g., planned or as a consequence of operating conditions), where the couplant flow may be increased (e.g., to preserve acoustic coupling) and/or decreased (e.g., to reduce couplant losses).

Turning now to FIG. 21, a method for traversing an obstacle with an inspection robot is shown. The method may include interpreting 16502 obstacle sensory data comprising data provided by an inspection robot, determining 16504 refined obstacle data in response to the obstacle sensory data; and generating 16506 an obstacle notification in response to the refined obstacle data. The method may further include providing 16508 the obstacle notification data to a user interface. The method may further include interpreting 16510 a user request value, determining 16512 an obstacle response command value in response to the user request value; and providing 16514 the obstacle command value to the inspection robot during an inspection run. In embodiments, the method may further include adjusting 16516 an inspection operation of the inspection robot in response to the obstacle response command value. In embodiments, adjusting 16516 the inspection operation may include stopping 16618 interrogation of the inspection surface. In embodiments, adjusting 16516 the inspection operation may include updating 16620 an inspection run plan. In embodiments, adjusting 16516 the inspection operation may include taking 16650 data in response to the obstacle. In embodiments, adjusting 16516 the inspection operation may include applying a virtual mark 16652. In embodiments, adjusting 16516 the inspection operation may include updating 16654 an obstacle map. In embodiments, adjusting 16516 the inspection operation may include acquiring 16656 an image and/or video of the obstacle. In embodiments, adjusting 16516 the inspection operation may include confirming 16658 the obstacle.

The method may further include reconfiguring 16518 an active obstacle avoidance system. In embodiments, reconfiguring 16518 the active obstacle avoidance system may include adjusting 16624 a down force applied to one or more payloads coupled to the inspection robot. In embodiments, reconfiguring 16518 the active obstacle avoidance system may include reconfiguring 16626 one or more payloads coupled to the inspection robot. Reconfiguring 16626 one or more payloads may include adjusting a width between the payloads and/or one or more sensors on the payloads. In embodiments, reconfiguring 16518 the active obstacle avoidance system may include adjusting 16628 a couplant flow rate. In embodiments, reconfiguring 16518 the active obstacle avoidance system may include lifting 16630 one or more payloads coupled to the inspection robot. In embodiments, reconfiguring 16518 the active obstacle avoidance system may include locking 16632 and/or unlocking 16634 the pivot of a sled of a payload coupled to the inspection robot. In embodiments, reconfiguring 16518 the active obstacle avoidance system may include locking 16636 and/or unlocking 16638 the pivot of an arm that couples a sled to a body of a payload or to the inspection robot chassis. In embodiments, reconfiguring 16518 the active obstacle avoidance system may include rotating 16640 the inspection robot chassis. In embodiments, reconfiguring 16518 the active obstacle avoidance system may include rotating 16646 a drive module coupled to the inspection robot. In embodiments, reconfiguring 16518 the active obstacle avoidance system may include repositioning 16642, 16644 a payload coupled to the inspection robot.

In embodiments, the method may further include determining 16520 whether the inspection robot traversed the obstacle. In embodiments, the method may further include providing 16522 a data alarm in response to determining 16520 that the inspection robot has not traversed the obstacle.

Figure 23:
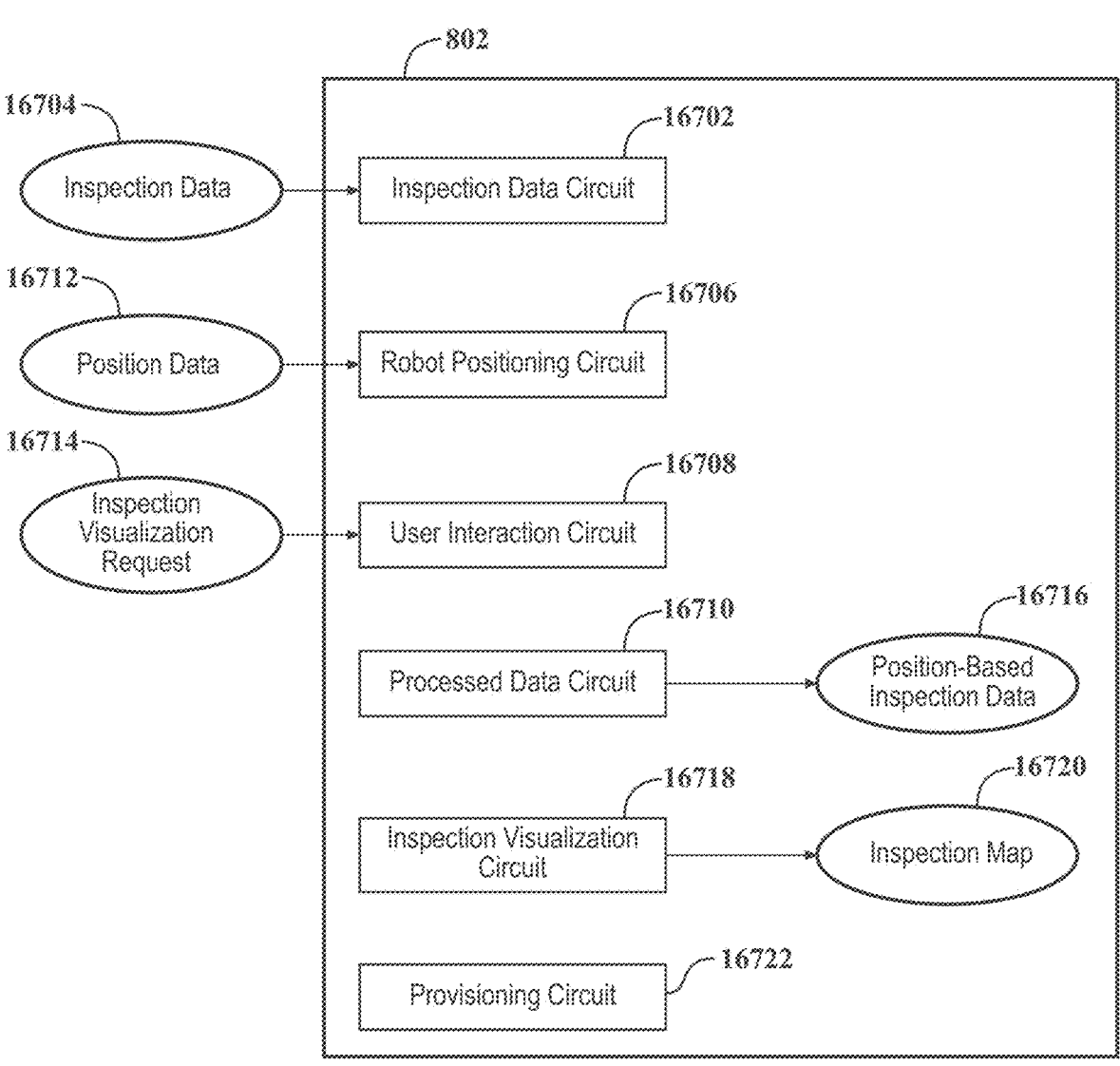
FIG. 23 depicts an apparatus for performing an inspection on an inspection surface with an inspection robot consistent with certain embodiments of the present disclosure.

The example of FIG. 23 is depicted on a controller 802 for clarity of the description. The controller 802 may be a single device, a distributed device, and/or combinations of these. In certain embodiments, the controller 802 may operate a web portal, a web page, a mobile application, a proprietary application, or the like. In certain embodiments, the controller 802 may be in communication with an inspection robot, a base station, a data store housing inspection data, refined inspection data, and/or other data related to inspection operations. In certain embodiments, the controller 802 is communicatively coupled to one or more user devices, such as a smart phone, laptop, desktop, tablet, terminal, and/or other computing device. A user may be any user of the inspection data, including at least an operator, a user related to the operator (e.g., a supervisor, supporting user, inspection verification user, etc.), a downstream customer of the data, or the like.

In an embodiment, an apparatus for performing an inspection on an inspection surface with an inspection robot may be embodied on the controller 802, and may include an inspection data circuit 16702 structured to interpret inspection data 16704 of the inspection surface and a robot positioning circuit 16706 structured to interpret position data 16712 of the inspection robot (e.g., a position of the inspection robot on the inspection surface correlated with inspection position data). The example controller 802 includes a user interaction circuit 16708 structured to interpret an inspection visualization request 16714 for an inspection map; a processed data circuit 16710 structured to link the inspection data 16704 with the position data 16712 to determine position-based inspection data 16716; an inspection visualization circuit 16718 structured to determine the inspection map 16720 in response to the inspection visualization request 16714 based on the position-based inspection data 16716. The example controller includes a provisioning circuit 16722 structured to provide the inspection map 16720 to a user device.

Figure 24:
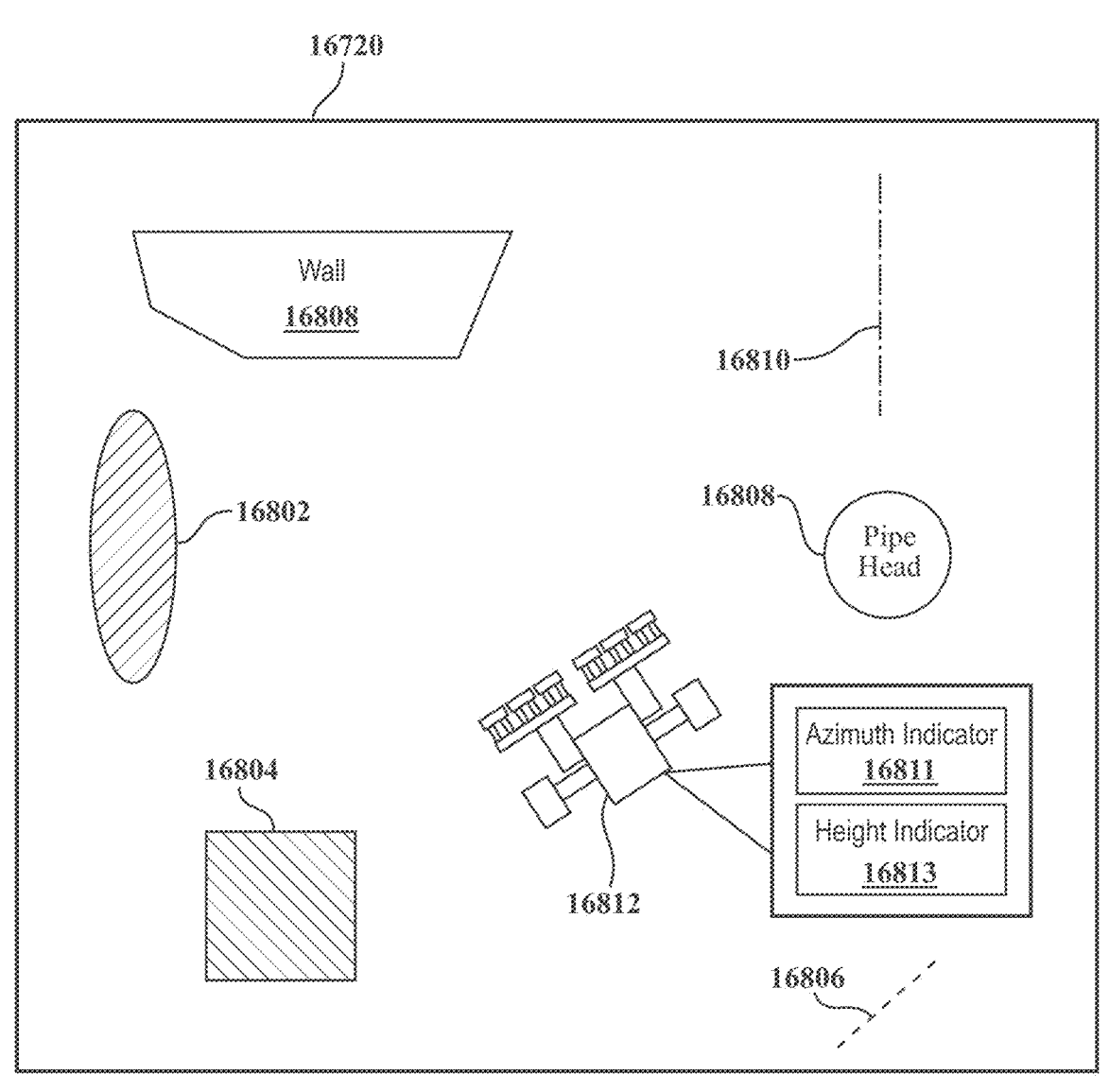
FIG. 24 and FIG. 25 depict an inspection map with features of the inspection surface and corresponding locations on the inspection surface consistent with certain embodiments of the present disclosure.

Referring to FIG. 24, in an embodiment, the inspection map 16720 may include a layout of the inspection surface based on the position-based inspection data 16716 (FIG. 23), where the layout may be in real space (e.g., GPS position, facility position, or other description of the inspection surface coordinates relative to a real space), or virtual space (e.g., abstracted coordinates, user defined coordinates, etc.). The coordinates used to display the inspection surface may be any coordinates, such as Cartesian, cylindrical, or the like, and further may include any conceptualization of the axes of the coordinate system. In certain embodiments, the coordinate system and/or conceptualization utilized may match the inspection position data, and/or may be transformed from the inspection position data to the target display coordinates. In certain embodiments, the coordinates and/or conceptualization utilized may be selectable by the user.

Figure 25:
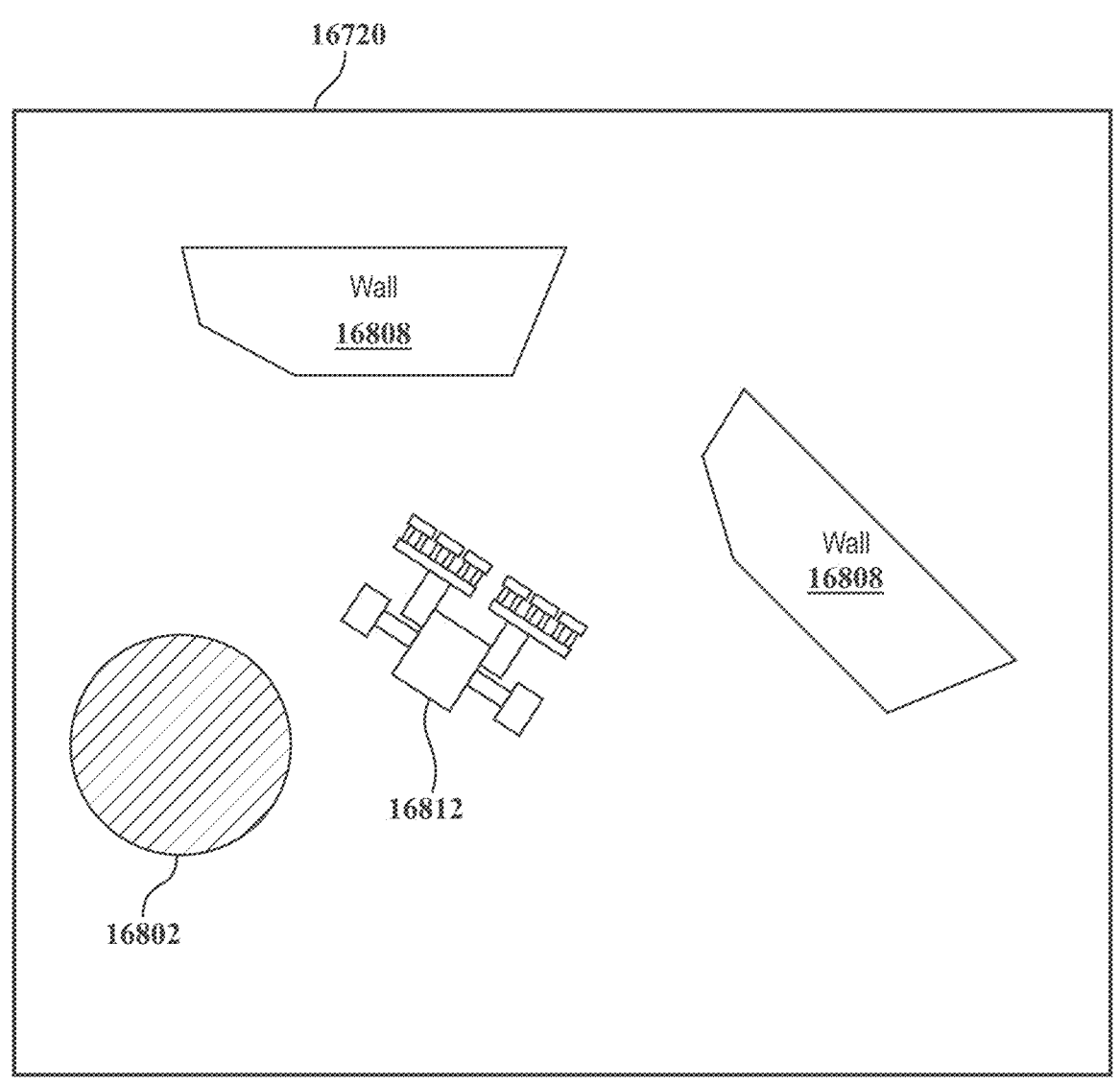

In an embodiment, and referring to FIG. 24 and FIG. 25, the inspection map 16720 may include at least two features of the inspection surface and corresponding locations on the inspection surface, each of the at least two features selected from a list consisting of an obstacle 16808; a surface build up 16802; a weld line 16810; a gouge 16806; or a repaired section 16804. The example features represented on the inspection map 16720 are non-limiting, and any features that may be of interest to a user (of any type) may be provided. Additionally, the depictions of features in FIGS. 24-25 are non-limiting examples, and features may be presented with icons, color coding, hatching, alert marks (e.g., where the alert mark can be selected, highlighted for provision of a tool tip description, etc.). Additionally, or alternatively, the features shown and/or the displayed representations may be adjustable by a user.

In an embodiment, the inspection data 16704 (FIG. 23) may include an inspection dimension such as, without limitation: a temperature of the inspection surface; a coating type of the inspection surface; a color of the inspection surface; a smoothness of the inspection surface; an obstacle density of the inspection surface; a radius of curvature of the inspection surface; a thickness of the inspection surface; and/or one or more features (e.g., grouped as "features", subdivided into one or more subgroups such as "repair", "damage", etc., and/or with individual feature types presented as an inspection dimension). In an embodiment, the inspection map 16720 may include a visualization property for the inspection dimension, the visualization property comprising a property such as: numeric values; shading values; transparency; a tool-tip indicator; color values; or hatching values. The utilization of a visualization property corresponding to an inspection dimension allows for improved contrast between displayed inspected aspects, and/or the ability to provide a greater number of inspection aspects within a single display. In certain embodiments, the displayed dimension(s), features, and/or representative data, as well as the corresponding visualization properties, may be selectable and/or configurable by the user.

In an embodiment, the position data may include a position marker 16812, such as an azimuthal indicator 16811 and a height indicator 16813, and wherein the inspection map 16720 includes visualization properties corresponding to position marker 16812, such as an azimuthal indicator 16811 or a height indicator 16813. The example of FIG. 24 depicts a position marker 16812 for a robot position (e.g., at a selected time, which may be depicted during an inspection operation and/or at a later time based on a time value for the inspection display). An example position marker 16812 may be provided in any coordinates and/or conceptualization. In certain embodiments, the inspection display may include coordinate lines or the like to orient the user to the position of displayed aspects, and/or may provide the position marker 16812 in response to a user input, such as selecting a location on the inspection surface, as a tooltip that appears at a user focus location (e.g., a mouse or cursor position), or the like.

A trajectory, as used herein, indicates a progression, sequence, and/or scheduled development of a related parameter over time, operating conditions, spatial positions, or the like. A trajectory may be a defined function (e.g., corresponding values of parameter A that are to be utilized for corresponding values of parameter B), an indicated direction (e.g., pursuing a target value, minimizing, maximizing, increasing, decreasing, etc.), and/or a state of an operating system (e.g., lifted, on or off, enabled or disabled, etc.). In certain embodiments, a trajectory indicates activation or actuation of a value over time, activation or actuation of a value over a prescribed group of operating conditions, activation or actuation of a value over a prescribed spatial region (e.g., a number of inspection surfaces, positions and/or regions of a specific inspection surface, and/or a number of facilities), and/or activation or actuation of a value over a number of events (e.g., scheduled by event type, event occurrence frequency, over a number of inspection operations, etc.). In certain embodiments, a trajectory indicates sensing a parameter, operating a sensor, displaying inspection data and/or visualization based on inspection data, over any of the related parameters (operating conditions, spatial regions, etc.) listed foregoing. The examples of a trajectory set forth with regard to the presently described embodiments are applicable to any embodiments of the present disclosure, and any other descriptions of a trajectory set forth elsewhere in the present disclosure are applicable to the presently described embodiments.

A response, as used herein, and without limitation to any other aspect of the present disclosure, includes an adjustment to at least one of: an inspection configuration for the inspection robot while on the surface (e.g., a change to sensor operations; couplant operations; robot traversal commands and/or pathing; payload configurations; and/or down force configuration for a payload, sled, sensor, etc.); a change to display operations of the inspection data; a change to inspection data processing operations, including determining raw sensor data, minimal processing operations, and/or processed data values (e.g., wall thickness, coating thickness, categorical descriptions, etc.); an inspection configuration for the inspection robot performed with the inspection robot removed from the inspection surface (e.g., changed wheel configurations, changed drive module configurations; adjusted and/or swapped payloads; changes to sensor configurations (e.g., switching out sensors and/or sensor positions); changes to hardware controllers (e.g., switching a hardware controller, changing firmware and/or calibrations for a hardware controller, etc.); and/or changing a tether coupled to the inspection robot. The described responses are non-limiting examples, and any other adjustments, changes, updates, or responses set forth throughout the present disclosure are contemplated herein for potential rapid response operations. Certain responses are described as performed while the inspection robot is on the inspection surface and other responses are described as performed with the inspection robot removed from the inspection surface, although any given response may be performed in the other condition, and the availability of a given response as on-surface or off-surface may further depend upon the features and configuration of a particular inspection robot, as set forth in the multiple embodiments described throughout the present disclosure.

Additionally, or alternatively, certain responses may be available only during certain operating conditions while the inspection robot is on the inspection surface, for example when the inspection robot is in a location physically accessible to an operator, and/or when the inspection robot can pause physical movement and/or inspection operations such as data collection. One of skill in the art, having the benefit of the present disclosure and information ordinarily available when contemplating a particular system and/or inspection robot, can readily determine response operations available for the particular system and/or inspection robot.

A response that is rapid, as used herein, and without limitation to any other aspect of the present disclosure, includes a response capable of being performed in a time relevant to the considered downstream utilization of the response. For example, a response that can be performed during the inspection operation, and/or before the completion of the inspection operation, may be considered a rapid response in certain embodiments, allowing for the completion of the inspection operation utilizing the benefit of the rapid response. Certain further example rapid response times include: a response that can be performed at the location of the inspection surface (e.g., without requiring the inspection robot be returned to a service or dispatching facility for reconfiguration); a response that can be performed during a period of time wherein a downstream customer (e.g., an owner or operator of a facility including the inspection surface; an operator of the inspection robot performing the inspection operations; and/or a user related to the operator of the inspection robot, such as a supporting operator, supervisor, data verifier, etc.) of the inspection data is reviewing the inspection data and/or a visualization corresponding to the inspection data; and/or a response that can be performed within a specified period of time (e.g., before a second inspection operation of a second inspection surface at a same facility including both the inspection surface and the second inspection surface; within a specified calendar period such as a day, three days, a week, etc.). An example rapid response includes a response that can be performed within a specified time related to interactions between an entity related to the operator of the inspection robot and an entity related to a downstream customer. For example, the specified time may be a time related to an invoicing period for the inspection operation, a warranty period for the inspection operation, a review period for the inspection operation, and/or a correction period for the inspection operation. Any one or more of the specified times related to interactions between the entities may be defined by contractual terms related to the inspection operation, industry standard practices related to the inspection operation, an understanding developed between the entities related to the inspection operation, and/or the ongoing conduct of the entities for a number inspection operations related to the inspection operation, where the number of inspection operations may be inspection operations for related facilities, related inspection surfaces, and/or previous inspection operations for the inspection surface. One of skill in the art, having the benefit of the disclosure herein and information ordinarily available when contemplating a particular system and/or inspection robot, can readily determine response operations and response time periods that are rapid responses for the purposes of the particular system.

Figure 26:
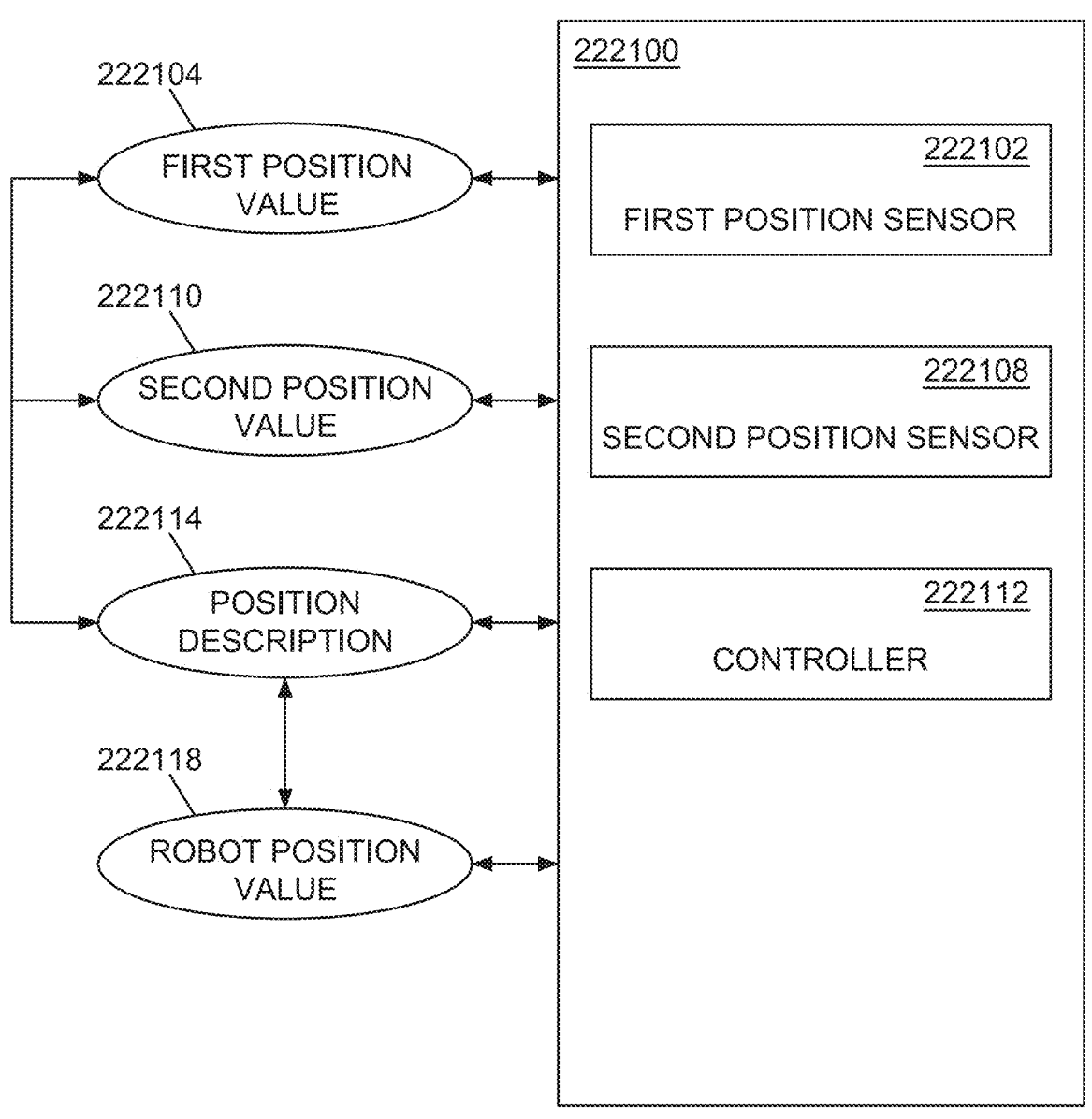
FIG. 26 is a schematic diagram of an inspection robot positioning system consistent with certain embodiments of the present disclosure.
Figure 27:
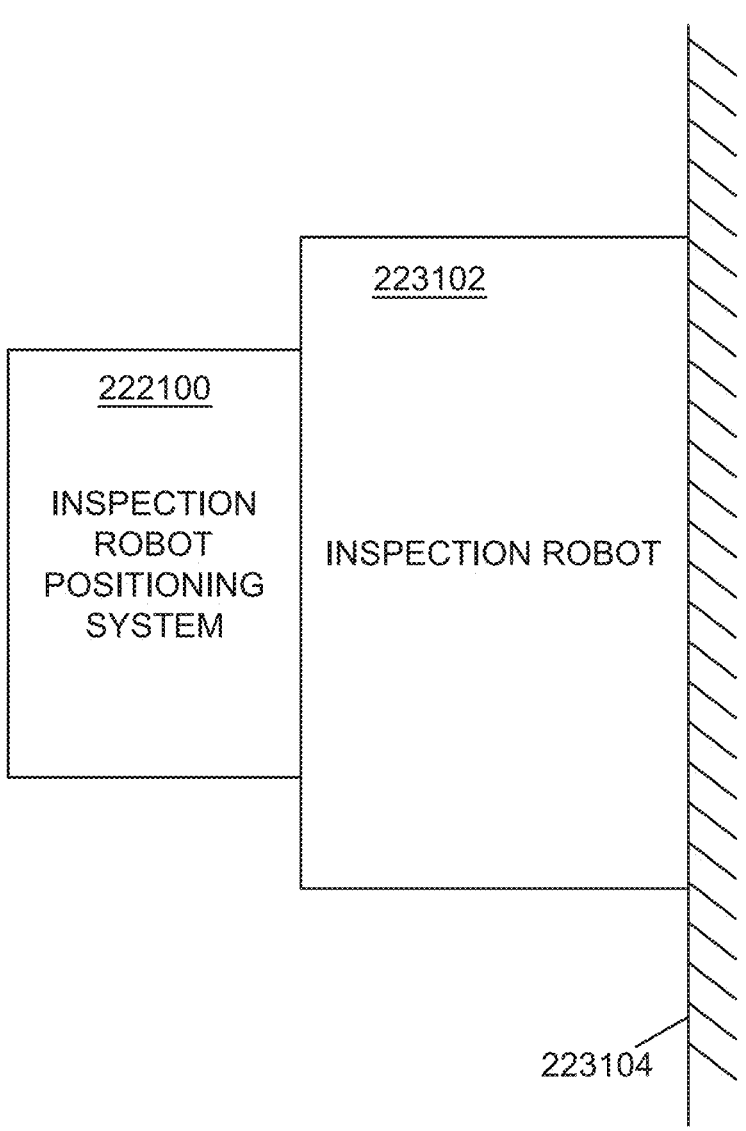
FIG. 27 is a schematic diagram of an inspection robot, including the inspection robot positioning system of FIG. 26, on an inspection surface consistent with certain embodiments of the present disclosure.

Referring to FIGS. 26 and 27, an example inspection robot positioning system 222100 is depicted. The inspection robot positioning system 222100 may be located on and/or in an inspection robot 223102 (FIG. 27), and/or may be configured in association and/or in communication with the inspection robot 223102. For example, the inspection robot positioning system 222100 may be included, in whole or part, on a base station, a cloud server, a computer at the inspection site at least intermittently communicatively coupled to the inspection robot, or the like. In certain embodiments, the inspection robot positioning system 222100 may be distributed across two or more of these locations, or at any other location within the inspection system and at least intermittently communicatively coupled to the inspection robot. The inspection robot positioning system 222100 may include a first position sensor 222102 configured to provide a first position value 222104; a second position sensor 222108 configured to provide a second position value 222110; and a controller 222112 configured to determine a position description 222114 for the inspection robot 223102 in response to the first position value 222104 and the second position value 222110. In embodiments, the position description 222114 includes a robot position value 222118 of the inspection robot 223102 on an inspection surface 223104 (FIG. 27). The first position sensor 222102 and the second position sensor 222108 may be onboard the inspection robot 223102 and/or may be offboard, e.g., in the environment of the inspection robot 223102 or the inspection surface 223104 or, in embodiments, may be provided externally to the inspection robot 223102.

Without limitation to any other aspect of the present disclosure, a position sensor onboard the inspection robot 223102 may include one or more of an encoder, an inertial measurement unit (IMU), a rangefinding device (e.g., a laser, Lidar, radar, etc.), actuator feedback values (e.g., motor commands and/or direct feedback values), a transceiver (e.g., configured to provide position information via range and/or direction information to an external device such as a wireless router, dedicated signal device, or the like), a global positioning system (GPS) device, a local positioning device, a camera and/or imaging device, and/or a direct rangefinder such as a laser, light beam source, reflecting prism, or the like. Without limitation to any other aspect of the present disclosure, a position sensor offboard the inspection robot 223102 may include a camera and/or imaging device, a tether encoder (e.g., measuring a position and/or extension of a tether coupled to the inspection robot), a transceiver, a wireless router and/or dedicated signal device, or the like. In certain embodiments, a sensor may be combined onboard/offboard, such as a reflective prism positioned on the inspection robot (and/or at a selected location), with a laser and/or light beam source positioned at a selected location (and/or on the inspection robot)—for example providing a range and/or direction between the selected location and the inspection robot; and/or a transceiver positioned on the inspection robot (and/or at one or more selected locations) and one or more wireless router(s), dedicated signal device(s), and/or other wireless rangefinding device(s) positioned at one or more selected locations (and/or on the inspection robot). It can be seen that a given device may be a sensor in certain embodiments (e.g., a reflective prism mounted on the inspection robot) and/or a part of a sensor in other embodiments (e.g., the reflective prism forming a portion of a sensor, with the laser and/or light source forming the remainder of the sensor).

A position value for the inspection robot, as utilized herein, should be understood broadly. A position value is any value tending to indicate the position of the inspection robot, including values that are precursors for, and/or inputs to, a procedure to make a determination of the position of the inspection robot. In certain embodiments, the position value provides an indication of coordinate position, in any coordinate units, and which may include a relative or absolute position. For example, a position value may provide X-Y-Z coordinates, an indication relative to a selected reference location (e.g., a tagged position on the inspection surface, a position of the base station, and/or any other selected reference location). The coordinate system utilized for position descriptions may be any selected coordinate system, including for example Cartesian coordinates, cylindrical coordinates, and/or spherical coordinates. Additionally, or alternatively, a coordinate system may be utilized for a specific operation using any selected coordinate logic, for example "13.3 meters high on pipe six (6)". In certain embodiments, a position value may include any positional information relevant to the inspection robot, for example a derivative of the position (e.g., time derivative, such as speed, and/or another derivative such as δP/δS, where S can be inspection time, inspection stage progression, inspection surface location, etc.), and/or a second derivative of the position (e.g., time second derivative, such as acceleration, and/or another derivative). In another example, the position value may include orientation information (e.g., yaw, pitch, and/or roll) and/or derivatives thereof.

The capability to provide high accuracy and low latency position information for an inspection robot is challenging for a number of environments where inspection robots operate. For example, inspection surfaces may be irregular or curved, include hidden portions where line-of-sight is lost, be in confined spaces where access to the inspection robot is limited and/or unsafe, and/or be in spaces where operating equipment precludes or reduces the opportunity for an operator to remain in proximity to the inspection robot (e.g., high voltage areas, high temperature areas, near tanks include corrosive fluids, etc.). These challenges make it difficult to achieve continuous position data for the inspection robot, and further make it difficult for any single position determination procedure to be continuously available. For example, the presence of large metal surfaces, loss of line-of-sight, slippage of wheels of the inspection robot, intermittent availability of WiFi communications, or the like, can cause the loss or degradation of a given position determination procedure, including in an unpredictable manner, to occur during inspection operations.

As will be understood, the availability of high accuracy and low latency position information for an inspection robot provides numerous benefits. For example, and without limitation to any other aspect of the present disclosure, the availability of high accuracy and low latency position information allows for one or more benefits such as: confirmation that inspection operations are complete; mapping of inspection data to the inspection surface for review, planning, and/or long term iterative improvement of inspection operations; detection, mitigation, and repair for anomalous conditions such as obstacles, damaged areas of the inspection surface, or the like; a rapid indication that something in the inspection operation is not correct (e.g., separation of the inspection robot from the inspection surface and/or incorrect traversal of the inspection path); comparison between similar locations of offset inspection facilities, which can enhance detection of anomalies and/or outliers, and/or increase the capability of iterative improvement operations such as machine learning and/or artificial intelligence operations to enhance inspections, plan repair or maintenance cycles, improve confidence in certifications or risk management operations, or the like.

Figure 28:
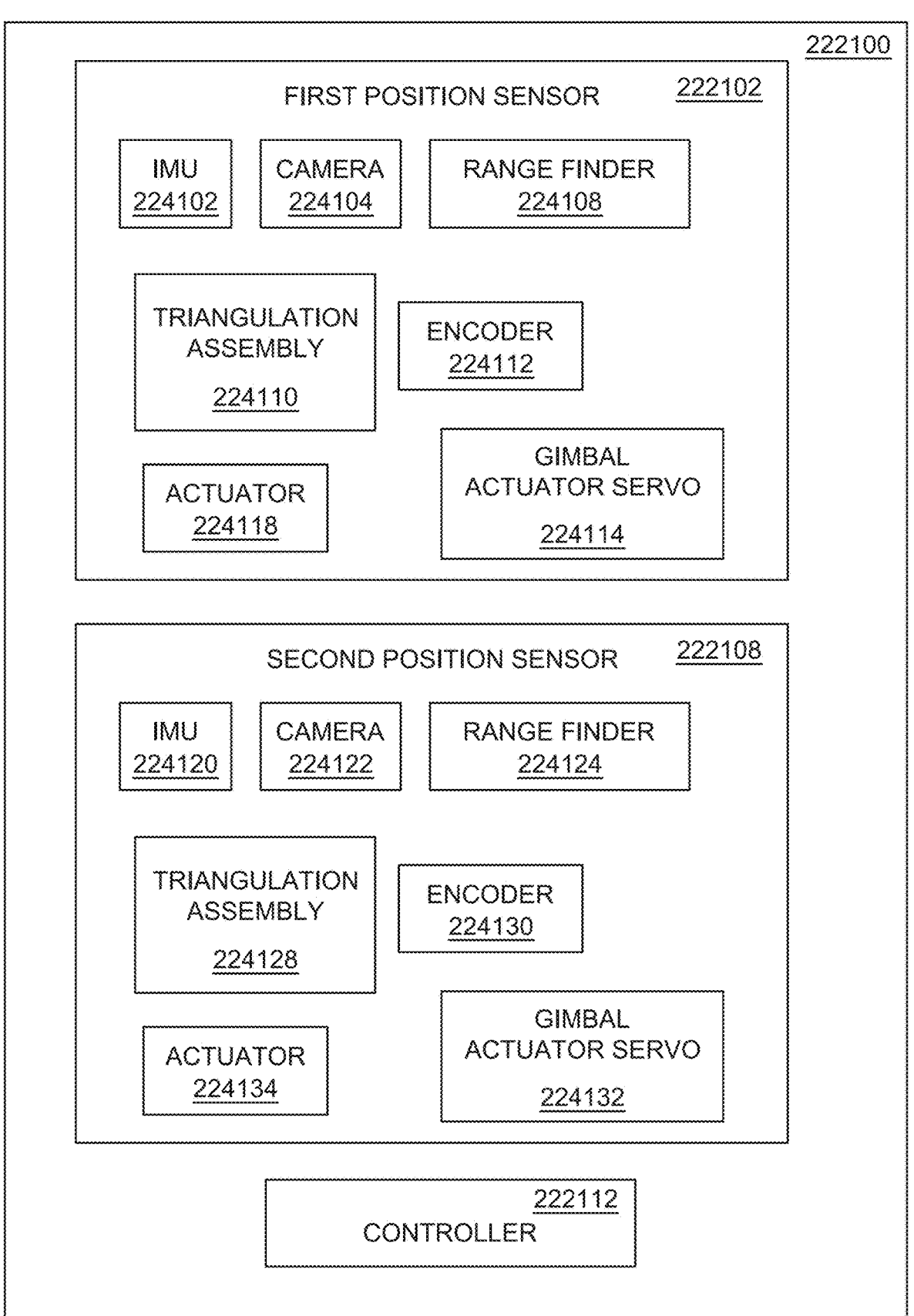
FIG. 28 is a schematic diagram depicting certain further aspects of an inspection robot positioning system consistent with certain embodiments of the present disclosure.

Referring to FIGS. 28-32, certain further aspects of the inspection robot positioning system 222100 are described in the following, any one or more of which may be present in certain embodiments. With reference to FIG. 28, in certain embodiments, in the inspection robot positioning system 222100, each one of the first position sensor 222102 and the second position sensor 222108 may include at least one of: an inertial measurement unit (IMU) 224102, 224120, a camera 224104, 224122, a range finder 224108, 224124, a triangulation assembly 224110, 224128, an encoder 224112, 224130 for at least one of a wheel or a motor of the inspection robot 223102 (FIG. 27), a gimbal actuator servo 224114, 224132, or an actuator 224118, 224134 of the inspection robot 223102 (FIG. 27).

Figure 29:
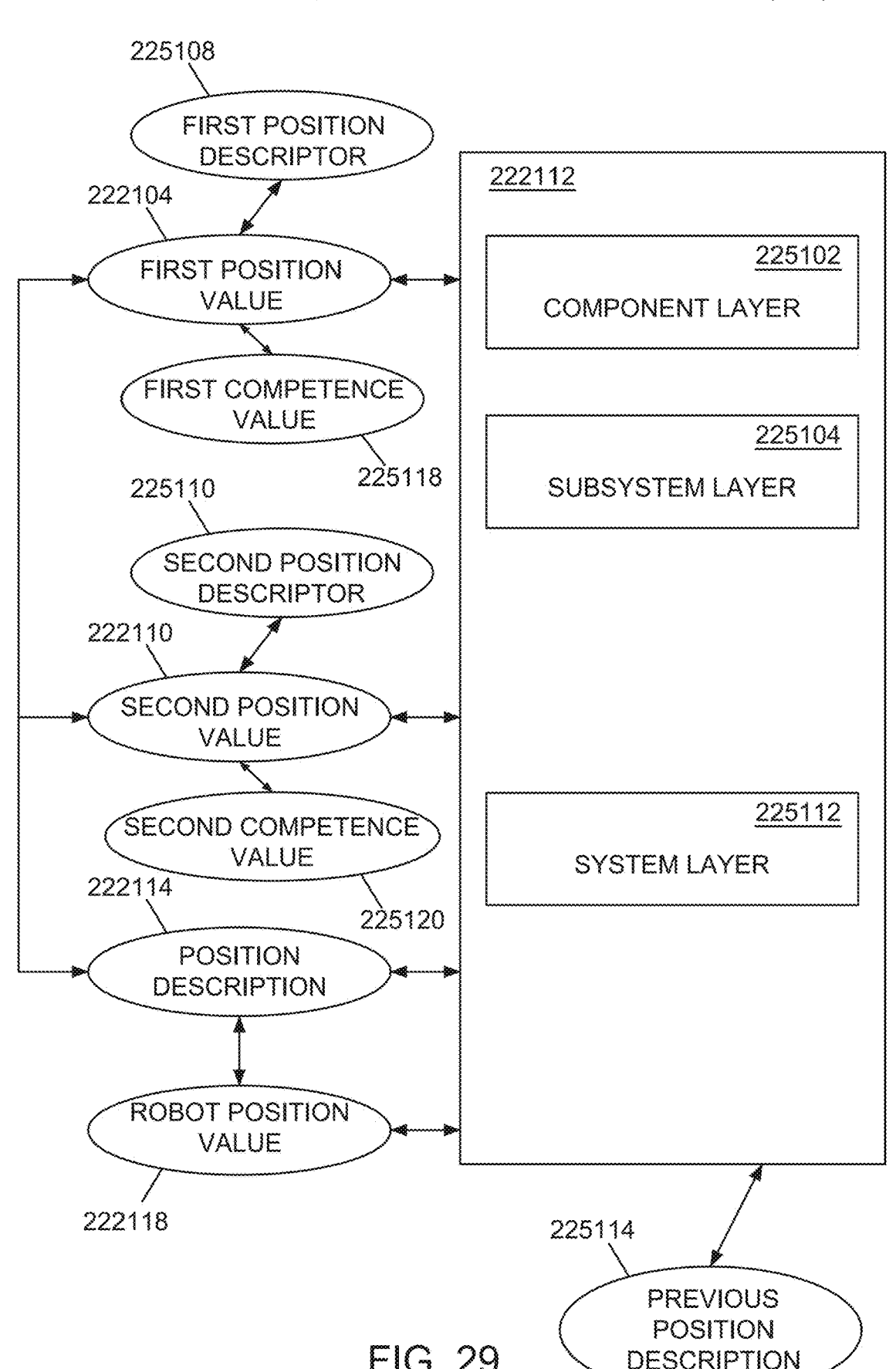
FIG. 29 is a schematic diagram depicting certain further aspects of an inspection robot positioning system consistent with certain embodiments of the present disclosure.

Referring to FIG. 29, in certain embodiments, in the inspection robot positioning system 222100 (FIG. 28), the controller 222112 may further include: a component layer 225102 configured to interpret the first position value 222104 and the second position value 222110, a subsystem layer 225104 configured to: process the first position value 222104 into a first position descriptor 225108, and process the second position value 222110 into a second position descriptor 225110, and a system layer 225112 configured to determine the position description 222114 in response to the first position value 222104 and the second position value 222110. In certain embodiments, in the inspection robot positioning system 222100, the system layer 225112 may be further configured to determine the position description 222114 in response to a previous position description 225114.

In certain embodiments, in the inspection robot positioning system 222100, the system layer 225112 may be further configured to determine the position description 222114 in response to: a first competence value 225118 associated with the first position value 222104, and a second competence value 225120 associated with the second position value 222110.

Figure 30:
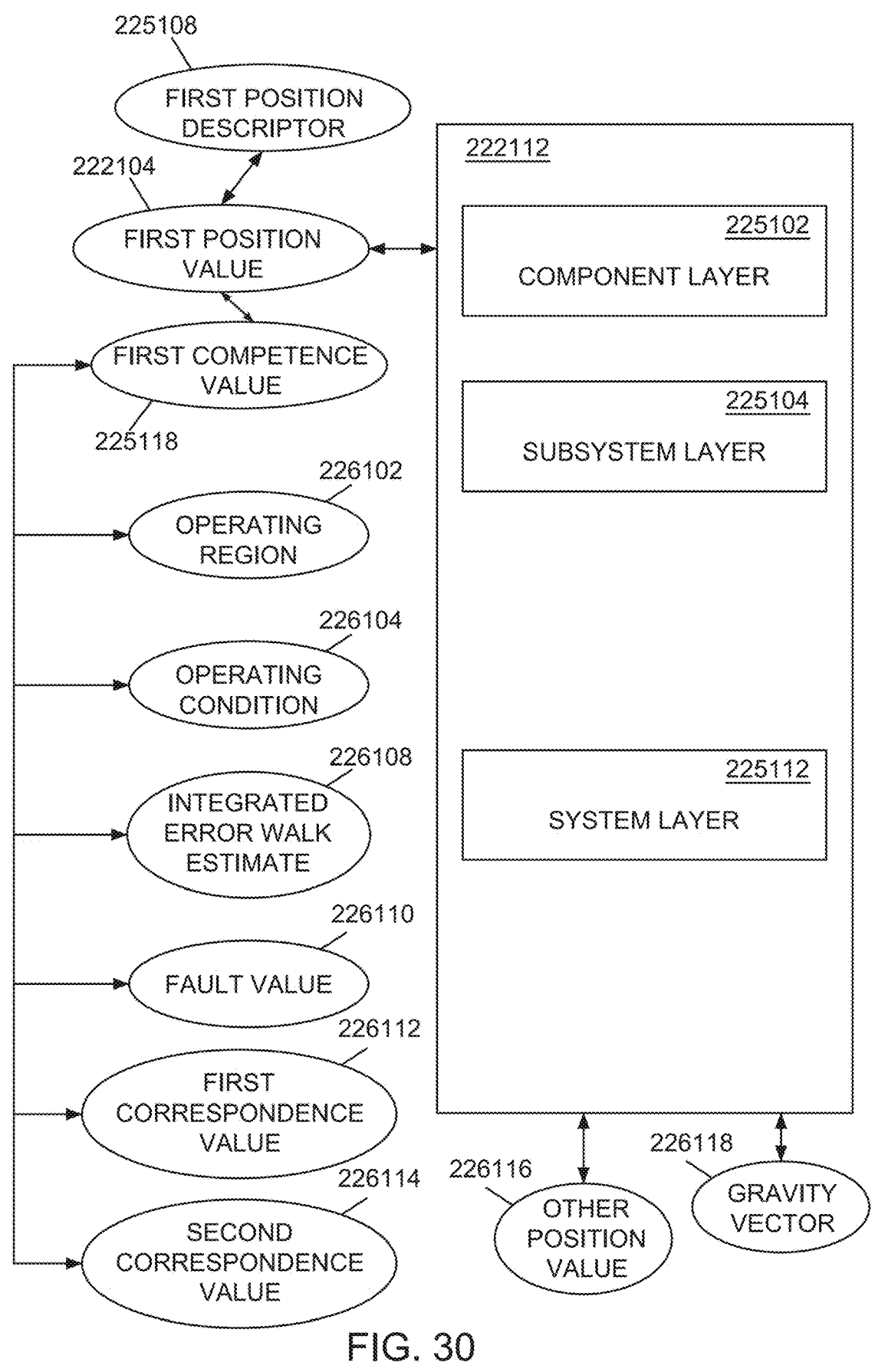
FIG. 30 is a schematic diagram depicting certain further aspects of an inspection robot positioning system consistent with certain embodiments of the present disclosure.

Referring to FIG. 30, in certain embodiments, in the inspection robot positioning system 222100, the subsystem layer may be further configured to determine the first competence value 225118 in response to at least one of: an operating region 226102 of the first position sensor 222102, an operating condition 226104 of the inspection robot 223102, an integrated error walk estimate 226108 corresponding to the first position sensor 222102, a fault value 226110 associated with the first position sensor 222102 (FIG. 28), a first correspondence value 226112 for a correspondence of the first position value 222104 with a previous position description, e.g., the previous position description 225114 of FIG. 29, or a second correspondence value 226114 for a correspondence of the first position value 222104 with at least one other position value 226116.

Certain embodiments herein reference a competence value. A competence value, as utilized herein, includes any indication that a given position source (e.g., a position sensor and/or positioning algorithm that provides a position value) is providing a proper position value, and/or that the position source is not providing a proper position value. The competence value may be applied quantitatively (e.g., weighting the particular position value in a Kalman filter or other combining methodology between various sensors) and/or qualitatively (e.g., the related position value is ignored, mode switched between weightings, the real position estimate is reset to a position indicated by the position value, the real position estimate is reset to a value based on the position value, for example exponentially decaying toward a position indicated by the position value, etc.). In certain embodiments, the competence value may be based on one or more determinations such as: an operating region of the position sensor (e.g., determining the competence value based on the position sensor operating within a competent range, and/or having a competence determined according to the range, for example to account for ranges of the sensor that are of reduced precision, accuracy, linearity, etc.); an operating condition of the inspection robot (e.g., some sensors may be more or less capable depending upon the operating condition of the robot, such as current operating temperature, velocity, acceleration, elevation, orientation, etc.); an integrated error walk estimate corresponding to the position sensor (e.g., estimating a drift of an integrated value over time, based on a time since a high confidence reset for the integrator, and/or based on an accumulated value since a high confidence reset for the integrator); a fault value associated with the position sensor (e.g., reducing a competence value for the position sensor based on a fault condition, for example removing the sensor from consideration for a failed value, reducing the contribution of the sensor for a suspect value or during a fault value increment condition, etc.); a first correspondence value for correspondence of the first position value with a previous position description (e.g., adjusting the contribution of the sensor based on whether the sensor is providing a value that is within an expected range based on the current estimated real position and operating conditions); and/or a second correspondence value for correspondence of the first position value with at least one other position value (e.g., adjusting the contribution of sensors based on consistency with other position sensors and/or position algorithms within the system). In certain embodiments, one or more elements of the competence value may be referenced herein as a competence factor. In certain embodiments, a competence factor may form a part of the competence value, may be utilized to determine the competence value, and/or may constitute the competence value (e.g., during an operating period where a single one of the position sensors is being utilized to determine the current estimated real position, for example during a reset where the single position sensor is known to be correct, and/or when other position sensors are deprecated—for example due to operating out of range, a fault condition, etc.).

One of skill in the art, having the benefit of the present disclosure and information ordinarily available when contemplating a particular system, can readily determine competence values for the sensors and/or positioning algorithms of the system, and how to apply them to determine the current estimated real position. Certain considerations to determine and/or apply competence values for sensors and/or positioning algorithms herein include one or more aspects such as: the operating range of the sensor; the performance of the sensor (e.g., precision, accuracy, responsiveness, linearity, etc.) within the operating range of the sensor; the fault detection scheme for the sensor; an error or uncertainty accumulation rate for the sensor; and/or the performance of the sensor based on various operating conditions for the system including the sensor.

Referring to FIGS. 29 and 30, In certain embodiments, in the inspection robot positioning system 222100 (FIG. 28), the system layer 225112 may be further configured to determine the position description 222114 by blending the previous position description 225114, the first position value 222104, and the second position value 222110. In certain embodiments, in the inspection robot positioning system 222100, the system layer 225112 may be further configured to determine the position description 222114 by weighting application of each of the first position value 222104 and the second position value 222110 in response to the corresponding first competence value 225118 and second competence value 225120. In certain embodiments, in the inspection robot positioning system 222100, the system layer 225112 may be further configured to determine the position description 222114 by at least partially resetting the position description 222114 in response to one of the first competence value 225118 or the second competence value 225120 and the corresponding first position value 222104 or second position value 222110. In certain embodiments, in the inspection robot positioning system 222100, the first position sensor 222102 may include an inertial measurement unit (IMU), e.g., the IMU 224102 of FIG. 28; an inspection surface, e.g., the inspection surface 223104 of FIG. 27, may include a substantially vertical surface; and the controller 222112 may be further configured to determine the first position value 222104 in response to a gravity vector 226118.

Figure 31:
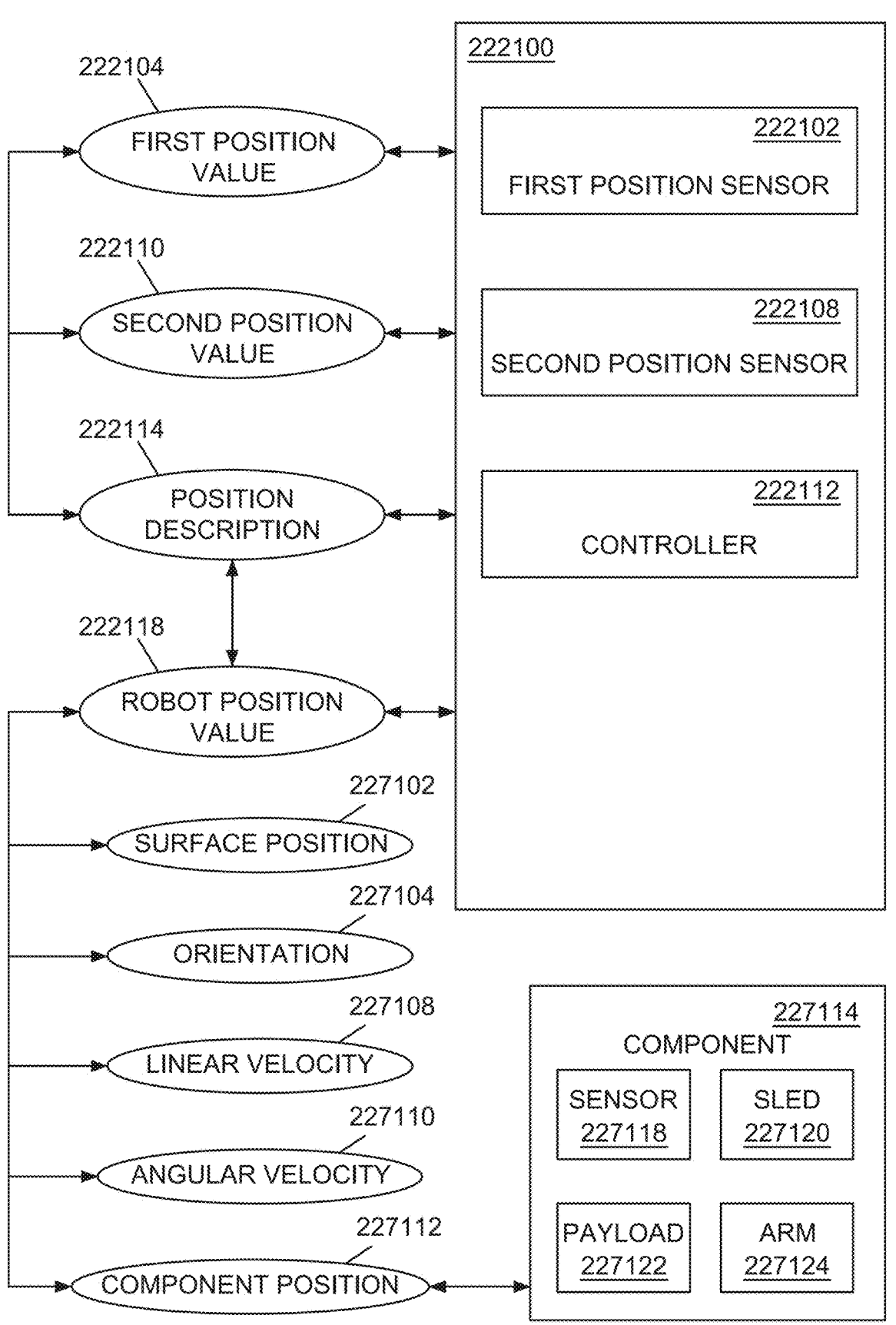
FIG. 31 is a schematic diagram depicting certain further aspects of an inspection robot positioning system consistent with certain embodiments of the present disclosure.

Referring to FIG. 31, in certain embodiments, in the inspection robot positioning system 222100, the robot position value 222118 may include a position 227102 of the inspection robot 223102 (FIG. 27) on the inspection surface 223104 (FIG. 27). In certain embodiments, in the inspection robot positioning system 222100, the robot position value 222118 may include an orientation 227104 of the inspection robot 223102 on the inspection surface 223104. In certain embodiments, in the inspection robot positioning system 222100, the robot position value 222118 may include at least one of a linear velocity 227108 of the inspection robot 223102 or an angular velocity 227110 of the inspection robot 223102. In certain embodiments, in the inspection robot positioning system 222100, the robot position value 222118 may include a position 227112 of a component 227114 of the inspection robot 223102. In certain embodiments, in the inspection robot positioning system 222100, the component 227114 may include at least one of: a sensor 227118, a sensor sled 227120, a payload 227122, or a payload arm 227124.

Figure 32:
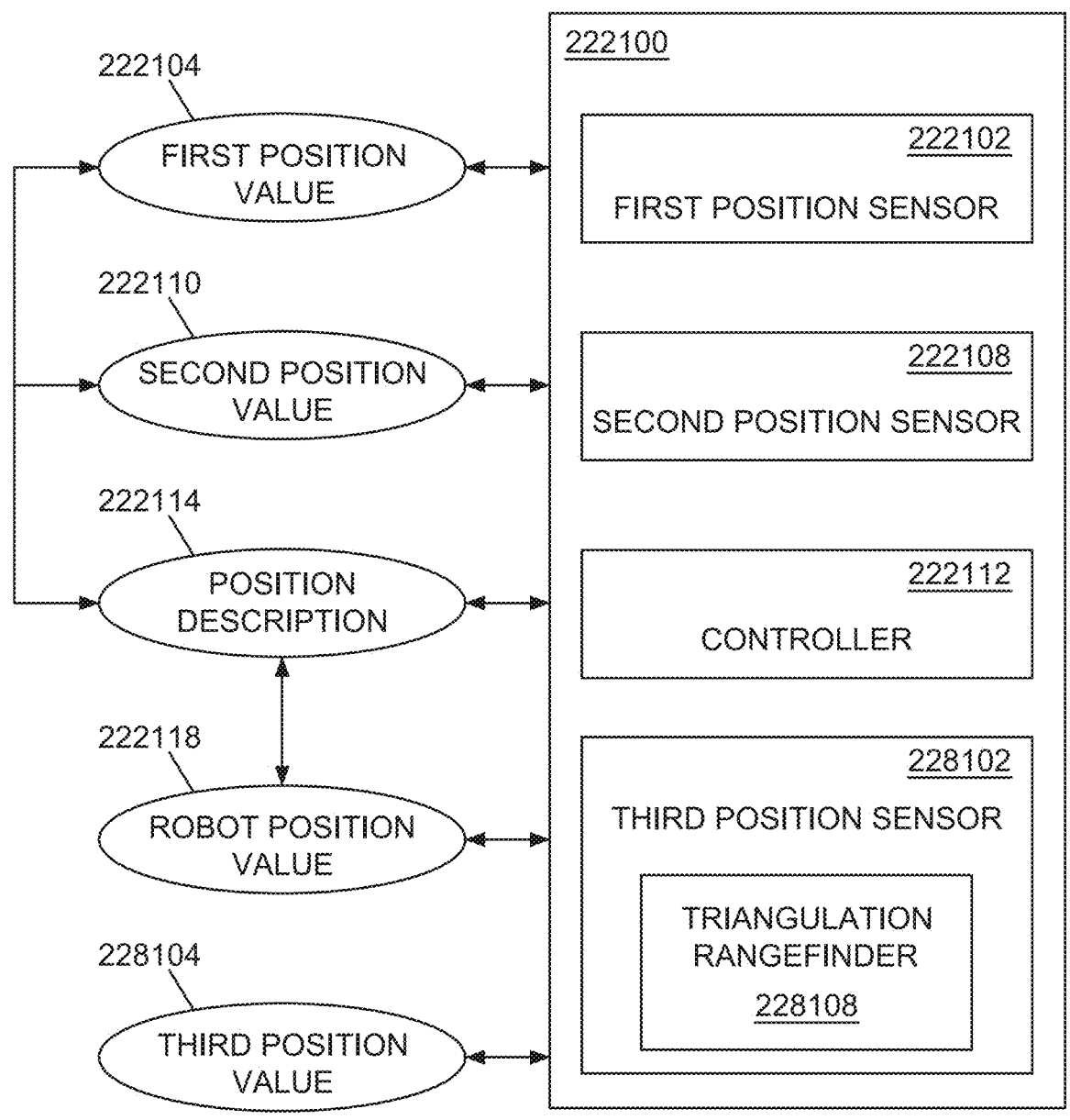
FIG. 32 is a schematic diagram depicting certain further aspects of an inspection robot positioning system consistent with certain embodiments of the present disclosure.

Referring to FIG. 32, in certain embodiments, in the inspection robot positioning system 222100, the first position sensor 222102 may include an internal measurement unit, e.g., the IMU 224102 of FIG. 28; and the second position sensor 222108 may include an encoder for at least one of a wheel or a motor of the inspection robot, e.g., the encoder 224130 of FIG. 28. In certain embodiments, the inspection robot positioning system 222100 may further include a third position sensor 228102 providing a third position value 228104, wherein the controller 222112 may be further configured to determine the position description 222114 in response to the third position value 228104, and wherein the third position sensor 228102 may include a triangulation rangefinder 228108.

Figures 33, 33A, 33B:
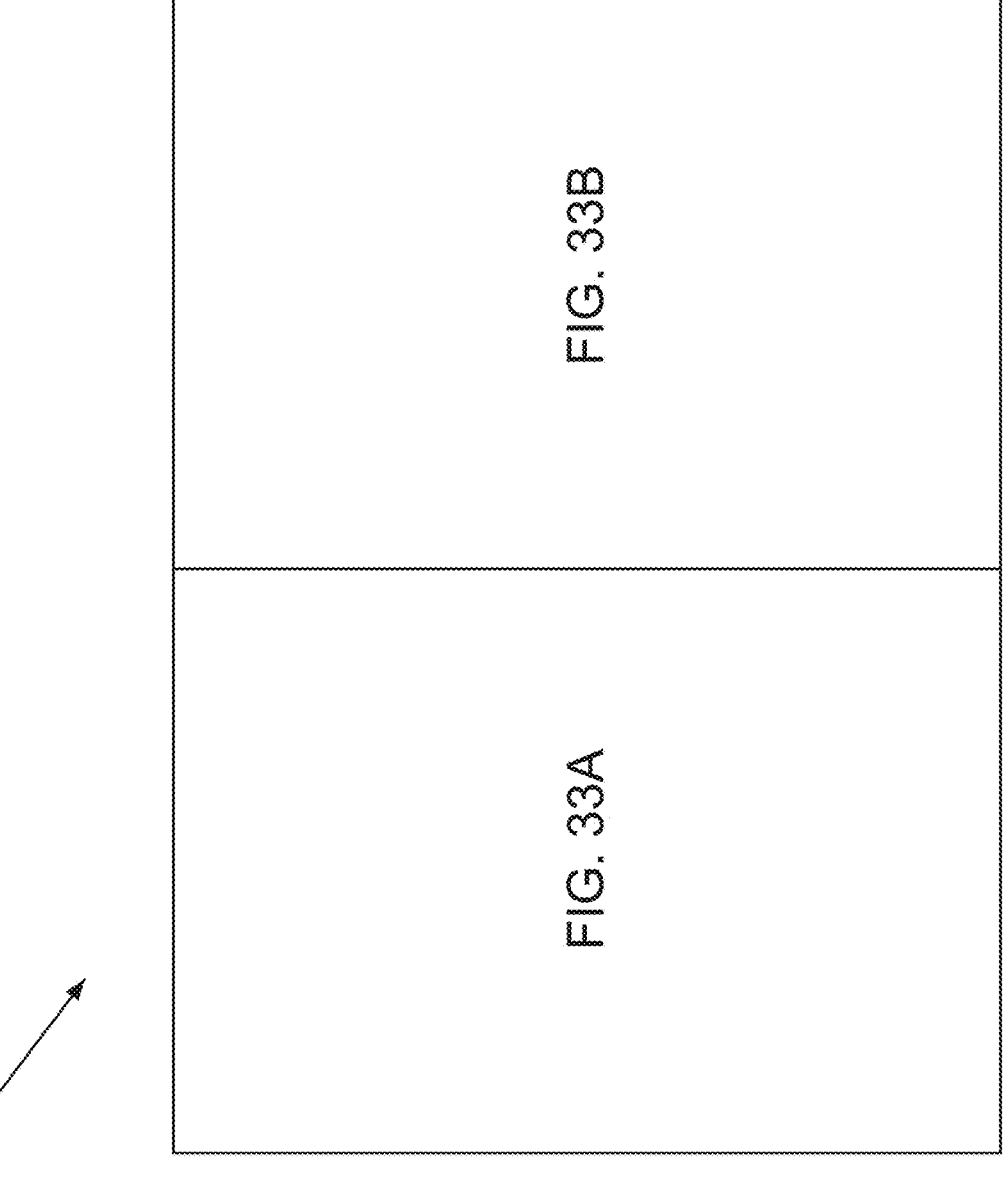
FIGS. 33, 33A, and 33B depict a schematic diagram of an inspection robot positioning system consistent with certain embodiments of the present disclosure.
Figure 33A:
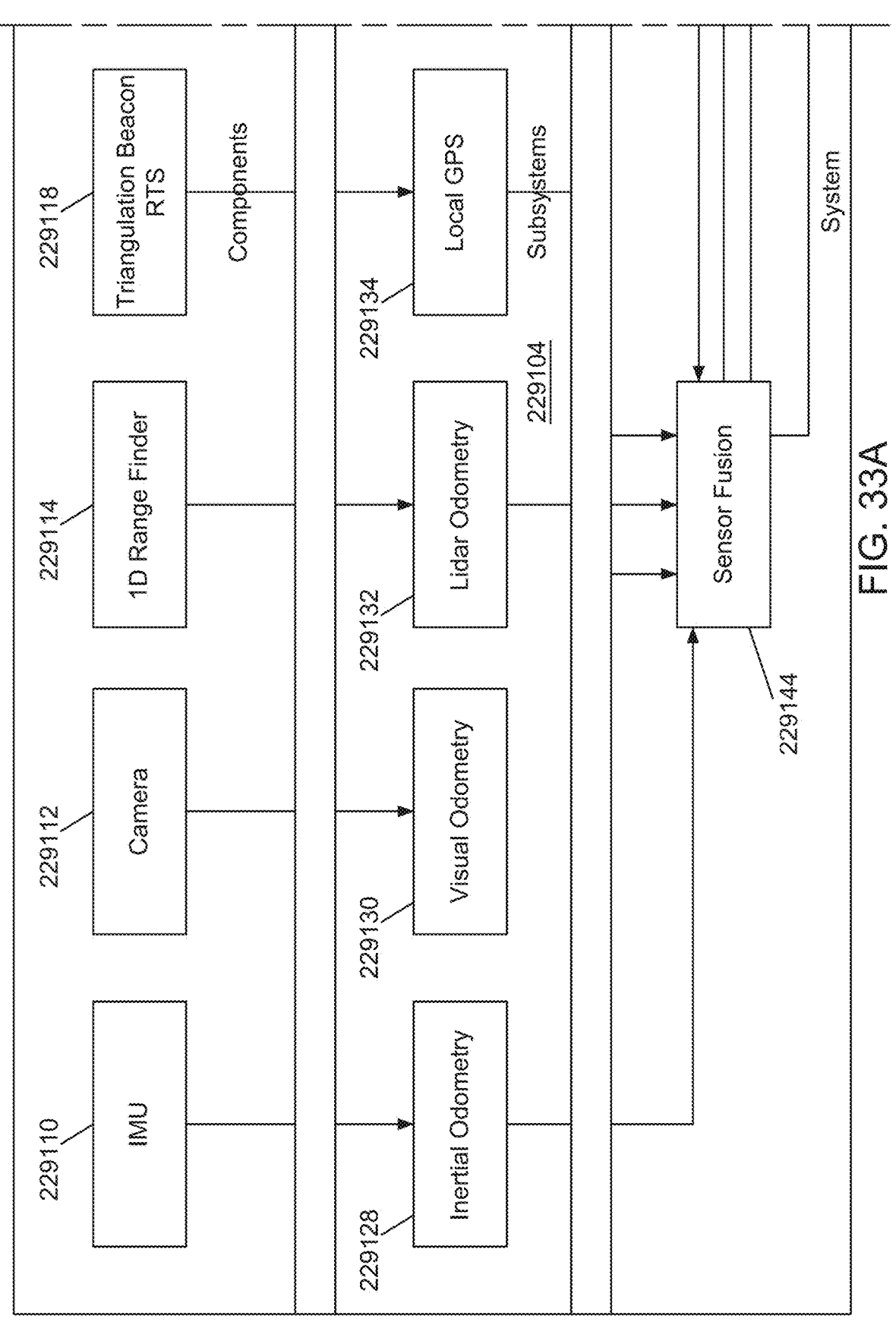
Figure 33B:
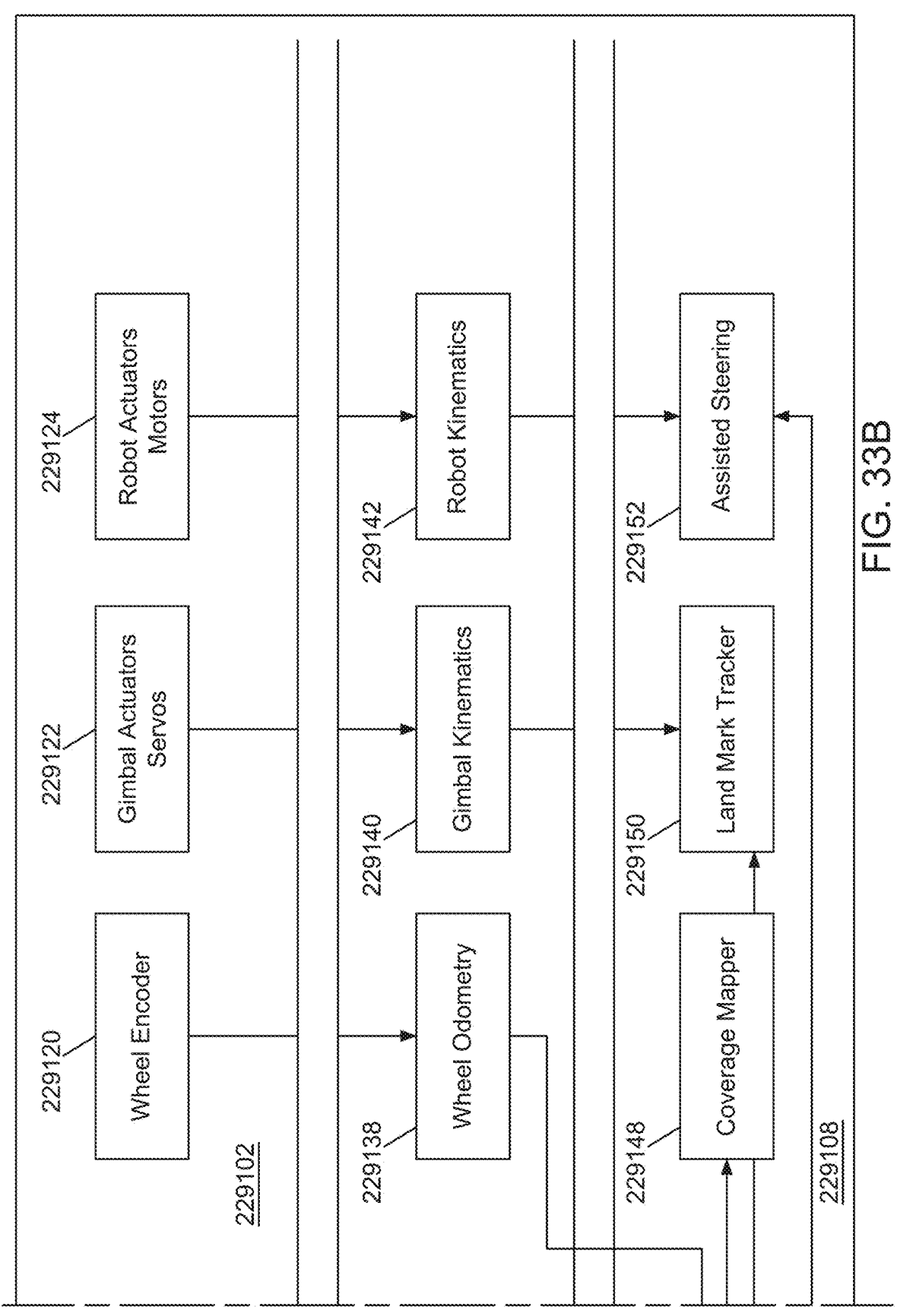

Referring to FIGS. 33, 33A, and 33B, embodiments of an inspection robot positioning system 229100 may include, for example, three layers: a component layer 229102, a subsystem layer 229104, and a system layer 229108. The component layer 229102 may include hardware or sensor modules that may be independently controllable or may provide meaningful data about the environment and state of the robot, for example, various sensors. The sensors may be onboard the inspection robot and/or may be offboard. Components in the component layer 229102 may also include software, which may include the firmware or hardware interface, with appropriate drivers and communications. The subsystem layer 229104 may be primarily software-based modules that may utilize the data or controllability of a component, and may build intelligent behavior on top of it, which may include filtering, localization, and/or other algorithms. The system layer 229108 may include system-level modules that may bring together multiple subsystems to perform a robot-level function, e.g., find the position, assist the driver in steering etc. The modules may do so by techniques such as sensor fusion. System-level modules may also act as an interface, e.g., to remote control (RC) and other software components down the pipeline. The correspondence between the components and the subsystem may not be 1-to-1. The diagram of FIGS. 33, 33A, and 33B is provided as a non-limiting example.

Figure 35:
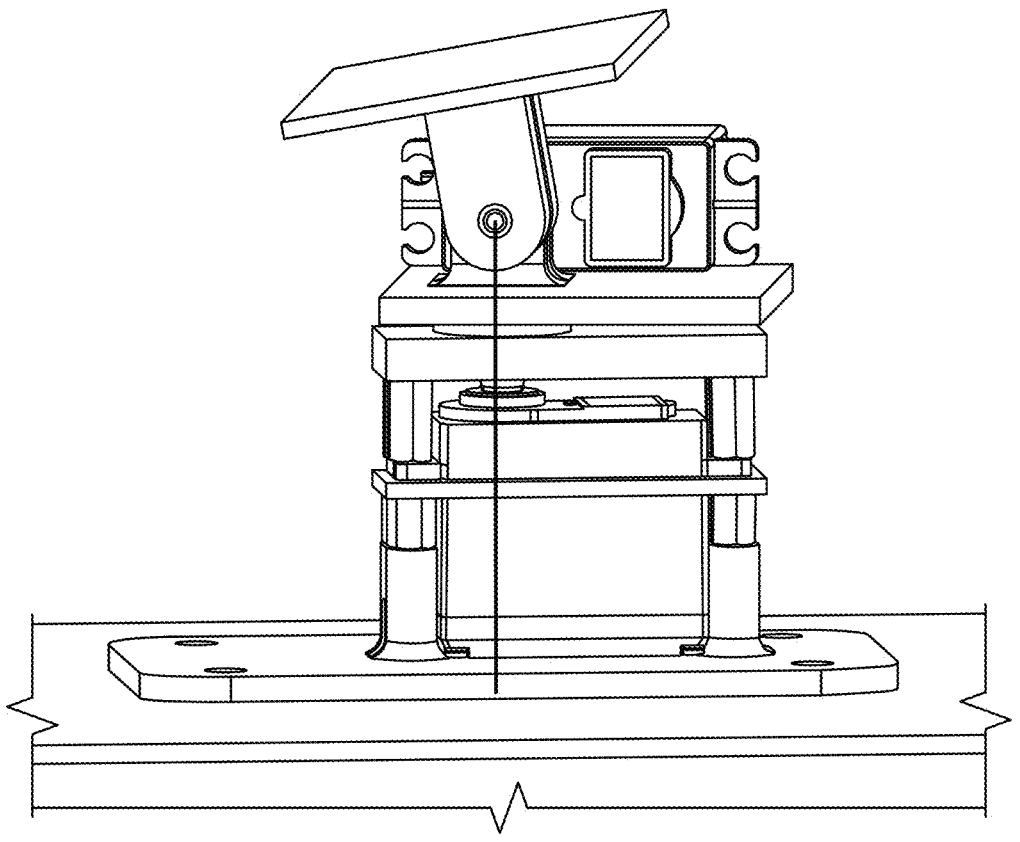
FIG. 35 is a schematic diagram of a gimbal platform consistent with certain embodiments of the present disclosure.

The component layer 229102 may include, for example, an inertial measurement unit (IMU) 229110, a camera 229112, at least one one-dimensional range finder 229114, a triangulation beacon 229118 (e.g., for a robotic total station (RTS)), a wheel encoder 229120, gimbal actuator servos 229122, and robot actuator motors 229124. The IMU 229110 may include, for example, an accelerometer and/or a gyroscope. The triangulation beacon 229118 may also include GPS components. The gimbal actuator servos 229122 may provide light detection and ranging (LiDAR), a triangulation beacon, and/or a camera, and may keep the inspection robot and/or a part of the inspection robot level with the ground or with the inspection surface. An example of a gimbal platform is illustrated in FIG. 35, in which a center line may be determined to find a pitch or yaw of a payload on the platform. The robot actuator motors 229124 may drive a wheel motor. The system 229100 may track how many times the wheel has turned, which may be used, for example, to derive a speed and/or velocity of the inspection robot. It may then determine whether the wheel speed matches the direction the robot is supposedly travelling. The position of the inspection sensors on the inspection robot may be based on the position of the robot. The sensors may be located, for example, on the payload, on an arm on the payload, or on a sled on the arm. As used herein, finding the position of the inspection robot may include, as a non-limiting list, determining the position, velocity, speed, acceleration, angular acceleration, a derivative of the position, and/or, a second derivative of the position.

The subsystem layer 229104 may include inertial odometry 229128, visual odometry 229130, LiDAR odometry 229132, local GPS 229134, wheel odometry 229138, gimbal kinematics 229140, and robot kinematics 229142. The inertial odometry 229128 may include a complementary filter. A computer model of the inspection robot may be included. Computing by the subsystem layer 229104 may be performed onboard the inspection robot and/or offboard.

The system layer 229108 may include sensor fusion 229144, a coverage mapper 229148, a landmark tracker 229150, and assisted steering 229152. The sensor fusion 229144 may include at least two inputs to be fused or mixed. The inputs to the sensor fusion 229144 may be directly from sensors in the component layer 229102, may be derived from processing or computing in the subsystem layer 229104, or may be a combination of sensing and computing.

A script may be provided to run the software data nodes. For example, a complementary filter node, robot model, RTS node, and sensor fusion node may be provided. A visualization may be provided. Data handling may be provided, for example, the coverage mapper 229148. A driver assist node may be provided, for example to specify yaw offset and display it to an operator. A data plotting tool may also be provided.

Mixing (or fusion) of the inputs may be performed by any operators known in the art. Mixing may include inputs from sensor values and/or computed values, and may change, for example, based on the reliability of the data. Inputs may switch from low accuracy values to high accuracy values, and vice versa. Values of the inputs may be weighted, for example, based on reliability of the data. Sensor values may include, for example, instant sensor values and/or sensor values integrated over time. Sensor values may be provided, for example, from the IMU 229110, which may include an accelerometer and a gyroscope. Individual sensor values may be processed for the position units utilized—for example the output of an accelerometer may be integrated to provide velocity information. Weighting may be utilized to provide a greater contribution in the position determination for a sensor having a greater confidence at the moment—for example a sensor that is operating within an expected range and with operating conditions consistent with the sensor providing high confidence position information. The mixing may be performed as a contribution by each sensor, by filtering the final position information toward one or more of the sensed values according to the weight given to each sensor, and/or as an override (e.g., an absolute position sensor providing a high confidence value may be utilized to reset the position value to the value indicated by the sensor). In certain embodiments, for example where a sensor has a fault, is out of range, is saturated, and/or is otherwise suspect, the sensor may be ignored, turned off, given a low (or zero) weighting, or the like. In certain embodiments, statistical normalization, rate limiting, or the like may be applied to the final determined position value, and/or to individual sensor values, for example with expected position values utilized until the sensor is confirmed to be providing reliable data, and/or until the final determined position value can be confirmed—for example with other reliable sensor data. In certain embodiments, noise and/or inaccuracies in individual sensor values and/or the final determined position value, may be smoothed out and/or managed with various techniques, such as low pass filtering, applying a Kalman filter, or the like. In certain embodiments, resets may be applied to the final determined position value (e.g., resetting when a high confidence sensor value is present as set forth preceding) and/or to individual sensor values (e.g., resetting an integrator for an individual sensor, such as an integrator from an acceleration sensor when a high confidence velocity value is available).

Figure 34:
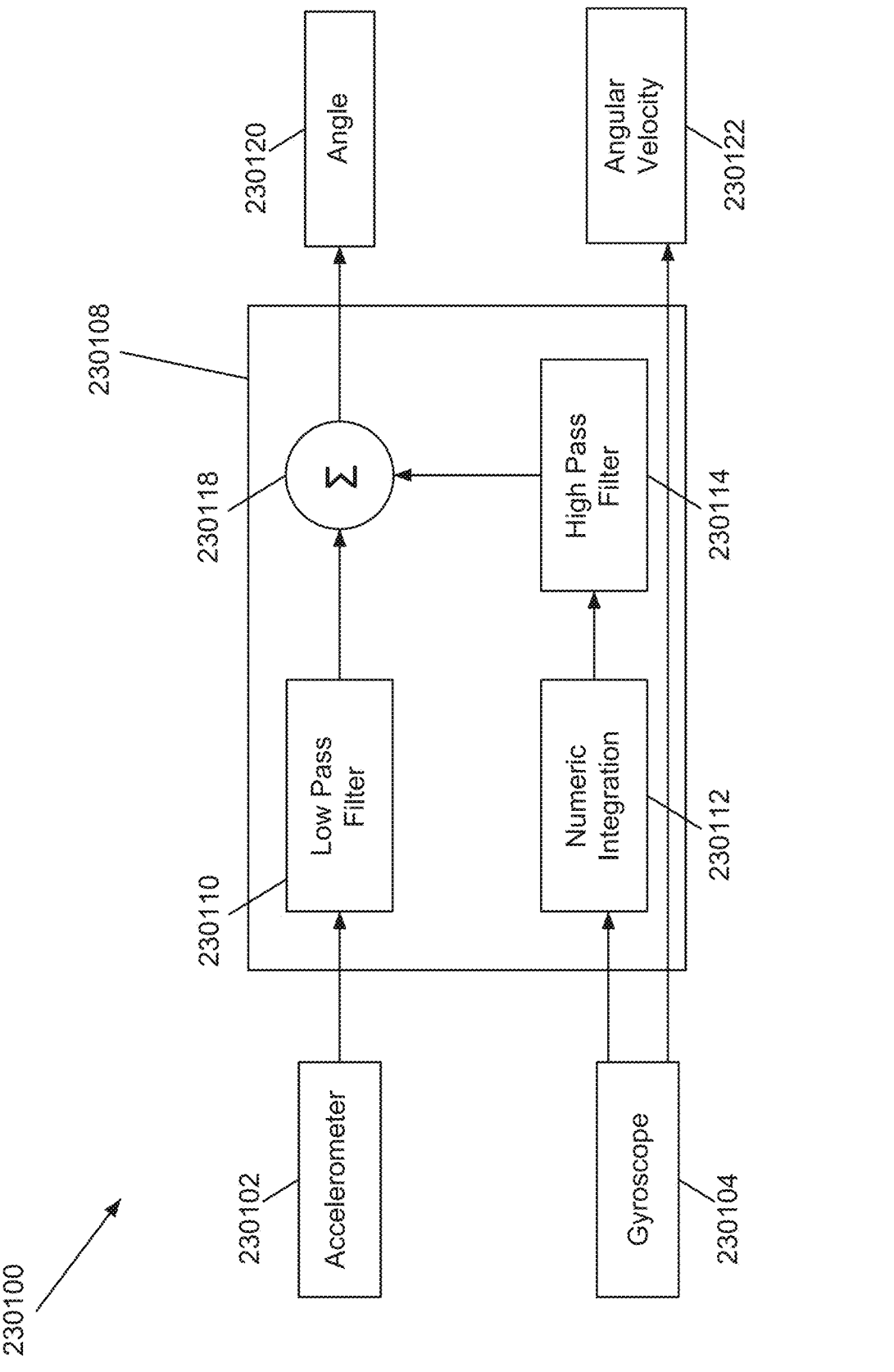
FIG. 34 is a schematic flow diagram of a sensor fusion consistent with certain embodiments of the present disclosure.

Referring to FIG. 34, an example of a sensor fusion 230100 may include mixing outputs from an accelerometer 230102 and a gyroscope 230104. A processor 230108 may receive the outputs 230102, 230104. The accelerometer output 230102 may be processed by a low pass filter 230110. The gyroscope output 230104 may be processed through a numerical integration 230112, which may output to a high pass filter 230114. The outputs of the low pass filter 230110 and the high pass filter 230114 may be combined, for example, in a summation unit 230118. The output from the summation unit 230118 may be used to determine the angle 230120 of motion of the inspection robot. The gyroscope output 230104 may be used separately to determine the angular velocity 230122 of the inspection robot.

Location accuracy improvement may include an accelerometer gravity vector. However, data from an accelerometer may be noisy, and may contain motion components, but will not drift. The motion components can be subtracted via measurement from other sources. A complementary filter may be used. In addition, motion of the inspection robot may be slow enough that gyroscope information can be omitted entirely. In one dimension, robot acceleration as measured by the encoders and/or drive commands may be subtracted before summation with integrated gyroscope data.

The sensors and other options for inputs to the sensor fusion may be based on the sensor output itself, may be a processed version of the sensor output, may be a weighted average of one or more sensor outputs and/or processed versions, or may be used as a reset, for example, if a sensor gives occasional data that is considered to be reliable. For example, if a GPS signal is considered to be accurate, then the GPS value may be used directly to determine a location. However, if the GPS data is intermittent, then in between GPS readings, location information may be derived from an accelerometer, a gyroscope, dead reckoning, etc.

Additional or alternative processing/computing by the sensor fusion 230100 may include applying a Kalman filter, which may be applied before or after mixing. In addition, the high pass filter and low pass filter may be switched, duplicated, omitted, or replaced by the Kalman filter as appropriate for the sensor fusion processing.

The system may also recognize a bad or improper sensor value and may ignore or turn off the sensor, e.g., temporarily. For example, if a line-of-sight to a beacon is lost, a sensor may suddenly report a position several feet away from the location of the inspection surface. The system may determine a position and/or a yaw of the inspection or a part of the inspection robot. The inputs to the sensor fusion may include external data, for example, known inspection surface geometry. Localization may also include information on location of Wi-Fi routers or other Wi-Fi or data transmission devices.

The gravity vector from the IMU may be used to calculate the angle from vertical and compensate for this using trigonometry. There may be limitations to this method, however. For example, it assumes that the inspection laser hits a flat plane at ground level. In reality, the surfaces at the ground level of a tank are rarely flat, and the inspection laser may hit large slopes or adjacent objects. While such a system may compensate for headings ±90°, because the ground may only be flat for a relatively small area, the heading range that is accurately compensated for may be much smaller, e.g., less than ±5° in most cases. As such, and expecting similar issues for sensors not yet integrated, a pointing mechanism that can hold the absolute angle in one or both of these axes has been developed. Force of gravity, e.g., determined using the accelerometer, may be used to determine the direction of the ground, and therefore the direction of the inspection robot. In one example, in 10-20 minutes of run time of the inspection robot, the noise of the force of gravity determination should be less than ±2°.

Figures 36, 36A, 36B:
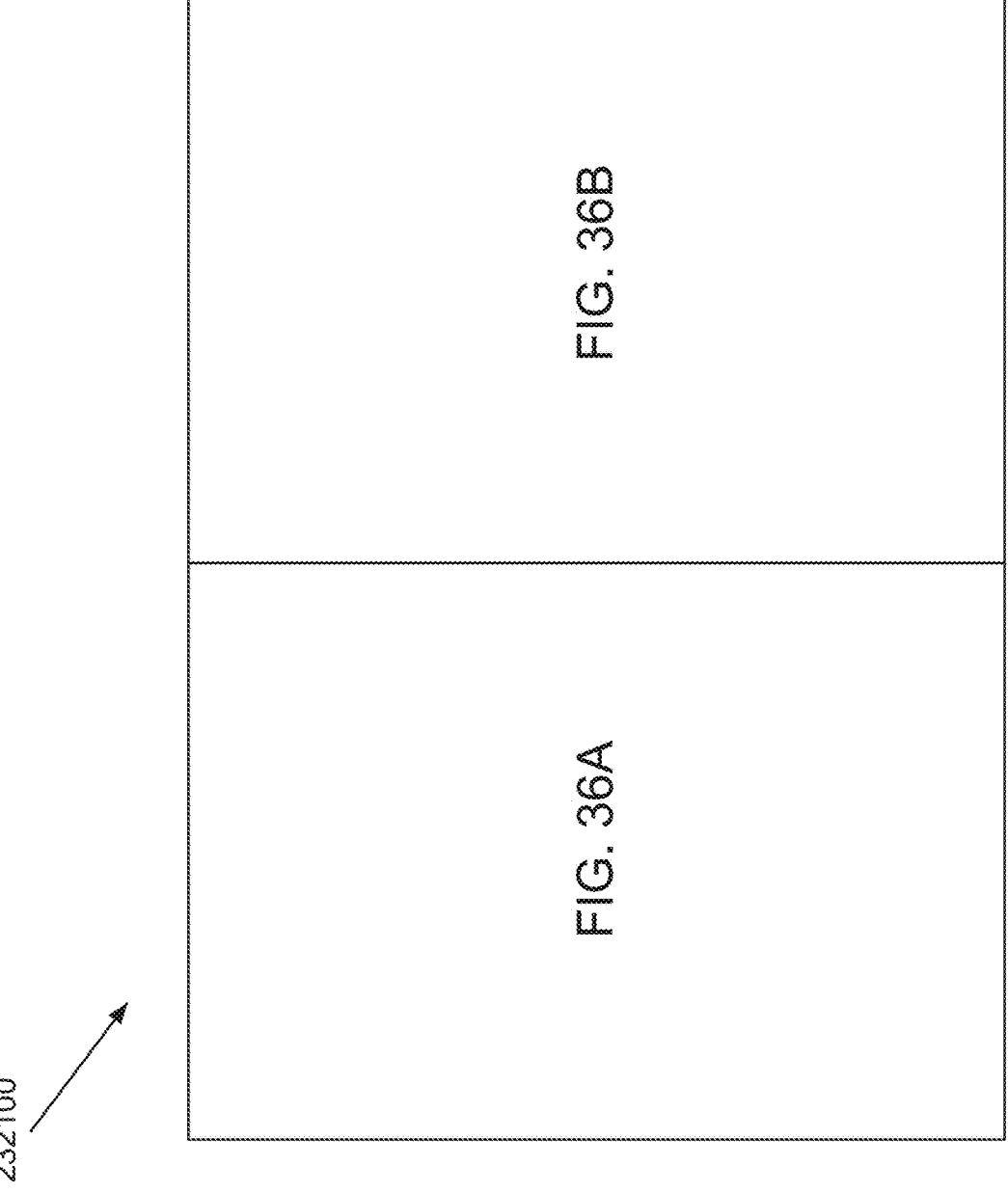
FIGS. 36, 36A, and 36B depict a schematic diagram of a system architecture consistent with certain embodiments of the present disclosure.
Figure 36A:
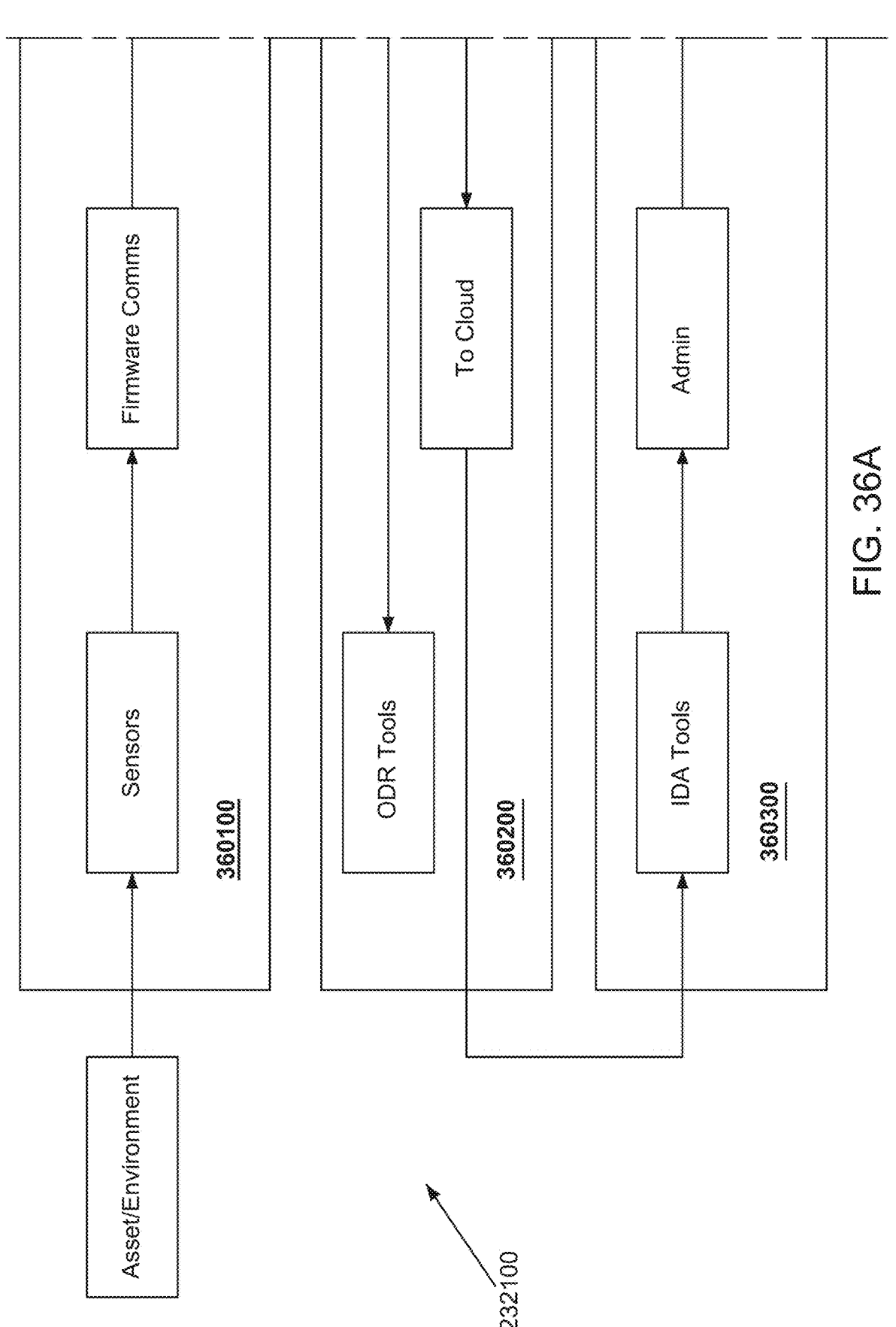
Figure 36B:
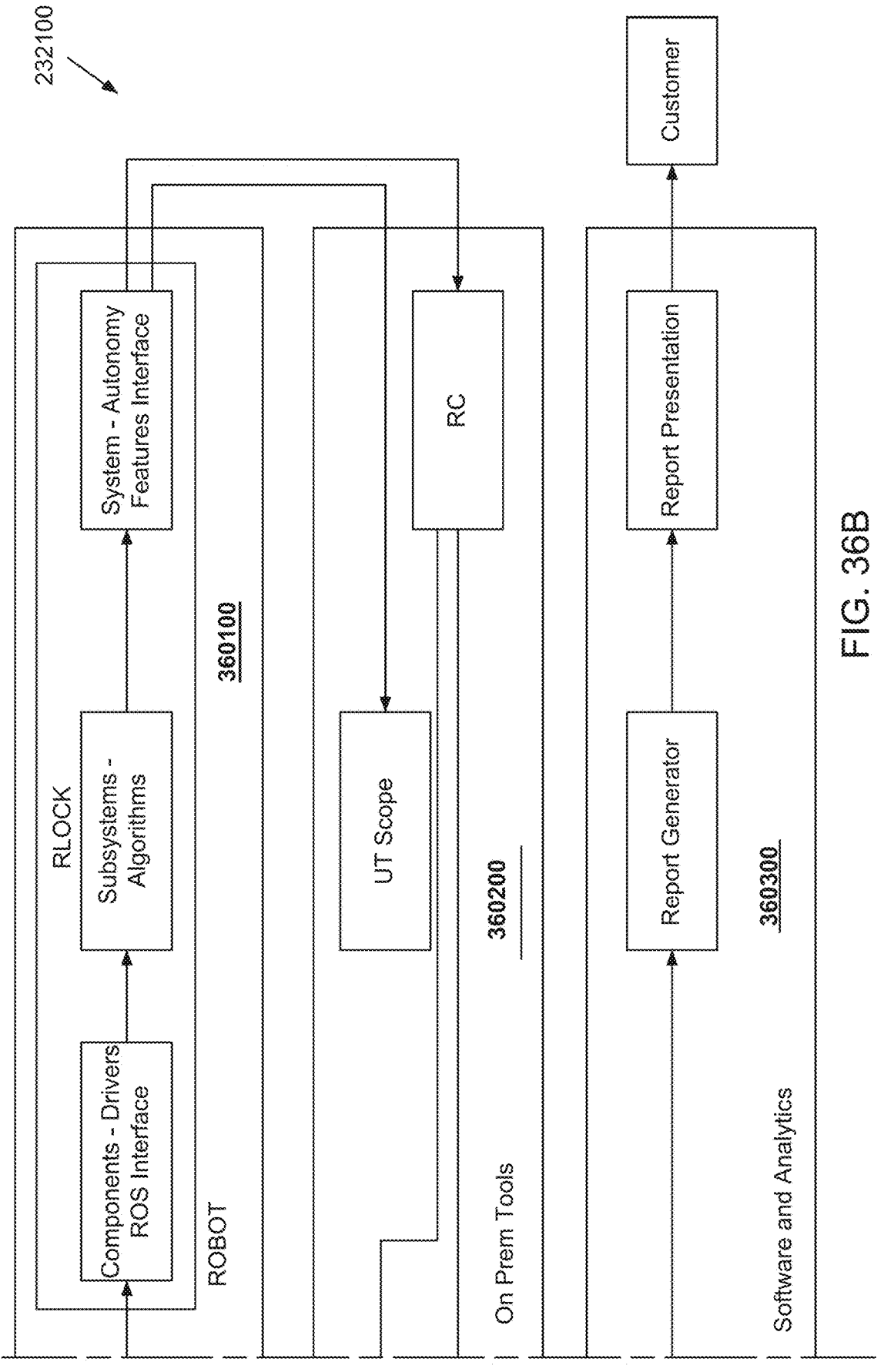

An example of a system architecture 232100 is shown in FIGS. 36, 36A, and 36B. The system architecture 232100 includes the component layer 229102, the subsystem layer 229104, and the system layer 229108 of FIG. 33. In embodiments, the system architecture 23100 may include a robot hardware layer 360100, a robot software layer 360200, and/or a cloud layer 360300. The robot hardware layer 360100 may include various onboard hardware components, such as those shown in FIGS. 36A and 36B which are disposed onboard the robot 100 (FIG. 1). The robot software component 360200 may include various applications and/or software tools that may be stored onboard the robot 100 (FIG. 1) in RAM, ROM, PROM and/or any other suitable type of electronic storage medium. The cloud layer 360300 may include one or more remote servers and/or other computers disposed offboard the robot 100 (FIG. 1).

Referring to FIG. 37, a method 233100 for sensor fusion in an inspection robot positioning system may be provided. The inspection robot positioning system may be located on and/or in an inspection robot, and/or may be configured in association and/or in communication with the inspection robot. The method 233100 may include providing, by a first position sensor, a first position value 233102; providing, by a second position sensor, a second position value 233104; and determining, by a controller, a position description for the inspection robot in response to the first position value and the second position value, the position description comprising a robot position value of the inspection robot on an inspection surface 233108. The first position sensor and the second position sensor may be onboard the inspection robot and/or may be offboard, e.g., in the environment of the inspection robot or the inspection surface, or may be externally provided.

Referring to FIGS. 38-41, certain further aspects of the method 233100 are described in the following, any one or more of which may be present in certain embodiments.

In certain embodiments, each one of the first position sensor and the second position sensor may include at least one of: an inertial measurement unit (IMU), a camera, a range finder, a triangulation assembly, an encoder for at least one of a wheel or a motor of the inspection robot, a gimbal actuator servo, or an actuator of the inspection robot. In certain embodiments, the method 233100 may further include: interpreting, by a component layer in the controller, the first position value and the second position value 234102 (FIG. 38), processing, by a subsystem layer in the controller, the first position value into a first position descriptor 234104 (FIG. 38), processing, by the subsystem layer, the second position value into a second position descriptor 234108 (FIG. 38), and determining, by a system layer in the controller, the position description in response to the first position value and the second position value 234110 (FIGS. 39 and 41). In certain embodiments, the method 233100 may further include determining, by the system layer, the position description in response to a previous position description 234112 (FIG. 39).

In certain embodiments, the method 233100 may further include determining, by the system layer, the position description in response to: a first competence value associated with the first position value, and a second competence value associated with the second position value 235102 (FIGS. 40 and 41). In certain embodiments, the method 233100 may further include: determining, by the subsystem layer, the first competence value in response to at least one of: an operating region of the first position sensor, an operating condition of the inspection robot, an integrated error walk estimate corresponding to the first position sensor, a fault value associated with the first position sensor, a first correspondence value for correspondence of the first position value with a previous position description, or a second correspondence value for correspondence of the first position value with at least one other position value 235104 (FIG. 40).

In certain embodiments, the method 233100 may further include determining, by the system layer, the position description by blending the previous position description, the first position value, and the second position value 236102 (FIG. 41). In certain embodiments, the method 233100 may further include determining, by the system layer, the position description by weighting application of each of the first position value and the second position value in response to the corresponding first competence value and second competence value 236104 (FIG. 41). In certain embodiments, the method 233100 may further include determining, by the system layer, the position description by at least partially resetting the position description in response to one of the first competence value or the second competence value and the corresponding first position value or second position value 236108 (FIG. 41).

In certain embodiments, the first position sensor may include an inertial measurement unit (IMU), an inspection surface may include a substantially vertical surface, and the method 233100 may further include determining, by the controller, the first position value in response to a gravity vector 237102 (FIG. 42). In certain embodiments, the robot position value may include a position of the inspection robot on the inspection surface. In certain embodiments, the robot position value may include an orientation of the inspection robot on the inspection surface. In certain embodiments, the robot position value may include at least one of a linear velocity of the inspection robot or an angular velocity of the inspection robot. In certain embodiments, the robot position value may include a position of a component of the inspection robot. In certain embodiments, the component may include at least one of: a sensor, a sensor sled, a payload, or a payload arm.

In certain embodiments, the first position sensor may include an internal measurement unit, and the second position sensor may include an encoder for at least one of a wheel or a motor of the inspection robot. In certain embodiments, the method 233100 may further include providing, by a third position sensor, a third position value 237104 (FIG. 42), and determining, by the controller, the position description in response to the third position value 237108 (FIG. 42), wherein the third position sensor may include a triangulation rangefinder.

It can be seen that various embodiments herein provide for an inspection robot capable to inspect a surface such as an interior of a pipe and/or an interior of a tank. Additionally, embodiments of an inspection robot herein are operable at elevated temperatures relative to acceptable temperatures for personnel, and operable in composition environments (e.g., presence of $CO_2$, low oxygen, etc.) that are not acceptable to personnel. Additionally, in certain embodiments, entrance of an inspection robot into certain spaces may be a trivial operation, where entrance of a person into the space may require exposure to risk, and/or require extensive preparation and verification (e.g., lock-out/tag-out procedures, confined space procedures, exposure to height procedures, etc.). Accordingly, embodiments throughout the present disclosure provide for improved cost, safety, capability, and/or completion time of inspections relative to previously known systems or procedures.

One or more certain further aspects of the example systems, apparatuses, and methods are described following, any one or more of which may be incorporated in certain embodiments.

An example inspection robot positioning system includes a first position sensor, a second position sensor, and a controller. The first position sensor is configured to provide a first position value. The second position sensor is configured to provide a second position value. The controller is configured to: determine a position description for an inspection robot in response to the first position value and the second position value, the position description comprising a robot position value of the inspection robot on an inspection surface; and transmit the position description. At least one of the first position sensor or the second position sensor comprise an inertial measurement unit (IMU).

In certain aspects, each one of the first position sensor and the second position sensor includes at least one of: a camera; a range finder; a triangulation assembly; an encoder for at least one of a wheel or a motor of the inspection robot; a gimbal actuator servo; or an actuator of the inspection robot. In certain aspects, the controller further includes: a component layer, a component layer, and a system layer. The component layer is configured to interpret the first position value and the second position value. The subsystem layer is configured to: process the first position value into a first position descriptor, and process the second position value into a second position descriptor. The system layer configured to determine the position description in response to the first position value and the second position value. In certain aspects, the system layer is further configured to determine the position description in response to a previous position description. In certain aspects, the system layer is further configured to determine the position description in response to: a first competence value associated with the first position value; and a second competence value associated with the second position value. In certain aspects, the subsystem layer is further configured to determine the first competence value in response to at least one of: an operating region of the first position sensor; an operating condition of the inspection robot; an integrated error walk estimate corresponding to the first position sensor; a fault value associated with the first position sensor; a first correspondence value for correspondence of the first position value with a previous position description; or a second correspondence value for correspondence of the first position value with at least one other position value. In certain aspects, the system layer is further configured to determine the position description by blending the previous position description, the first position value, and the second position value. In certain aspects, the system layer is further configured to determine the position description by weighting an application of each of the first position value and the second position value in response to the corresponding first competence value and the second competence value. In certain aspects, the system layer is further configured to determine the position description by at least partially resetting the position description in response to one of the first competence value or the second competence value and the corresponding first position value or the second position value. In certain aspects, the first position sensor includes the IMU; the inspection surface includes a substantially vertical surface with respect to the Earth's center of gravity; the IMU is structured to determine a gravity vector that points substantially towards the Earth's center of gravity; and the controller is further configured to determine the first position value in response to and based at least in part on the gravity vector. In certain aspects, the IMU includes at least one of: an accelerometer structured to generate an accelerometer output value, wherein the IMU is structured to determine the gravity vector based at least in part on the accelerometer output value; or a gyroscope structured to generate a gyroscope output value, wherein the IMU is structured to determine the gravity vector based at least in part on the gyroscope output value. In certain aspects, the IMU is structured to determine the gravity vector based at least in part on a relation to a normal vector of the inspection surface. In certain aspects, the relation is based at least in part on the gravity vector forming an angle with the normal vector. In certain aspects, the angle is between about +45° to about −45°. In certain aspects, the robot position value comprises a position of the inspection robot on the inspection surface. In certain aspects, the robot position value comprises an orientation of the inspection robot on the inspection surface. In certain aspects, the robot position value comprises at least one of: a linear velocity of the inspection robot; or an angular velocity of the inspection robot. In certain aspects, the robot position value comprises a position of a component of the inspection robot. In certain aspects, the component includes at least one of: a sensor, a sensor sled, a payload, or a payload arm. In certain aspects, the first position sensor comprises an internal measurement unit; and the second position sensor comprises an encoder for at least one of a wheel or a motor of the inspection robot. In certain aspects, the inspection robot positioning system further includes a third position sensor providing a third position value. In such embodiments, the controller is further configured to determine the position description in response to the third position value; and the third position sensor comprises a triangulation rangefinder.

An example method for localizing an inspection robot includes: determining a first position value via a first position sensor disposed on the inspection robot; determining a second position value via a second position sensor disposed on the inspection robot; determining, via a controller and in response to the first position value and the second position value, a position description for the inspection robot, the position description comprising a robot position value of the inspection robot on an inspection surface; and transmitting the position description. At least one of the first position sensor or the second position sensor comprise an inertial measurement unit (IMU).

In certain aspects, the method further includes: interpreting the first position value and the second position value via a component layer of the controller; generate, via a subsystem layer of the controller and based at least in part on the first position value, a first position descriptor; generate, via the subsystem layer and based at least in part on the second position value, a second position descriptor; and determining, via a system layer of the controller in response to and based at least in part on the first position value and the second position value, the position description. In certain aspects, the method further includes determining, via the controller, a previous position description for the inspection robot. In such embodiments, determining, via a system layer of the controller in response to and based at least in part on the first position value and the second position value, the position description, is in response to the previous position description. In certain aspects, the method further includes: determining, via the subsystem layer, a first competence value associated with the first position value; and determining, via the subsystem layer, a second competence value associated with the second position value. In such embodiments, determining, via a system layer of the controller in response to and based at least in part on the first position value and the second position value, the position description, is in response to the first competence value and the second competence value. In certain aspects, the method further includes: determining, via the controller, a competence factor. In such embodiments, determining, via the subsystem layer, a first competence value associated with the first position value is in response to the competence factor; and the competence factor is at least one of: an operating region of the first position sensor; an operating condition of the inspection robot; an integrated error walk estimate corresponding to the first position sensor; a fault value associated with the first position sensor; a first correspondence value for correspondence of the first position value with a previous position description; or a second correspondence value for correspondence of the first position value with at least one other position value. In certain aspects, determining, via a system layer of the controller in response to and based at least in part on the first position value and the second position value, the position description includes blending, via the subsystem layer, the previous position description, the first position value, and the second position value. In certain aspects, determining, via a system layer of the controller in response to and based at least in part on the first position value and the second position value, the position description further includes weighting application of each of the first position value and the second position value in response to the corresponding first competence value and the second competence value. In certain aspects, determining, via a system layer of the controller in response to and based at least in part on the first position value and the second position value, the position description includes partially resetting the position description in response to one of the first competence value or the second competence value and the corresponding first position value or the second position value. In certain aspects, the first position sensor comprises the IMU; the method further includes determining, via the IMU, a gravity vector with respect to the Earth's center of gravity; and determining, via a controller and in response to the first position value and the second position value, a position description for the inspection robot is in response to and based at least in part on the gravity vector.

An example inspection robot includes: a body; an arm coupled to the body; a payload coupled to the arm; an inspection surface sensor disposed in the payload and for inspecting an inspection surface; a first position sensor configured to provide a first position value; a second position sensor configured to provide a second position value; and a controller configured to determine a position description for an inspection robot in response to the first position value and the second position value, the position description comprising a robot position value of the inspection robot on an inspection surface. At least one of the first position sensor or the second position sensor comprise an inertial measurement unit (IMU).

In certain aspects, each one of the first position sensor and the second position sensor comprise at least one of: a camera; a range finder; a triangulation assembly; an encoder for at least one of a wheel or a motor of the inspection robot; a gimbal actuator servo; or an actuator of the inspection robot. In certain aspects, the controller further includes: a component layer, a subsystem layer, and a system layer. The component layer is configured to interpret the first position value and the second position value. The subsystem layer is configured to: process the first position value into a first position descriptor, and process the second position value into a second position descriptor. The system layer is configured to determine the position description in response to the first position value and the second position value.

An example inspection robot positioning system includes: a first position sensors, a second position sensor, and a controller. The first position sensor is configured to provide a first position value. The second position sensor is configured to provide a second position value. The controller configured to: determine a position description for an inspection robot in response to the first position value and the second position value, the position description comprising a robot position value of the inspection robot on an inspection surface; and transmit the position description. At least one of the first position sensor or the second position sensor includes a robot total station (RTS).

In certain aspects, the RTS includes: a prism, a single mounting cap, and first to seventh trihedral corner (TC) reflectors. The prism has a first end and a second end opposite the first end of the prism. The single mounting cap is at the first end of the prism. The first to seventh TC reflectors each include a reflective surface that includes: three side edges; and three corners at respective intercept points between the side edges. The seventh TC reflector, among the first to seventh TC reflectors, is on the second end of the prism. In certain aspects, at least one of the first position sensor or the second position sensor comprises an inertial measurement unit (IMU). In certain aspects, the inspection surface includes a substantially vertical surface with respect to the Earth's center of gravity; the IMU is structured to determine a gravity vector that points substantially towards the Earth's center of gravity; and the controller is further configured to determine the first position value in response to and based at least in part on the gravity vector. In certain aspects, the IMU includes at least one of: an accelerometer structured to generate an accelerometer output value, where the IMU is structured to determine the gravity vector based at least in part on the accelerometer output value; or a gyroscope structured to generate a gyroscope output value, where the IMU is structured to determine the gravity vector based at least in part on the gyroscope output value. In certain aspects, the IMU is structured to determine the gravity vector based at least in part on a relation to a normal vector of the inspection surface. In certain aspects, the controller further includes: a component layer, a subsystem layer, and a system layer. The component layer is configured to interpret the first position value and the second position value. The subsystem layer configured to: process the first position value into a first position descriptor, and process the second position value into a second position descriptor. The system layer is configured to determine the position description in response to the first position value and the second position value. In certain aspects, the system layer is further configured to determine the position description in response to a previous position description. In certain aspects, the system layer is further configured to determine the position description in response to: a first competence value associated with the first position value; and a second competence value associated with the second position value. In certain aspects, the subsystem layer is further configured to determine the first competence value in response to at least one of: an operating region of the first position sensor; an operating condition of the inspection robot; an integrated error walk estimate corresponding to the first position sensor; a fault value associated with the first position sensor; a first correspondence value for correspondence of the first position value with a previous position description; or a second correspondence value for correspondence of the first position value with at least one other position value. In certain aspects, the system layer is further configured to determine the position description by blending the previous position description, the first position value, and the second position value. In certain aspects, the system layer is further configured to determine the position description by weighting an application of each of the first position value and the second position value in response to the corresponding first competence value and the second competence value. In certain aspects, the system layer is further configured to determine the position description by at least partially resetting the position description in response to one of the first competence value or the second competence value and the corresponding first position value or the second position value. In certain aspects, the robot position value comprises a position of the inspection robot on the inspection surface. In certain aspects, the robot position value includes an orientation of the inspection robot on the inspection surface. In certain aspects, the robot position value includes at least one of: a linear velocity of the inspection robot; or an angular velocity of the inspection robot. In certain aspects, the robot position value includes a position of a component of the inspection robot. In certain aspects, the component includes at least one of: a sensor, a sensor sled, a payload, or a payload arm. In certain aspects, the first position sensor includes an internal measurement unit; and the second position sensor includes an encoder for at least one of a wheel or a motor of the inspection robot. In certain aspects, the inspection robot further includes: a third position sensor providing a third position value. In such embodiments, the controller is further configured to determine the position description in response to the third position value; and the third position sensor comprises a triangulation rangefinder.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general-purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like.

The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM, and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer-to-peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments reordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. The term "set" may include a set with a single member. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

What is claimed is:

1. An inspection robot positioning system, comprising:
an inspection robot comprising:
  a body;
  an arm coupled to the body;
  a payload coupled to the arm; and
  an inspection surface sensor disposed in the payload and for inspecting an inspection surface;
  a first position sensor configured to provide a first position value;
  a second position sensor configured to provide a second position value; and
  a controller configured to:
    determine a position description for the inspection robot based on the first position value and the second position value, the position description comprising a robot position value of the inspection robot on the inspection surface; and
    transmit the position description;
  wherein at least one of the first position sensor or the second position sensor comprises an inertial measurement unit (IMU);
  wherein the controller further comprises:
    a component layer configured to interpret the first position value and the second position value;
    a subsystem layer configured to:
      process the first position value into a first position descriptor, and
      process the second position value into a second position descriptor; and
    a system layer configured to:
      determine the position description based on:
      the first position value and the second position value;
      a first competence value associated with the first position value, and a second competence value associated with the second position value; and
      blending a previous position description, the first position value, and the second position value;
      weighting an application of each of the first position value and the second position value based on the corresponding first competence value and the second competence value; and
    wherein the subsystem layer is further configured to determine the first competence value based on at least one of:
      an operating region of the first position sensor;
      an operating condition of the inspection robot;
      an integrated error walk estimate corresponding to the first position sensor;
      a fault value associated with the first position sensor;
      a first correspondence value for correspondence of the first position value with the previous position description; or
      a second correspondence value for correspondence of the first position value with at least one other position value.

2. The inspection robot positioning system of claim 1, wherein each one of the first position sensor and the second position sensor comprise at least one of:

a camera;

a range finder;

a triangulation assembly;

an encoder for at least one of a wheel or a motor of the inspection robot;

a gimbal actuator servo; or an actuator of the inspection robot.

3. The inspection robot positioning system of claim 1, wherein the system layer is further configured to determine the position description based on the previous position description.

4. The inspection robot positioning system of claim 1, wherein:

the first position sensor comprises the IMU;

the inspection surface comprises a substantially vertical surface with respect to the Earth's center of gravity;

the IMU is structured to determine a gravity vector that points substantially towards the Earth's center of gravity; and the controller is further configured to determine the first position value based at least in part on the gravity vector.

5. The inspection robot positioning system of claim 4, wherein the IMU comprises at least one of:

an accelerometer structured to generate an accelerometer output value, wherein the IMU is structured to determine the gravity vector based at least in part on the accelerometer output value; or a gyroscope structured to generate a gyroscope output value, wherein the IMU is structured to determine the gravity vector based at least in part on the gyroscope output value.

6. The inspection robot positioning system of claim 4, wherein the IMU is structured to determine the gravity vector based at least in part on a relation to a normal vector of the inspection surface.

7. The inspection robot positioning system of claim 6, wherein the relation is based at least in part on the gravity vector forming an angle with the normal vector.

8. The inspection robot positioning system of claim 7, wherein the angle is between about +45° to about −45°.

9. The inspection robot positioning system of claim 1, wherein the robot position value comprises a position of the inspection robot on the inspection surface.

10. The inspection robot positioning system of claim 9, wherein the robot position value comprises an orientation of the inspection robot on the inspection surface.

11. The inspection robot positioning system of claim 10, wherein the robot position value comprises at least one of:

a linear velocity of the inspection robot; or an angular velocity of the inspection robot.

12. The inspection robot positioning system of claim 1, wherein the robot position value comprises a position of a component of the inspection robot.

13. The inspection robot positioning system of claim 12, wherein the component comprises at least one of: a sensor, a sensor sled, a payload, or a payload arm.

14. The inspection robot positioning system of claim 1, wherein:

the first position sensor comprises the IMU; and the second position sensor comprises an encoder for at least one of a wheel or a motor of the inspection robot.

15. The inspection robot positioning system of claim 14, further comprising:

a third position sensor providing a third position value; wherein:

the controller is further configured to determine the position description based on the third position value; and the third position sensor comprises a triangulation rangefinder.

16. An inspection robot positioning system, comprising:

an inspection robot comprising:

a body;

an arm coupled to the body;

a payload coupled to the arm; and an inspection surface sensor disposed in the payload and for inspecting an inspection surface;

a first position sensor configured to provide a first position value;

a second position sensor configured to provide a second position value; and a controller configured to:

determine a position description for the inspection robot based on the first position value and the second position value, the position description comprising a robot position value of the inspection robot on the inspection surface; and transmit the position description;

wherein at least one of the first position sensor or the second position sensor comprises an inertial measurement unit (IMU);

wherein the controller further comprises:

a component layer configured to interpret the first position value and the second position value;

a subsystem layer configured to:

process the first position value into a first position descriptor, and process the second position value into a second position descriptor; and a system layer configured to:

determine the position description based on:

the first position value and the second position value;

a first competence value associated with the first position value, and a second competence value associated with the second position value; and blending a previous position description, the first position value, and the second position value;

at least partially resetting the position description based on the one of the first competence value or the second competence value and the corresponding first position value or the second position value; and wherein the subsystem layer is further configured to determine the first competence value based on at least one of:

an operating region of the first position sensor;

an operating condition of the inspection robot;

an integrated error walk estimate corresponding to the first position sensor;

a fault value associated with the first position sensor;

a first correspondence value for correspondence of the first position value with the previous position description; or a second correspondence value for correspondence of the first position value with at least one other position value.

17. The inspection robot positioning system of claim 16, wherein each one of the first position sensor and the second position sensor comprise at least one of:
a camera;
a range finder;
a triangulation assembly;
an encoder for at least one of a wheel or a motor of the inspection robot;
a gimbal actuator servo; or
an actuator of the inspection robot.

18. The inspection robot positioning system of claim 16, wherein the system layer is further configured to determine the position description based on the previous position description.

19. The inspection robot positioning system of claim 16, wherein:
the first position sensor comprises the IMU;
the inspection surface comprises a substantially vertical surface with respect to the Earth's center of gravity;
the IMU is structured to determine a gravity vector that points substantially towards the Earth's center of gravity; and
the controller is further configured to determine the first position value based at least in part on the gravity vector.

20. The inspection robot positioning system of claim 16, wherein the robot position value comprises a position of the inspection robot on the inspection surface.

21. The inspection robot positioning system of claim 20, wherein the robot position value comprises an orientation of the inspection robot on the inspection surface.

22. The inspection robot positioning system of claim 21, wherein the robot position value comprises at least one of:
a linear velocity of the inspection robot; or
an angular velocity of the inspection robot.

23. The inspection robot positioning system of claim 16, wherein the robot position value comprises a position of a component of the inspection robot.

24. The inspection robot positioning system of claim 23, wherein the component comprises at least one of: a sensor, a sensor sled, a payload, or a payload arm.

25. The inspection robot positioning system of claim 16, wherein:
the first position sensor comprises the IMU; and
the second position sensor comprises an encoder for at least one of a wheel or a motor of the inspection robot.

26. The inspection robot positioning system of claim 25, further comprising:
a third position sensor providing a third position value; wherein:
the controller is further configured to determine the position description based on the third position value; and
the third position sensor comprises a triangulation rangefinder.

27. A method for localizing an inspection robot, the method comprising:
determining a first position value via a first position sensor disposed on the inspection robot, wherein the inspection robot includes a body, an arm coupled to the body, a payload coupled to the arm, and an inspection surface sensor disposed in the payload and for inspecting an inspection surface;
determining a second position value via a second position sensor disposed on the inspection robot;
determining, via a controller and based on the first position value and the second position value, a position description for the inspection robot, the position description comprising a robot position value of the inspection robot on the inspection surface; and
transmitting the position description;
wherein at least one of the first position sensor or the second position sensor comprises an inertial measurement unit (IMU);
interpreting the first position value and the second position value via a component layer of the controller;
generating, via a subsystem layer of the controller and based at least in part on the first position value, a first position descriptor;
generating, via the subsystem layer and based at least in part on the second position value, a second position descriptor;
determining, via a system layer of the controller based at least in part on the first position value and the second position value, the position description;
determining, via the subsystem layer, a first competence value associated with the first position value;
determining, via the subsystem layer, a second competence value associated with the second position value;
wherein determining, via the system layer of the controller based at least in part on the first position value and the second position value, the position description, is based on the first competence value and the second competence value; and
determining, via the controller, a competence factor, wherein:
determining, via the subsystem layer, a first competence value associated with the first position value is based on the competence factor, wherein the competence factor is at least one of:
an operating region of the first position sensor;
an operating condition of the inspection robot;
an integrated error walk estimate corresponding to the first position sensor;
a fault value associated with the first position sensor;
a first correspondence value for correspondence of the first position value with a previous position description; or
a second correspondence value for correspondence of the first position value with at least one other position value;
wherein determining, via the system layer of the controller based at least in part on the first position value and the second position value, the position description comprises blending, via the subsystem layer, the previous position description, the first position value, and the second position value; and
wherein determining, via the system layer of the controller based at least in part on the first position value and the second position value, the position description further comprises weighting application of each of the first position value and the second position value based on the corresponding first competence value and the second competence value.

28. The method of claim 27 further comprising:
determining, via the controller, the previous position description for the inspection robot, wherein determining, via the system layer of the controller based at least in part on the first position value and the second position value, the position description, is based on the previous position description.

29. The method of claim 27, wherein:
the first position sensor comprises the IMU;

the method further comprises determining, via the IMU, a gravity vector with respect to the Earth's center of gravity; and determining, via the controller and based on the first position value and the second position value, a position description for the inspection robot is based at least in part on the gravity vector.

30. A method for localizing an inspection robot, comprising:

determining a first position value via a first position sensor disposed on the inspection robot, wherein the inspection robot includes a body, an arm coupled to the body, a payload coupled to the arm, and an inspection surface sensor disposed in the payload and for inspecting an inspection surface;

determining a second position value via a second position sensor disposed on the inspection robot;

determining, via a controller and based on the first position value and the second position value, a position description for the inspection robot, the position description comprising a robot position value of the inspection robot on the inspection surface; and transmitting the position description;

wherein at least one of the first position sensor or the second position sensor comprises an inertial measurement unit (IMU);

interpreting the first position value and the second position value via a component layer of the controller;

generating, via a subsystem layer of the controller and based at least in part on the first position value, a first position descriptor;

generating, via the subsystem layer and based at least in part on the second position value, a second position descriptor;

determining, via a system layer of the controller based at least in part on the first position value and the second position value, the position description;

determining, via the subsystem layer, a first competence value associated with the first position value;

determining, via the subsystem layer, a second competence value associated with the second position value;

wherein determining, via a system layer of the controller based at least in part on the first position value and the second position value, the position description, is based on the first competence value and the second competence value; and determining, via the controller, a competence factor, wherein:

determining, via the subsystem layer, a first competence value associated with the first position value is based on the competence factor, wherein the competence factor is at least one of:

an operating region of the first position sensor;

an operating condition of the inspection robot;

an integrated error walk estimate corresponding to the first position sensor;

a fault value associated with the first position sensor;

a first correspondence value for correspondence of the first position value with a previous position description; or a second correspondence value for correspondence of the first position value with at least one other position value;

wherein determining, via the system layer of the controller and based at least in part on the first position value and the second position value, the position description comprises blending, via the subsystem layer, the previous position description, the first position value, and the second position value; and wherein determining, via a system layer of the controller based at least in part on the first position value and the second position value, the position description further comprises:

partially resetting the position description based on one of the first competence value or the second competence value and the corresponding first position value or the second position value.

31. The method of claim 30, further comprising:

determining, via the controller, the previous position description for the inspection robot, wherein determining, via the system layer of the controller based at least in part on the first position value and the second position value, the position description, is based on the previous position description.

32. The method of claim 30, wherein:

the first position sensor comprises the IMU;

the method further comprises determining, via the IMU, a gravity vector with respect to the Earth's center of gravity; and determining, via the controller and based on the first position value and the second position value, a position description for the inspection robot is based at least in part on the gravity vector.

* * * * *